Dec. 29, 1970  R. V. WEIGEL ET AL  3,550,227
LAMP MOUNT MAKING APPARATUS
Filed Nov. 4, 1968  11 Sheets-Sheet 1
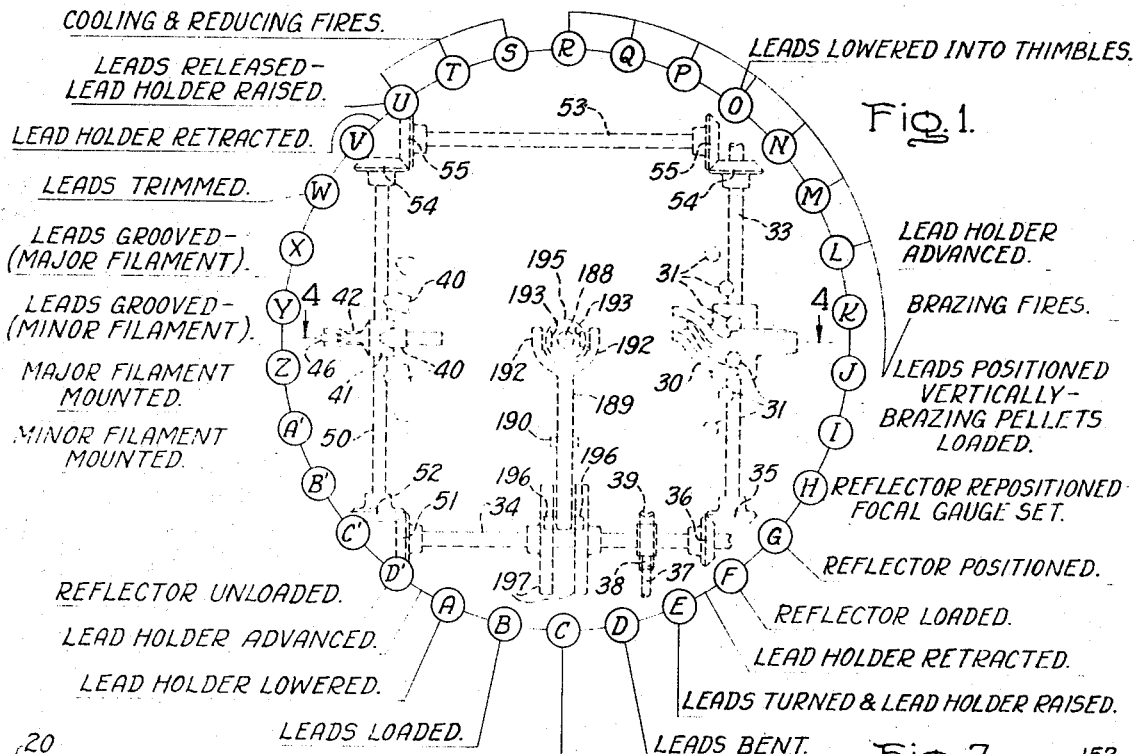
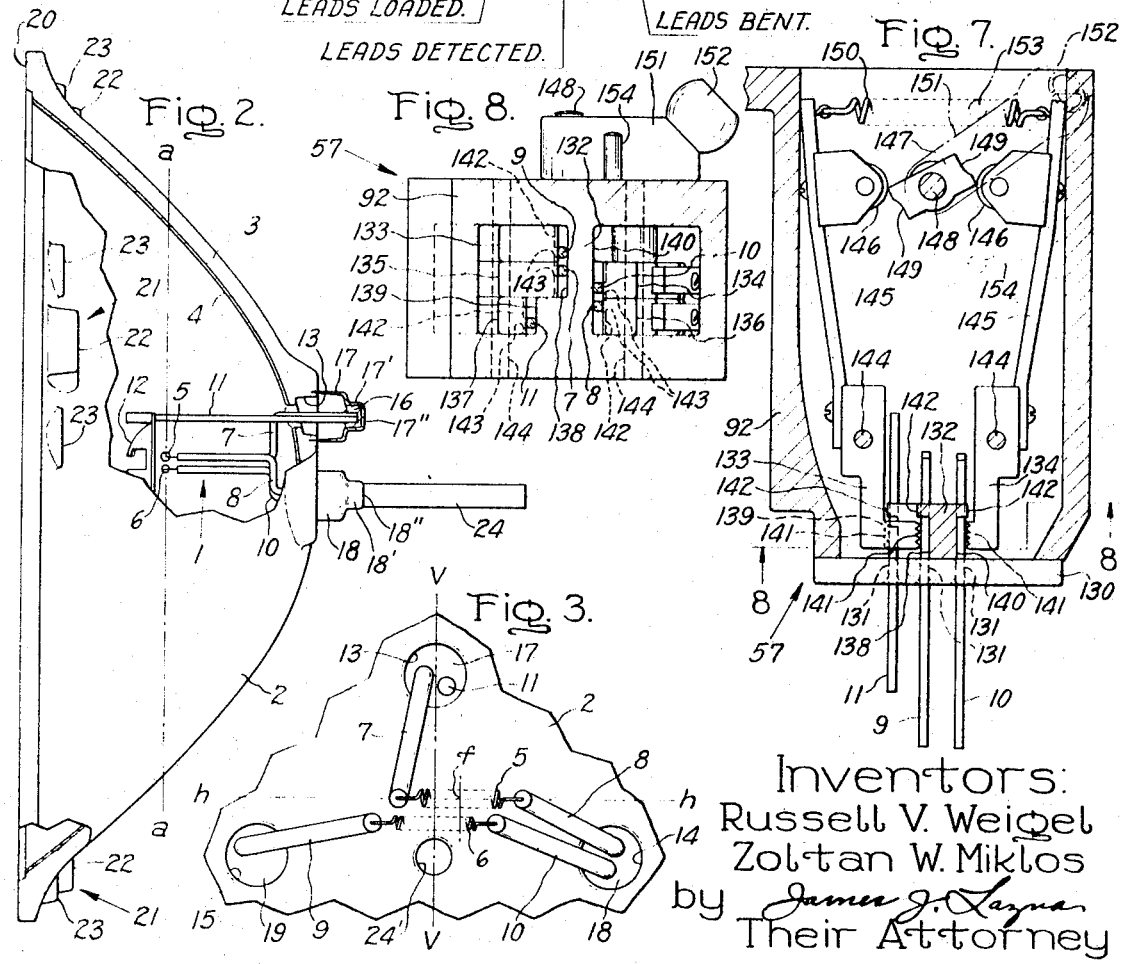
Inventors:
Russell V. Weigel
Zoltan W. Miklos
by James J. Lazaris
Their Attorney

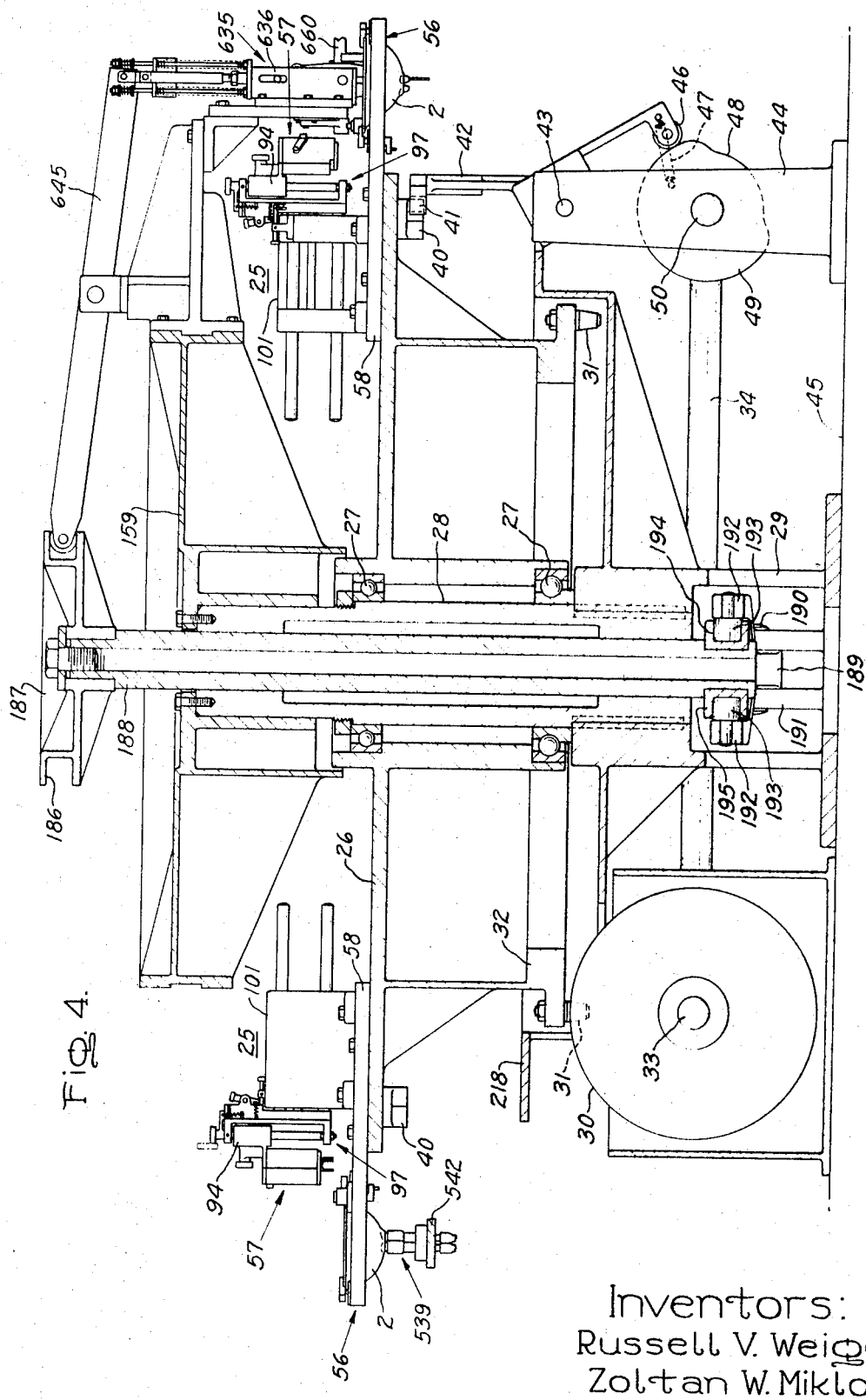

Dec. 29, 1970   R. V. WEIGEL ET AL   3,550,227
LAMP MOUNT MAKING APPARATUS
Filed Nov. 4, 1968   11 Sheets-Sheet 3
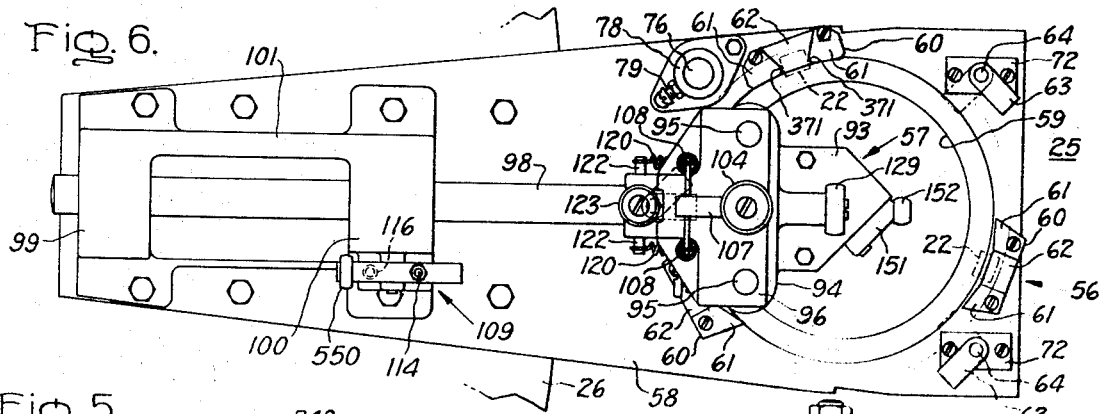
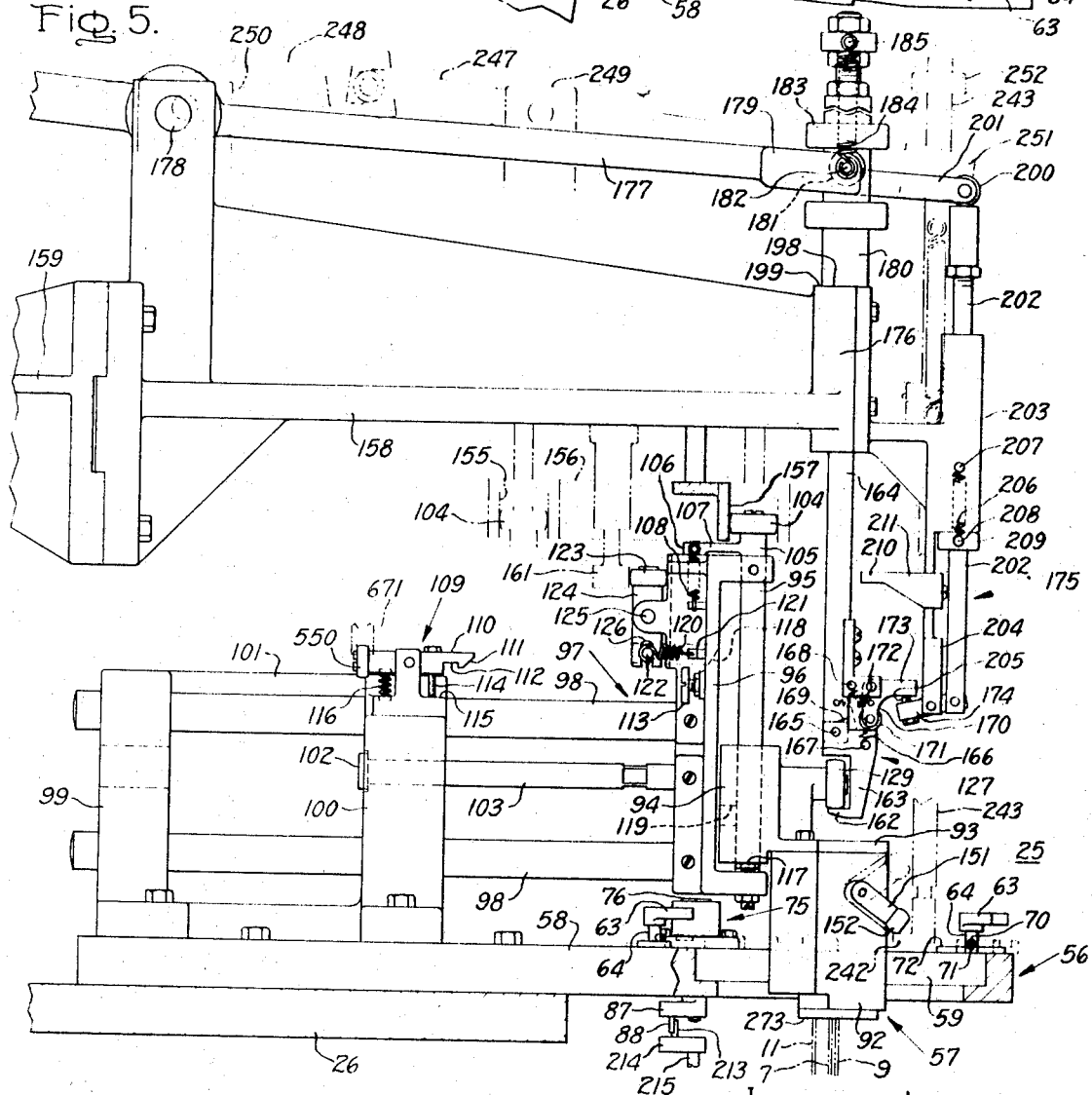
Inventors:
Russell V. Weigel
Zoltan W. Miklos
by James F. Lazus
Their Attorney

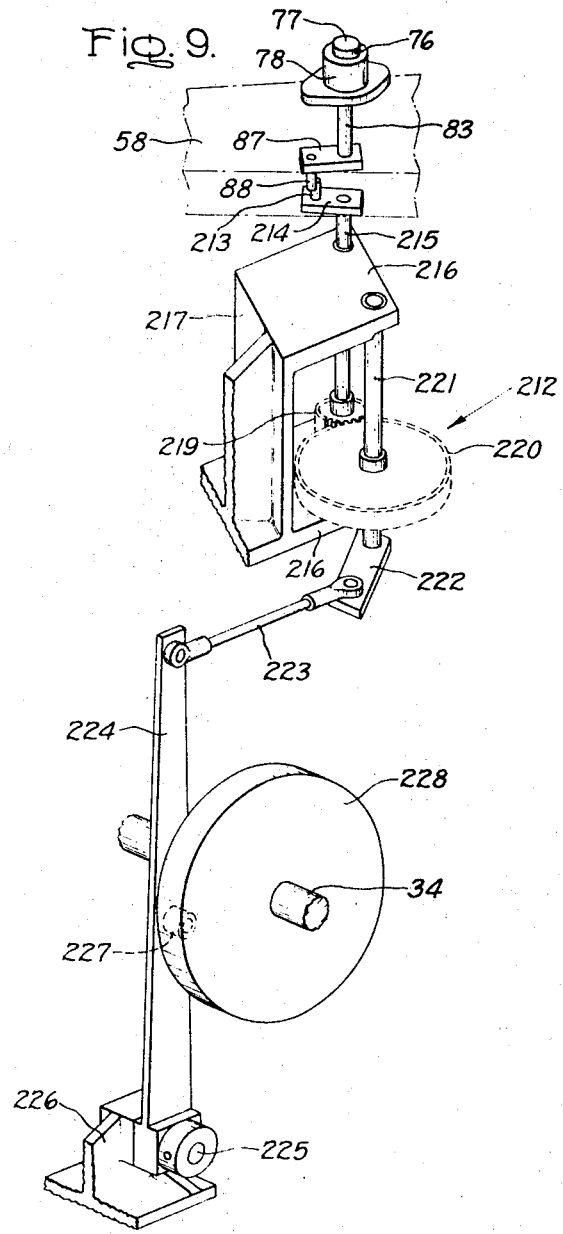

Dec. 29, 1970   R. V. WEIGEL ET AL   3,550,227
LAMP MOUNT MAKING APPARATUS
Filed Nov. 4, 1968   11 Sheets-Sheet 5
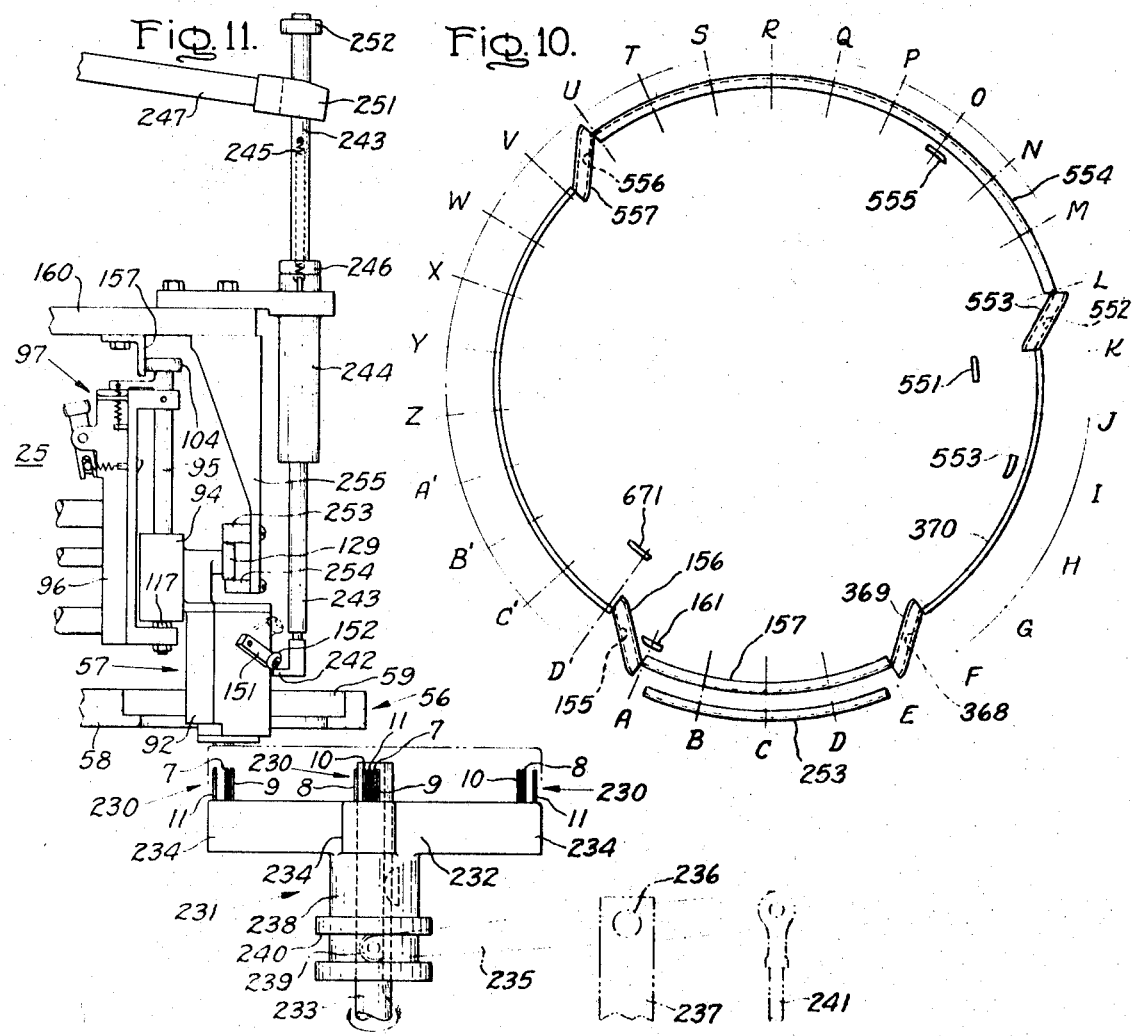
Inventors:
Russell V. Weigel
Zoltan W. Miklos
by James J. Lazna
Their Attorney

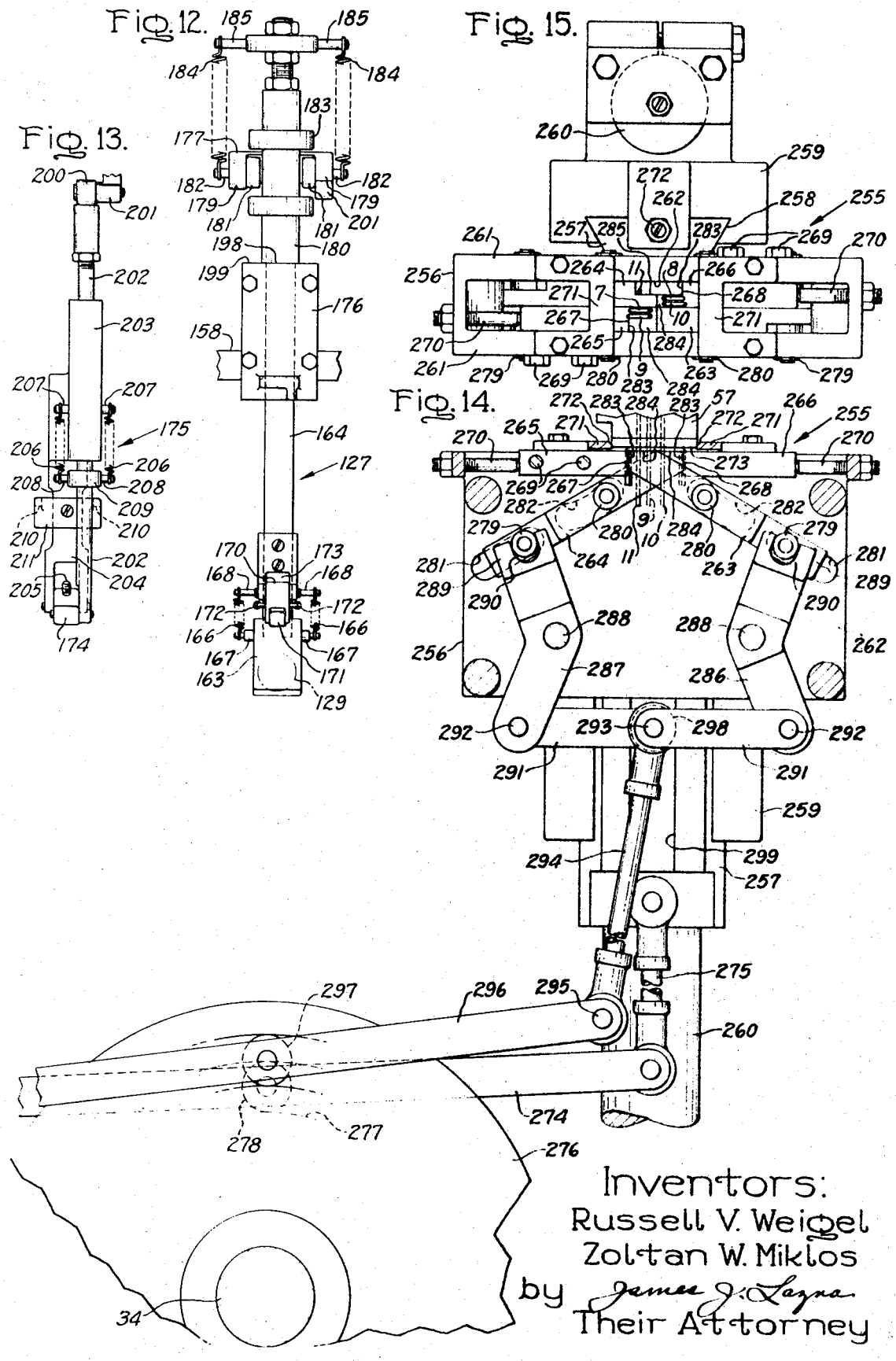

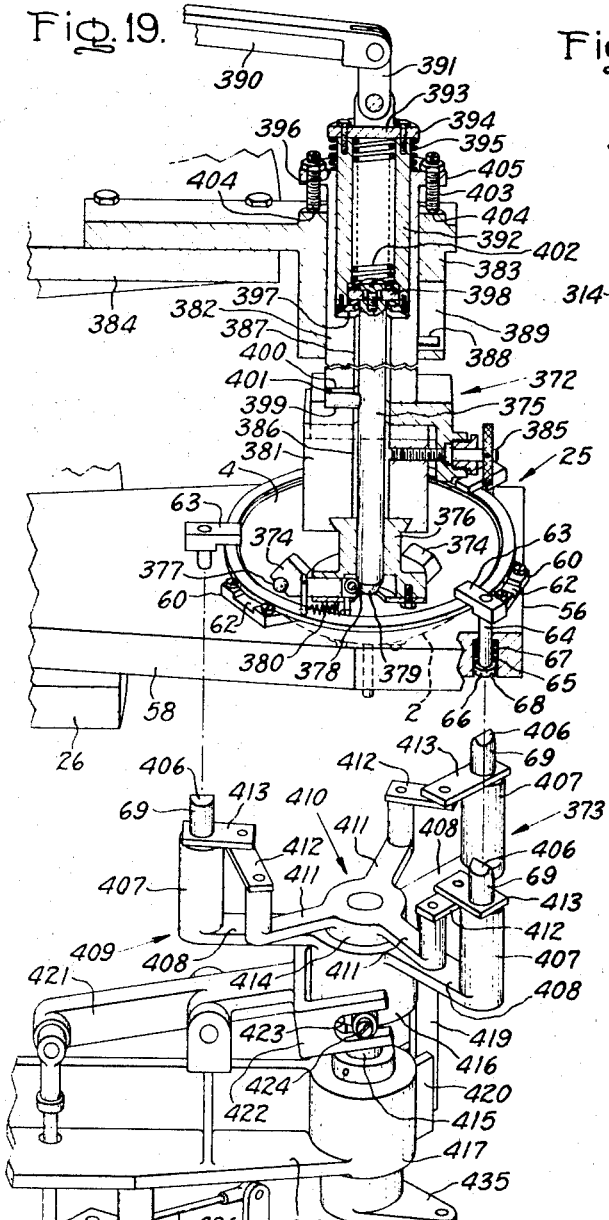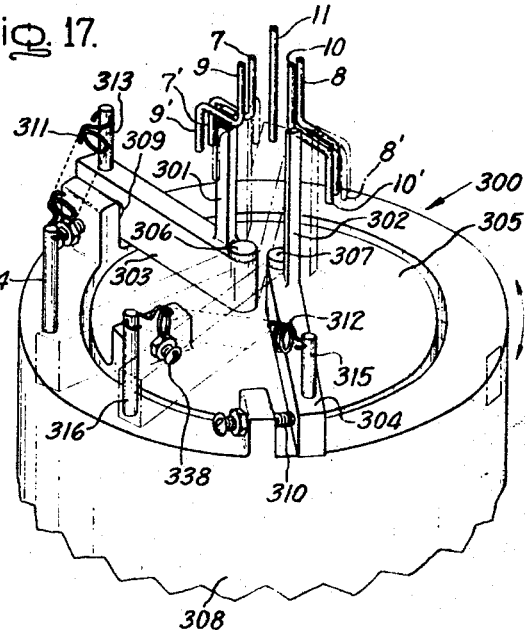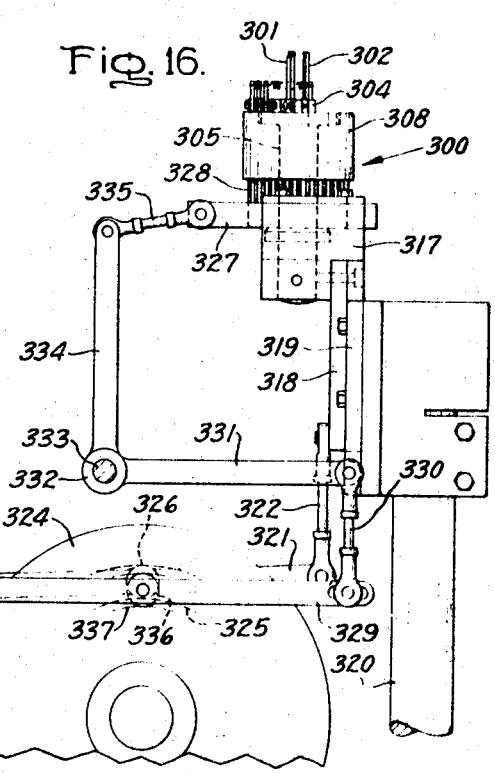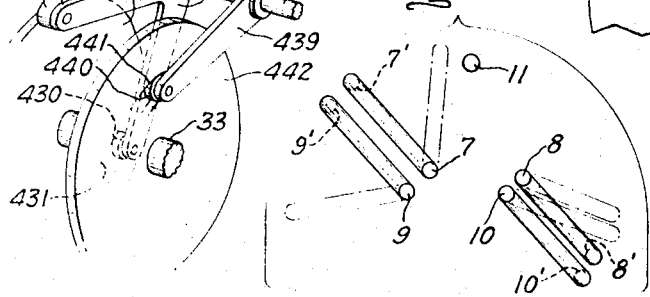

Dec. 29, 1970  R. V. WEIGEL ET AL  3,550,227
LAMP MOUNT MAKING APPARATUS
Filed Nov. 4, 1968  11 Sheets-Sheet 8
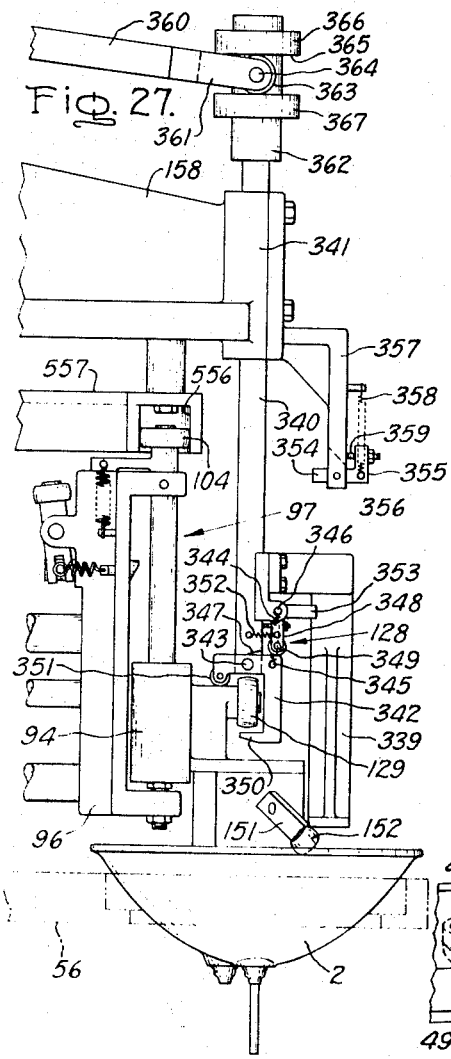
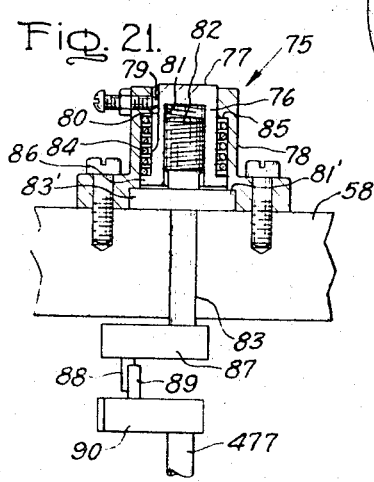
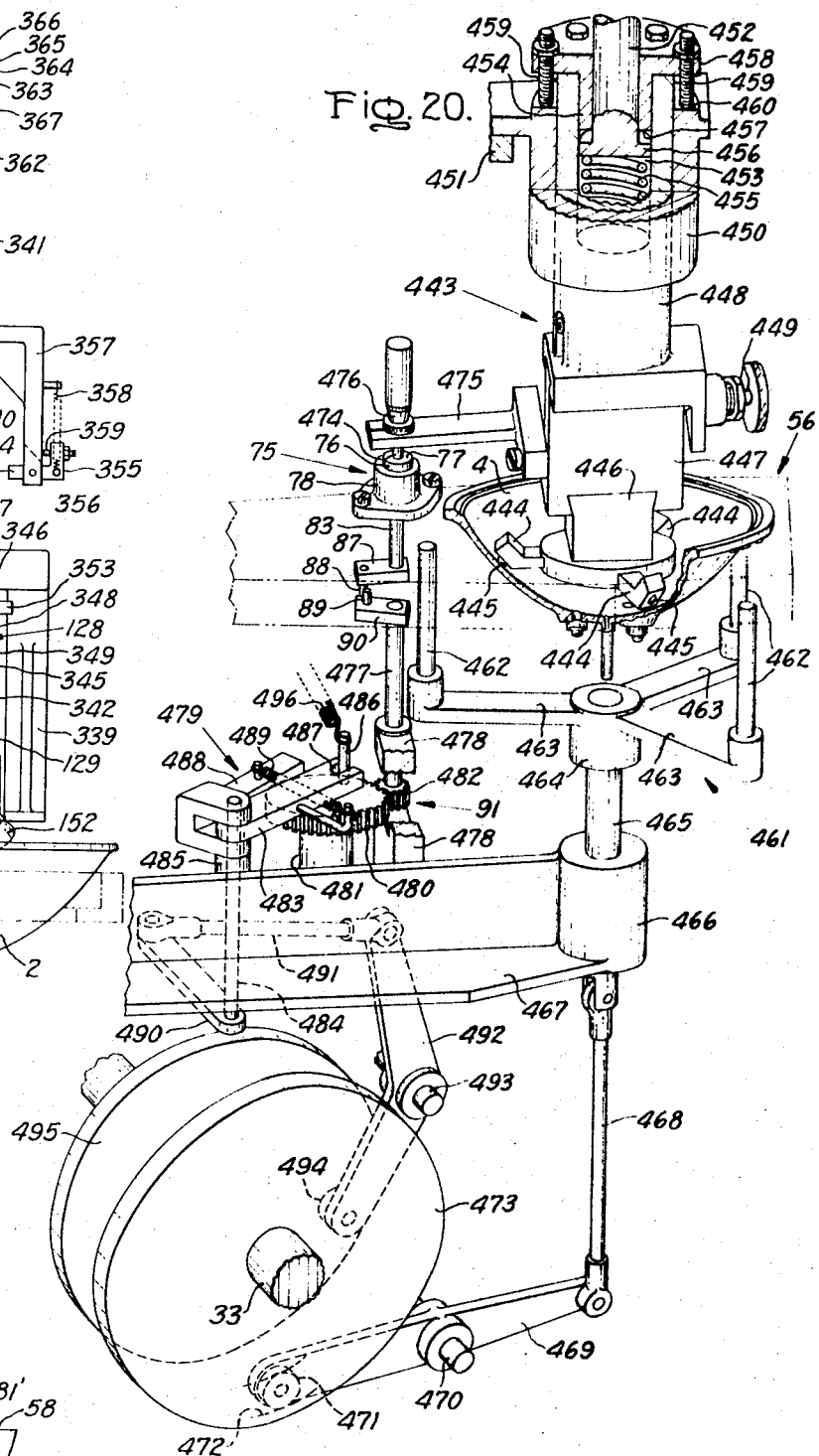
Inventors:
Russell V. Weigel
Zoltan W. Miklos
by James J. Lazzra
Their Attorney

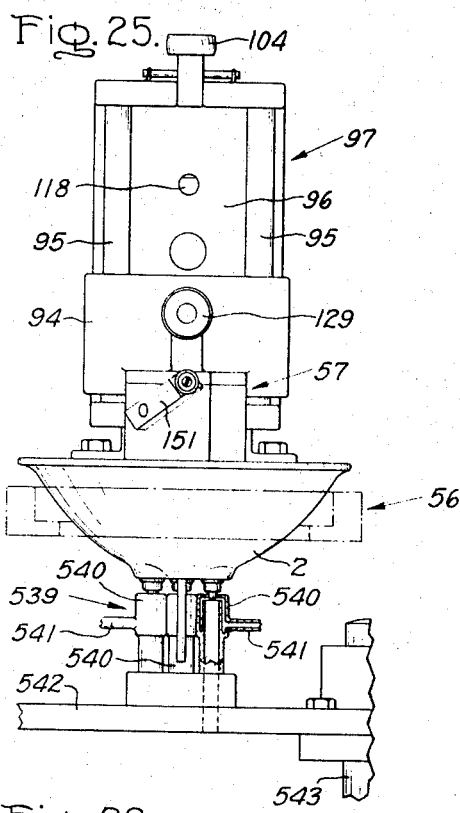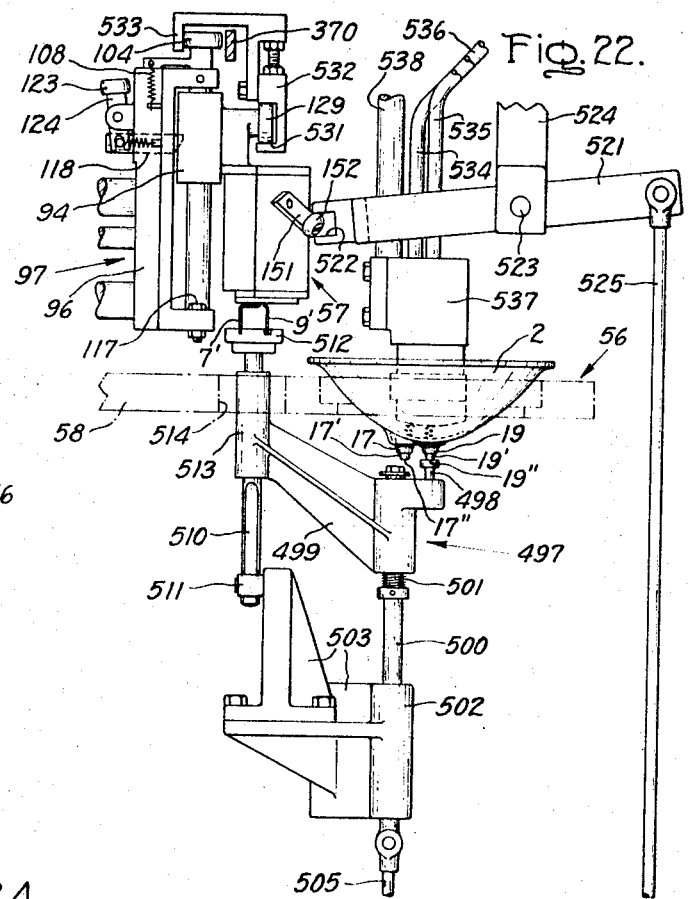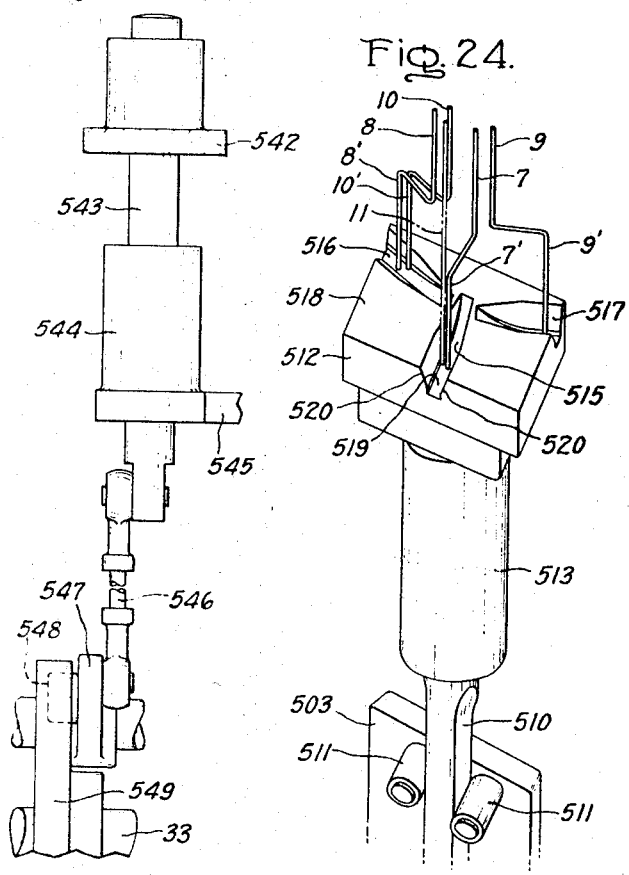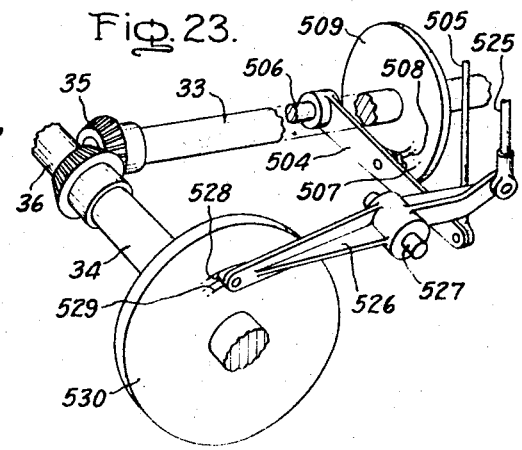

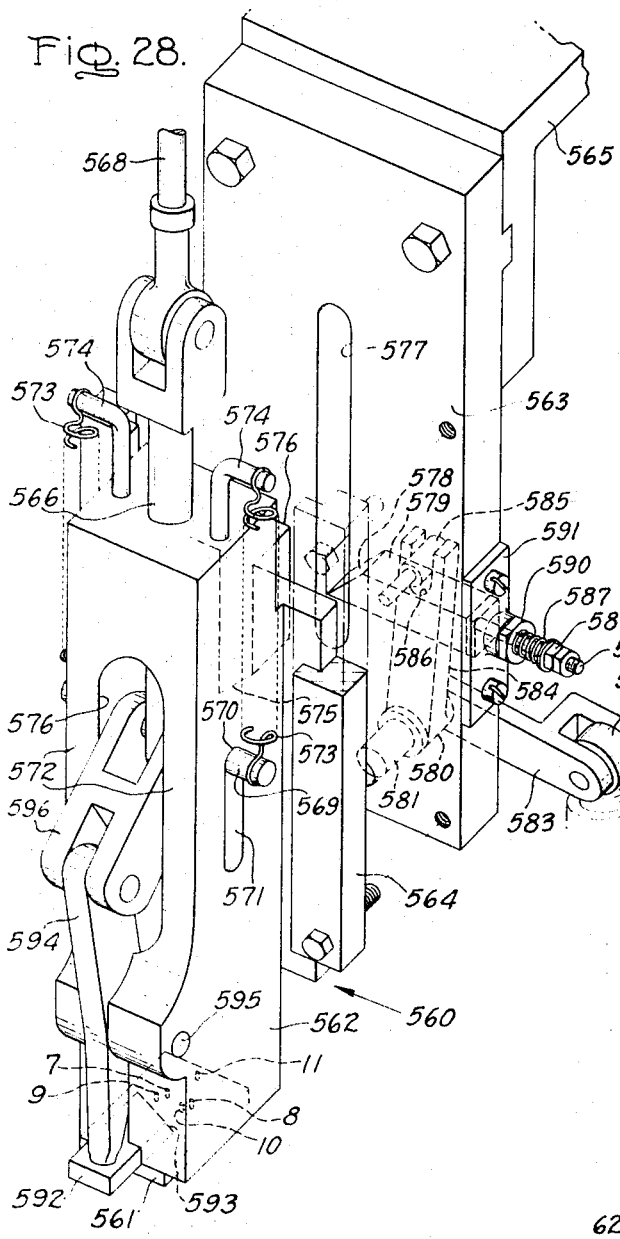
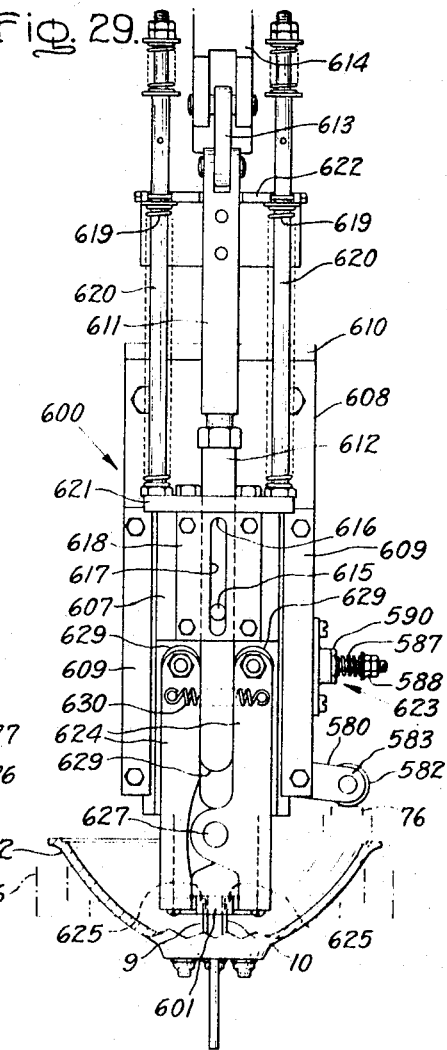
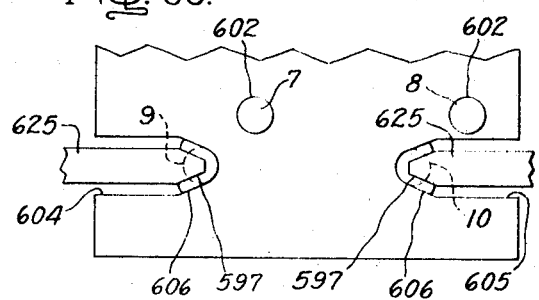

Inventors:
Russell V. Weigel
Zoltan W. Miklos
by James J. Lazna
Their Attorney

United States Patent Office 3,550,227
Patented Dec. 29, 1970

3,550,227
LAMP MOUNT MAKING APPARATUS
Russell V. Weigel, Mentor, and Zoltan W. Miklos, University Heights, Ohio, assignors to General Electric Company, a corporation of New York
Filed Nov. 4, 1968, Ser. No. 773,003
Int. Cl. H01j 9/06, 9/10, 9/46
U.S. Cl. 29—25.19       10 Claims

ABSTRACT OF THE DISCLOSURE

A machine for forming a filament mount structure on the glass reflector sections of projector type electric incandescent lamps comprises an indexing carrier having a series of heads thereon each comprising a holder for supporting a reflector section and a movable carriage for holding a plurality of lead-in conductors so as to project therefrom, the carriage being movable into operative relation to means at certain of the work stations of the machine for reshaping and repositioning the projecting ends of the lead-in conductors held in the carriage and then securing them in metal thimbles on the reflector section, each of the heads also having an adjustable reference surface for adjustment to a predetermined height position relative to the height of the focal plane of each individual reflector section supported in the head, and mount forming mechanisms at succeeding work stations of the machine movable into engagement with the so adjusted reference surface of each head for mounting a filament on the free ends of the secured lead-in conductors on the reflector section in predetermined relation to the optical focus thereof.

BACKGROUND OF THE INVENTION

(1) Field of the invention

This invention relates to automatic appratus for manufacturing envelope and filament mount assemblies for electric incandescent lamps and similar devices, and more particularly to automatic apparatus for bending lead-in conductors and mounting them on the glass reflector sections of projector type incandescent lamps and then mounting one or more filaments on the lead-in conductors in exact predetermined relation to the optical focus of each individual reflector section.

(2) Description of the prior art

Certain projector type electric incandescent lamps, such as those employed for vehicle headlamps and commonly referred to as sealed beam lamps, employ a pressed glass reflector section as an integral part of the lamp envelope for redirecting the light rays from one or more lamp filaments into a concentrated light beam. The filament or filaments are mounted on end portions of respective lead-in conductors or wire leads the other ends of which are brazed into metal thimbles or ferrules the rims of which are fusion-sealed to and embedded in the glass at the outer side of the reflector section over respective apertures in the wall thereof through which the lead-in conductors extend.

To assure that the projected light beam from such projector type lamps uniformly will conform precisely to the desired or prescribed pattern, it is necessary that the lead-in conductors and the filament or filaments of each lamp be mounted on the reflector section in exact predetermined relation to the optical focus of its reflecting surface. In an attempt to accomplish this object, high speed reflector mount-making apparatus has been devised and employed heretofore as disclosed, for example, in U.S. Pats. 2,297,950, Flaws, and 2,932,877, Pakish et al. Such prior apparatus, however, while achieving a certain degree of preciseness in the mounting of the filaments on the reflector sections, nevertheless has possessed certain deficiencies both from a manufacturing standpoint as well as from a product quality standpoint. For one thing, such prior apparatus has not operated to automatically compensate for the slight variations which exist, from one reflector section to another, in the contour of their reflecting surfaces thereby resulting in inaccuracies in the location of the mounted filaments relative to the optical focus of each individual reflector section. Also, with such prior apparatus, the successive operations of reshaping the wire leads to their customary offset shape and mounting them on the reflector sections, and the mounting of the filaments on the wire leads, have been performed on two separate machines. Besides requiring added manufacturing floor space, the need for two such separate machines also necessitates the transfer therebetween of the reflector sections which, in turn, requires that the individual reflector sections be properly located in each machine relative to the work-performing mechanisms associated therewith. These reflector section transfer and locating operations, however, tend to introduce certain transitional and locating errors such as are apt to result in a non-uniform and therefore poor quality work product.

SUMMARY OF THE INVENTION

It is an object of the invention to provide an improved and fully automatic apparataus for forming the mount structures on the reflector sections of projector type electric incandescent lamps at a high production rate.

Another object of the invention is to provide a lamp mount-making apparatus of the above-mentioned character which will automatically compensate for variations in the contour of the reflecting surfaces of the individual reflector sections and will mount the filaments on the reflector sections uniformly in exact predetermined relation to the optical focus of each reflector section.

Still another object of the invention is to provide fully automatic apparatus for performing, on a single indexing turret, the several distinct operations of reforming the wire leads for a projector type electric incandescent lamp into the desired offset shape and attaching them to the reflector section thereof, and mounting one or more filaments on the attached leads in precise predetermined relation to the optical focus of the reflector section.

Briefly stated, in accordance with one aspect of the invention, each of the work-supporting heads of an apparatus for forming the filament mount structures on the reflector sections of projection type incandescent lamps is provided with an adjustable reference surface which is adjusted into predetermined position relative to the focal plane of each individual reflector section supported in the head and which is then engaged by the mount-forming mechanisms at the succeeding work stations of the apparatus to thereby assure the mounting of the filaments on each reflector section in exact predetermined relation to the optical focus thereof. The adjustable reference gauge surface of each head is set in predetermined reference position relative to each individual reflector section supported in the head by adjustment into engagement with a locating stop on a reflector focal plane finding mechanism which is moved into axially aligned engagement with the reflecting surface of the reflector section to thereby position the locating stop in exact predetermined relation to the focal plane of the reflector section.

According to a further aspect of the invention, each of the work-supporting heads on an indexing turret of the apparatus is comprised of a reflector holder having a circular reflector-receiving opening within which the individual reflector sections are supported in upright position with their concave sides facing upwardly, and a wire lead holder or carrier movable both horizontally and vertically on the turret for holding the wire leads to be attached to the reflector section in the head, the lead holder being horizontally movable, only when in its raised inoperative positon, between an advanced position overlying the reflector-receiving opening in the head and a retracted position inwardly of the turret and clear of the reflector-receiving opening in the reflector holder to permit the loading thereinto of the reflector section, the insertion of brazing material into the metal ferrules on the reflector section, and the mounting of the filaments on the wire leads. The lead holder is movable vertically, only while located in its advanced position overlying the reflector-receiving opening in the head, for movement from a raised inoperative position above the reflector holder downwardly through the reflector-receiving opening, prior to the insertion thereinto of the reflector section to be processed, to a lowered operative position for the loading into the lead holder of the wire leads for the reflector section and the reshaping thereof to their final offset configuration, and the subsequent insertion of the reshaped leads into the metal ferrules on the reflector section for the brazing of the leads thereinto.

According to a still further aspect of the invention, the initially straight wire leads held in the lead holder are bent to their final offset shape in parallel planes following which they are then individually rotated in the lead holder about themselves to locate their offset free end portions in the desired final oriented position relative to one another so as to be substantially vertically aligned with those respective ones of the metal ferrules of the reflector section into which they are to be subsequently inserted and attached during the further course of travel of the lead holder around the apparatus. The reshaping and orienting of the wire leads in the lead holder in this manner enables the bending of the leads to their offset shape to be performed in one operation by a single set of bending dies at one work station of the apparatus, thus greatly simplifying the lead bending and locating operations and the mechanisms required therefor.

Further objects and advantages of the invention will appear from the following detailed description of a species thereof and from the accompanying drawings.

BRIEF DESCRIPTION OF THE DRAWINGS

In the drawings—

FIG. 1 is a diagrammatic plan view showing the successive work stations occupied by the work-supporting heads of the apparatus during the course of their travel therearound, and also showing the drive mechanism for the apparatus;

FIG. 2 is an elevation of a completed lamp reflector section provided with a filament mount structure formed by the apparatus according to the invention, the reflector section being shown partly broken away in order to more clearly illustrate the internal parts thereof;

FIG. 3 is a fragmentary elevational view on an enlarged scale of the reflector section as viewed from its open mouth end and showing the filament mount structure thereof in greater detail;

FIG. 4 is a vertical section on the line 4—4 of FIG. 1 of the apparatus comprising the invention;

FIG. 5 is a fragmentary vertical section of the apparatus radially of the turret thereof and showing, partly in elevation and partly in section, one of the work-supporting heads of the apparatus and the actuating mechanism therefor at the first work station thereof;

FIG. 6 is a plan view of one of the work-supporting heads of the apparatus;

FIG. 7 is a vertical section through the wire lead holder of one of the work-supporting heads of the apparatus;

FIG. 8 is a horizontal section on the line 8—8 of FIG. 7;

FIG. 9 is a perspective view of the mechanism at the first work station of the aparatus for returning the reflector height gauge of each work-supporting head to its lowered initial starting position;

FIG. 10 is a plan view of the operating cams and cam track around the apparatus for controlling the horizontal and vertical movements of the lead holder of each work-supporting head of the apparatus;

FIG. 11 is a vertical section radially of the turret of the apparatus showing one of the work-supporting heads thereof at the wire lead feeding station of the apparatus and also showing the wire lead transfer or loading mechanism thereat;

FIG. 12 is a front elevation, viewed radially inward of the apparatus, of the lowering mechanism for the lead holder of each work-supporting head;

FIG. 13 is a front elevation, viewed radially inward of the apparatus, of the tripping device for disconnecting the lead holder lowering mechanism from the lead holder of each work-supporting head;

FIG. 14 is an elevation of the wire lead reshaping mechanism of the apparatus shown in operative relation to the lead holder of one of the work-supporting heads.

FIG. 15 is a plan view of the wire lead reshaping mechanism;

FIG. 16 is an elevation of the wire lead reorienting mechanism of the apparatus;

FIG. 17 is an enlarged fragmentary perspective view, on an enlarged scale, of the upper or wire lead engaging portion of the wire lead reorienting mechanism;

FIG. 18 is a diagrammatic end-on view of the wire leads in their initial and reoriented positions in the lead holder of each work-supporting head;

FIG. 19 is a perspective view of one of the work-supporting heads of the apparatus at the reflector clamping station thereof and showing the actuating mechanism thereat for the reflector clamping means and also showing the gauging mechanism thereat for roughly centering the reflector in the head;

FIG. 20 is a perspective view of one of the work-supporting heads of the apparatus at the reference gauge setting station thereof and showing the gauging mechanism thereat for effecting final precise centering of the reflector in the head and the actuating mechanism thereat for adjusting the reflector height gauge of the head into exact elevational reference position to the focal plane of the precisely centered reflector;

FIG. 21 is a vertical section, on an enlarged scale, of the reflector height gauge of each work-supporting head of the apparatus;

FIG. 22 is an elevation of one of the work-supporting heads of the apparatus shown positioned in operative relation to the gauging mechanism at one of the stations thereof for readjusting the height position of the wire leads in the lead holder of the head and also showing a portion of the feeding mechanism thereat for introducing brazing material into the metal thimbles of the reflector in the head;

FIG. 23 is a perspective view of the drive mechanism for the wire lead height gauging mechanism of the apparatus;

FIG. 24 is a perspective view on an enlarged scale of the wire lead engaging gauge plate of the wire lead height gauging mechanism;

FIG. 25 is an elevation of one of the work-supporting heads of the apparatus showing the wire lead holder thereof in its lowered position holding the wire leads therein in inserted brazing position within the metal thimbles of the reflector section in the head and also showing one of the brazing fire gas burners of the apparatus;

FIG. 26 is an elevation of the actuating mechanism for vertically reciprocating the brazing fire gas burners of the apparatus;

FIG. 27 is a fragmentary elevation showing one of the raising mechanisms for the lead holders of the work-supporting heads of the apparatus;

FIG. 28 is a perspective view of the wire lead trimming mechanism of the apparatus;

FIG. 29 is an elevation, viewed radially inward of the apparatus, of the wire lead end grooving mechanism of the apparatus shown in operative position relative to a reflector section in one of the work-supporting heads;

FIG. 30 is a plan view, on an enlarged scale, of the grooving dies of the wire lead end grooving mechanism;

DESCRIPTION OF THE PREFERRED EMBODIMENTS

Figure 31:
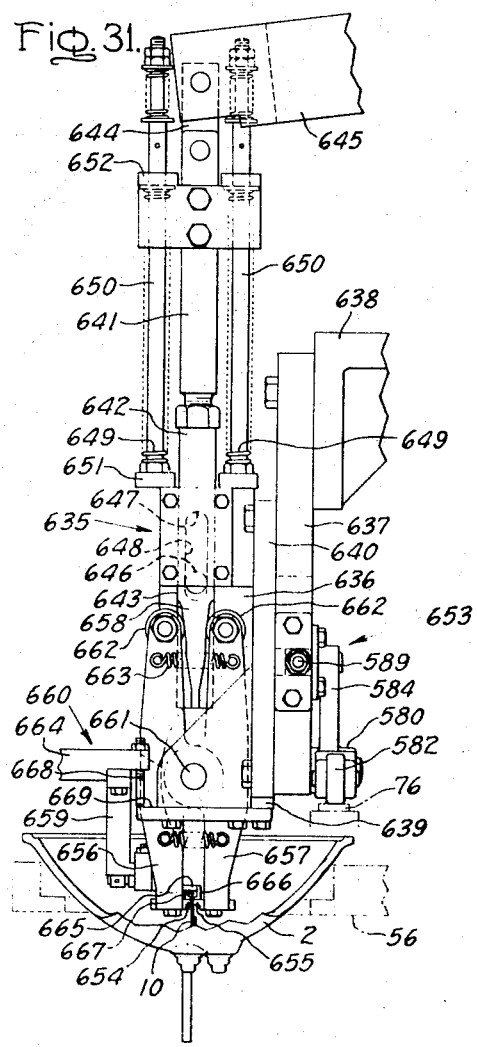
FIG. 31 is a vertical section, radially of the turret of the apparatus, showing one of the filament mounting mechanisms thereof in elevation and in operative filament mounting position relative to a reflector section in one of the work-supporting heads of the apparatus.

Referring to the drawings, the apparatus according to the invention is adapted to form, at a plurality (thirty in the particular case shown) of successive work stations around the apparatus, the filament mount structures 1 (FIG. 2) on the reflector sections 2 of certain projector type incandescent lamps such as, for example, the so-called sealed beam headlamps commonly employed on present-day motor vehicles. These lamps conventionally are either of the single-filament or two-filament type. While the invention is herein disclosed as embodied in apparatus for the formation of filament mount structures 1 for the two-filament type of headlamp, it should be understood that it may be embodied as well in apparatus for the formation of filament mount structures for the single-filament type of headlamp.

The reflector sections 2, which are formed of pressed hard glass, comprise one portion of the envelope of such projector type incandescent lamps, the other portion being a cover glass or lens section (not shown) which is fusion-sealed to the periphery of the reflector section 2 over its mouth opening after the formation of the filament mount structure 1 thereon. As shown in FIG. 2, the reflector sections 2 are each formed with a dished or concave inner surface 3 which is of suitable optical shape, such as paraboloidal, for instance, and on which is applied a coating 4 of a suitable reflecting material such as aluminum, for example, to form a reflecting surface. In the case of the particular lamp illustrated, the paraboloidal reflecting surface 4 is tilted downwardly at a slight angle of around 2° or so relative to the center axis of the reflector section 2. The filament mount structure 1 is mounted within the reflector section 2 in the vicinity of the apex region thereof and, in the case of the particular two-filament lamp illustrated, comprises a pair of linear coiled filaments 5 and 6 of tungsten wire extending parallel to each other approximately in the focal plane of the reflector section and located one above another and extending horizontally in the operative position of the headlamp in the motor vehicle. The uppermost filament 5 serves to produce a depressed asymmetric passing beam from the lamp and, as shown in FIGS. 2 and 3, it is located in the focal plane $a$—$a$ and in the horizontal axial plane $h$—$h$ of the reflecting surface 4 passing through the focal point $f$ thereof and it is centered at the said focal point $f$. The lowermost filament 6 serves to produce either the entire high or driving beam of the vehicle headlighting system or alternatively just a component part of the high beam the other component part of which is produced by a separate single-filament headlamp, and it is located slightly below and preferably a few thousandths of an inch ahead of the upper filament 5 and centered with respect to the vertical axial plane $v$—$v$ of the reflector section 2.

The filaments 5 and 6 are electrically connected to, and supported in place within the reflector section 2 by respective pairs of lead-in conductors or wire leads 7, 8 and 9, 10. A fifth wire lead or support wire 11 is also provided in the reflector section 2 for supporting a filament shield 12 in place in front of the filaments 5 and 6. The wire leads 7 to 11 extend through particular ones of a group of three apertures 13, 14, and 15 in the wall of the reflector section 2 to the outer side thereof where they are electrically connected, as by means of brazing material 16, to the closed nipple ends 17′, 18′, and 19′ of metal ferrules or thimbles 17, 18, and 19 which are fusion-sealed around their feather-edged rims to the outer side of the reflector section over the apertures 13, 14, and 15 therein to hermetically close them off. As shown in FIG. 3, the three apertures 13, 14, and 15 are located in triangular relation to one another with one aperture 13 located above the horizontal axial plane $h$—$h$ and centered in the vertical axial plane $v$—$v$ of the reflector section, and the other two apertures 14 and 15 symmetrically disposed on opposite sides of the vertical axial plane $v$—$v$ of the reflector section and in a common horizontal plane spaced a slight distance below the horizontal axial plane $h$—$h$ of the reflector section. The shield support wire 11 and one of the wire leads for the upper filament 5, i.e., lead 7, extend through the top aperture 13 in the reflector section 2 and are brazed to and supported in place by the metal thimble 17 which closes off this aperture. The other wire lead 8 for the upper filament 5, together with the lead 10 for the lower filament 6, extend through one of the side apertures, i.e., aperture 14, in the reflector section 2 and are brazed to the metal thimble 18 which is sealed thereover, while the other lead 9 for the lower filament 6 extends through the other side aperture 15 and is brazed to the corresponding metal thimble 19 which is brazed thereover. As shown, the four wire leads 7, 8, 9, and 10 for the filaments 5 and 6 are formed with offset inner end portions which are offset toward the reflector axis and to which the filaments 5 and 6 are connected. The fifth or shield support wire lead 11 is of straight form and of somewhat shorter overall length than the filament leads 7 to 10.

Spaced around and projecting from the back side of the sealing rim 20 of the reflector section 2 are three lamp positioning lug sets 21 each composed of a group of three closely spaced lugs comprising a central orienting key lug 22 located between two adjacent lamp seating lugs or pads 23 which are of less height than the orienting key lug 22. The seating lugs 23 are adapted to engage an annular seating flange on the lamp-receiving housing of the vehicle to properly position its axially therein while the orienting key lugs 22 fit into corresponding notches or key openings in the seating flange of the housing to properly orient the lamp therein about its axis. To this end, the orienting key lugs 22 of two of the lug sets 21, and likewise two of the corresponding key openings in the lamp seatings flange of the lamp housing are spaced closer together, e.g., around 100° apart, around the circular extent of the reflector sealing rim 20 than they are spaced from the orienting key 22 of the third lug set 21. This assures that the lamp will be positioned in the lamp housing in only one properly oriented axial position therein.

To permit the evacuation and gas filling of the lamp envelope after the sealing of the cover glass or lens to the reflector section 2 over its mouth opening, the reflector section is provided at its apex region, between the two side thimbles 18, 19 thereon, with a glass exhaust tube 24 which communicates with the interior of the reflector section through an exhaust opening 24′ in the wall thereof.

In its general organization, the apparatus according to the invention is arranged to advance, in step-by-step manner, each of a plurality of work-supporting heads 25 (FIG. 4) equally spaced apart around the periphery of a horizontal indexing turret 26, through a series (thirty in the particular apparatus illustrated) of successive work stations A to Z (FIG. 1) and A' to D', at which are performed the various operations involved in the formation in accordance with the invention of the filament mount structures 1 on the reflector sections 2. During the course of index movement of each head 25 around the apparatus, a plurality (five in the particular case illustrated) of straight wire leads or supports 7, 8, 9, 10 and 11 are loaded into the head and four of them bent into offset shape, following which a reflector section 2 is then loaded into the head 25 and accurately centered therein, the wire leads then brazed into the metal thimbles 17, 18, and 19 on the reflector section in predetermined relation to the optical axis thereof, and filaments 5 and 6 then mounted on the wire leads 7, 8, and 9, 10 in exact predetermined relation to the optical focus of the reflector section 2.

Referring to FIG. 4 in particular, the turret 26 on which the heads 25 are mounted is rotatably mounted, by means of roller bearings 27, on an upright hollow center column 28 upstanding from a base frame 29, for rotation about a vertical axis, and it is indexed in step-by-step manner by means of a barrel type index cam 30 which successively engages with a plurality of rollers 31 (FIG. 1) corresponding in number to the heads 25 and equally spaced apart around the circular extent of a depending annular flange 32 on the turret. The index cam 30 is fastened on a cam shaft 33 which is driven from a main drive shaft 34 through intermeshing bevel gears 35 and 36 fastened on the shafts 33 and 34, respectively. The main drive shaft 34 is driven by an electric motor (not shown) through a worm drive shaft 37 which is belt-driven from the electric motor and which carries a worm gear 38 meshed with a worm wheel 39 on the main drive shaft 34.

To assure the precise positioning of the turret 26, and thus the accurate centering of the heads 25 thereon at each of the work stations of the apparatus following each index of the turret, a plurality of V-shaped wedge blocks 40, corresponding in number and spaced position to the heads 25, are provided around the underside of the turret for engagement, during each dwell period thereof, within the V-notch of a movable centering wedge 41 which is moved into engagement with the particular V-wedge block 40 located opposite the centering wedge 41 during each dwell period of the turret. As shown in FIG. 4, the centering wedge 41 is mounted on one end of a spring-loaded lever 42 which is pivotally mounted intermediate its ends, by means of pivot shaft 43, on a support bracket 44 upstanding from the bed 45 of the apparatus. The other end of the lever 42 carries a roller 46 which is held in spring pressure engagement, by the pull of a tension coil spring 47 connected between the lever 42 and the support bracket 44, with the cam-shaped periphery or edge 48 of a plate or edge cam 49. The cam 49 is fastened on an auxiliary cam shaft 50 which is driven from the main drive shaft 34 through intermeshing bevel gears 51 and 52 fastened on the shafts 34 and 50, respectively.

As shown in FIG. 1, a cross cam shaft 53 extends across the ends of the shafts 33 and 50 opposite the ends thereof driven by the main cam shaft 34, and it is driven by the shafts 33, 50 through intermeshing pairs of bevel gears 54 and 55 on the shafts 33, 50 and on the cross shaft 53. The four gear-interconnected shafts 33, 34, 50, and 53 are arranged in rectangular array relative to one another and symmetrically about the vertical axis of rotation of the turret 26 and therebeneath, and together form, in effect, a closed driving shaft circuit around the apparatus.

Referring to FIGS. 5 and 6 in particular, each of the heads 25 of the turret 26 is comprised of a reflector holder portion 56 for supporting a reflector section 2 therein with its concave reflecting surface 4 facing upwardly, and a wire lead holder portion 57 for holding the group of five wire leads 7, 8, 9, 10 ad 11 which are to be brazed into the reflector section. Reflector holder 56 is formed on the overhanging outer end portion of an elongated metal base plate portion 58 of the head which is fastened to the upper side of the turret 26 at its periphery in a position extending radially thereof and projecting outwardly beyond the turret periphery so as to overhang it. Adjacent its outer end, the overhanging portion of the head base plate 58 is formed with a circular-shaped opening 59 extending vertically therethrough for the reception of a reflector section 2 therein. Fastened on the upper side of the head base plate 58 and spaced around the rim of the reflector-receiving opening 59 therein are a plurality of reflector seating pads 60 (FIG. 6) corresponding in number (three in the particular case illustrated) and in spacing around the reflector-receiving opening 59 to the lamp seating and orienting lug sets 21 on the reflector section 2 and on which the reflector section is adapted to rest, with its seating lugs 23 resting on the flat top seating surfaces 61 of the seating pads 60, to thereby support the reflector section 2 in proper upright position in the reflector holder 56 with its concave reflecting surface 4 facing upwardly and its geometric axis extending vertically, the geometric axis of the reflector section 2 being that axis thereof which extends perpendicularly to the plane of the seating surfaces of the seating lugs 23 thereon and passes through the geometric center of its circular sealing rim 20. The three seating pads 60 are each provided with a central notch or key recess 62 for closely receiving, with just a slight clearance, the orienting key lugs 22 on the reflector section 2, the three notches or key recesses 62 corresponding in angular spacing, around the reflector-receiving opening 59 in the head base plate 58, to the angular spacing of the orienting key lugs 22 around the sealing rim 20 of the reflector section 2, and being located in the required oriented position around the reflector-receiving opening 59 to locate the reflector section 2 in proper oriented position in the reflector holder 56 with the plane of its two side ferrules 18 and 19 located tangentially to the path of travel of the head 25 and its top ferrule 17 located inwardly of the turret 26 relative to the side ferrules 18, 19.

The reflector section 2 is firmly clamped down and held in proper seated position on the seating pads 60 by a plurality (three in the particular case illustrated) of pivoted spring-loaded reflector hold-down or clamp arms 63 which are located above the head base plate 58 and are spaced apart around the rim of the reflector-receiving opening 59 therein. The clamp arms 63 are rotatably mounted on the head base plate 58 for rotation about a vertical axis between an inoperative position (shown in solid lines in FIG. 6) swung clear of the sealing rim 20 of a reflector section 2 positioned in the reflector holder 25 and an operative position (shown in dash-dot lines in FIG. 6) overlying the sealing rim 20 of the reflector section. To this end, and as shown more particularly in FIG. 19, each of the reflector clamp arms 63 is fastened on the projecting upper end of a vertically extending pivot shaft or spindle 64 extending through and rotatable about its axis within the head base plate 58. The spindles 64 and associated clamp arms 63 are continuously urged downwardly, to thereby yieldingly clamp the reflector section 2 in place on the seating pads 60, by the force of compression coil springs 65 which are positioned over the respective spindles 64 and are compressed between a collar or head 66 on the lower end of each spindle 64 and the upper end of a downwardly opening well or recess 67 formed in the underside of the head plate 58. A V-shaped cross slot 68 is formed in the underside or lower end of the collar 66 on each clamp arm spindle 64 to permit the insertion therein of a chisel-ended drive pin 69 for rotating the spindle so as to swing the clamp arm 63 thereon between its operative and inoperative positions. The clamp arms 63 are locked in their inoperative oriented position, against rotative displacement therefrom, by the engagement of locking pins 70 (FIG. 5) projecting laterally from the clamp arm spindles 64, within respective V grooves 71 formed in the upper side of the spindle bushing plates 72 which are fastened to the upper side of the head base plate 58. Locking pins 70 are held down in the V grooves 7 by the force of the compression coil springs 65 which act on the clamp arm spindle 63 to continuously urge them downwardly. The positive locking of the clamp arms 63 in their inoperative or swung-out oriented position by means of the interengaged locking pins 70 and grooves 71 thus assures that the reflector holders 56 will be clear for the insertion or loading of a reflector section 2 thereinto at the reflector loading station of the apparatus.

Each of the work-supporting heads 25 of the apparatus is provided with a reflector height gauge means 75 (FIGS. 5, 6, and 21) comprising a vertically adjustable gauge post 76 which is adapted to be set with its flat upper end surface 77 in predetermined elevational relation to the focal plane a—a of each individual reflector section 2 positioned in the head. As shown more particularly in FIG. 21, the gauge post 76 of the reflector height gauge means 75 is vertically slidable within a flanged collar 78 fastened to and upstanding from the upper side of the head base plate 58 at a location adjacent the reflector-receiving opening 59 therein, and it is locked against rotative movement relative to the collar 78 by a locking key 79 fastened on the collar 78 and having a close sliding fit within a vertically extending keyway 80 in the gauge post 76. The gauge post 76 is formed with a screw-threaded downwardly opening vertical bore 81 into which is screwed the threaded upper end 82 of a vertically extending elevating screw 83 rotatable within the head base plate 58 and the collar 78 thereon. A compression coil spring 84 within the bore opening 81 of the collar 78 is spring-pressed between an internal shoulder 85 on the collar 78 and an external flange 86 on the lower end of the gauge post 76 to thereby continuously exert downward spring pressure on the gauge post serving to hold the internal screw-threads 81 thereof tightly down against the screw-threads 82 on the elevating screw 83 and, in turn, hold the elevating screw down in place at all times with its annular flange 83' spring-pressed down against the upper surface of the head base plate 58. The elevating screw 83 is maintained in fixed elevational position at all times relative to the head base plate 58 by a close tolerance fit of its annular flange 83' between the upper surface of the head base plate 58 and the annular shoulder 81' formed in the bore 81 by a counterbore at its lower end. The elevating screw 83 extends downwardly through and projects from the underside of the head base plate 55, and its projecting lower end has a crank arm 87 fastened thereon and provided with a downwardly depending crank pin 88 which is offset from the axis of rotation of the elevating screw 83 and is adapted to be engaged by a corresponding crank pin 89 on the crank arm 90 of a gauge post setting mechanism 91 (FIG. 20) located beneath the turret 26 at station H thereof. Rotation of the crank arm 87 and elevating screw 83 in a clockwise direction, as viewed from above, causes the gauge post 76 to move upwardly relative to the vertically fixed elevating screw 83 by virtue of the screw-threaded engagement therebetween and the locking of the gauge post against rotation by the engagement of the locking key 79 within the keyway 80 in the gauge post. The pitch of the intermeshed screw threads on the gauge post 76 and elevating screw 83 are such that the elevating screw 83 need be rotated through a portion only of one complete revolution thereof, e.g., through a range from a minimum of approximately 50° to a maximum of approximately 315° of rotation, in order to set the gauge post 76 to its proper gauging height for any given one of the particular type of reflector sections 2 being processed in the apparatus, the range of rotational movement of the elevating screw 83 being that which will normally compensate for all the variations encountered in the height of the reflected focal plane from one reflector section to the next positioned in the head 25.

The wire lead holder 57 of each head 25 is comprised of a vertically elongated metal housing 92 of generally rectangular shape in cross section and of small enough overall size to pass freely down through the reflector-receiving opening 59 in the reflector holder 56, as shown in FIGS. 5 and 6. The lead holder 57 is bolted or otherwise suitably fastened at its upper end to a horizontal flange or bracket arm 93 on a slide 94 which is mounted for vertical sliding movement on a pair of vertically extending slide rods 95 that are mounted on the head portion 96 of a carriage 97 which, in turn, is mounted on the turret 26 for horizontal sliding movement thereon radially of the turret. To this end, the carriage head portion 96 is provided with a pair of horizontally extending slide rods 98 which are disposed one above the other and extend radially inward of the turret from the carriage head portion 96 and are slidably mounted within spaced arms 99 and 100 on a carriage support or slide bearing 101 fastened on the upper side of the head base plate 58. The carriage 97 is horizontally slidable on its support bearing 101 between a retracted position as shown in FIG. 4 wherein the lead holder or carrier 57 is located inwardly of the turret 26 from the reflector holder 56 so as to be entirely clear of the latter to permit, among other things, the loading of a reflector section 2 thereinto, and an advanced position as shown in FIGS. 5 and 6 wherein the wire lead holder 57 is vertically aligned with the reflector-receiving opening 59 in the reflector holder 56 and holds the wire leads 7 to 11 in proper position for the brazing thereof into the metal thimbles 17, 18, and 19 of a reflector section 2 positioned in the reflector holder 56. The advanced position of the carriage 97 is determined by the engagement of the head portion 102 of an adjustable stop pin 103 on the carriage head portion 96 with the inward side of the arm 100 of the carriage support bearing 101. The stop pin 103 extends inwardly of the turret 26 from the carriage head portion 96 in a direction parallel to the slide rods 98 of the carriage 97, and it passes through a passageway in the arm 100 of carriage support bearing 101.

The horizontal sliding movement of the carriage 97 and the positioning thereof in its retracted and advanced positions is under the control of various cam tracks, as described hereinafter, which extend around the turret 26 and engage with a carriage positioning roller 104 mounted on the top of the carriage head portion 96. The roller 104 is carried on an upstanding arm of a spring-loaded lever 105 which is pivoted on the carriage head portion 96 for pivotal movement in a vertical plane radially of the turret 26. The lever 105 is spring-biased in a counterclockwise directed as viewed in FIG. 5, to yieldingly hold the end 106 of an inwardly extending horizontal arm 107 of the lever in abutting engagement with the top of the carriage head portion 96, by the force of tension coil springs 108 connected at their opposite ends to respective spring posts on the carriage head portion 96 and on the horizontal arm 107 of the lever 105. The spring-loading of the lever 105 carrying the roller 104 permits a limited amount of over-travel of the roller 104 horizontally outward of the turret 26 by the associated cam track, when the carriage 97 is moved to and held in its advanced position, to thereby assure that the head 102 on stop pin 103 will be maintained in abutting engagement with the arm 100 of carriage support bearing 101 so as to positively maintain the carriage 97 in its correct fully-advanced position at such time. Safety catch means 109 may be provided on the work-supporting head 25 to positively hold the carriage 97 in its retracted inoperative position during the travel of the head through certain of the work stations of the apparatus as well as under certain faulty operating conditions of the apparatus as, for example, where a reflector section 2 is for some reason or other missing from the head 25, in which case the advance of the wire lead 7 to 11 into their final brazing position by the lead carrier or holder 57 is unnecessary and undesirable. When such a condition occurs, the portion of the cam track which normally engages with the roller 104 on the carriage 97 to move the latter to its advance position may be arranged to be raised out of the path of the roller 104 so as not to engage therewith. The safety catch means 109 shown comprises a spring-loaded latch lever 110 pivotally mounted on the top of the arm 100 on the carriage support bearing 101 and having a downwardly facing tapered cam end 111 leading to a notch 112 in the latch lever 110 adapted to receive and catch behind the head of a stop screw 113 adjustably mounted on the carriage head portion 96, to thereby hold the carriage 97 in its retracted or inward position. The pivoted latch lever 110 is spring-biased to its normal latching position, as determined by the engagement of a stop pin 114 fastened on one end of the pivoted latch lever with the top end 115 of the arm 100 on the carriage support bracket 101, by means of a compression coil spring 116 which is compressed between the other end of the latch lever 110 and the top end 115 of the carriage support bracket 101.

The lead holder or carrier 57 is movable between a raised or upper position as shown in FIGS. 4 and 22 wherein the lead holder, together with the wire leads 7 to 11 held therein, are located completely above the base plate 58 of the head 25 and the reflector holder 56 thereon so as to clear the same for horizontal sliding movement of the carriage 97 between its advanced end retracted positions, and a lower position as shown in FIGS. 1 and 5 wherein the lead holder 57 extends down through the reflector-receiving opening 59 of the reflector holder 56. The lower position of the lead holder 57 is determined by the engagement of the slide 94 with an adjustable stop pin 117 fastened on the head portion 96 of the carriage 97. The raised or upper position of the lead holder 57 is determined by the engagement of a horizontally extending spring-loaded latch bolt 118 within a notch opening 119 in the back or inward face of the slide 94 on which the lead holder 57 is mounted. The latch bolt 118 is mounted for horizontal sliding movement in the carriage head portion 96, and it is spring-biased in a direction radially outward of the turret 26 by a tension coil spring 120 connected between spring posts 121 and 122 on the carriage head portion 96 and latch bolt 118, respectively. Disengagement of the latch bolt 118 from within the notch opening 119 of the slide 94 to free the latter for downward movement to its lower position, is effected by the engagement of a roller 123 on the upper end of a vertically extending lever 124 with a stationary cam track on the machine, as described hereinafter. The lever 124 is pivotally mounted on the back side of the carriage head portion 96, by means of a pivot pin 125, for pivotal movement in a vertical plane extending radially of the turret 26, and it is pivotally connected at its lower end to the latch bolt 118 by means of a pin and slot connection, the spring post 122 on the latch bolt 118 to this end having a snug sliding fit within an open-ended slot 126 in the lower end of the lever 124. The slide 94, with its associated lead holder 57, is not allowed to drop of its own free weight down to its lower position into engagement with the stop pin 117 upon disengagement of the latch bolt 118 from within the notch opening 119 in the slide 94, but instead is carried slowly down to its lower position by separate lowering mechanisms 127 (FIG. 5) located at each of those work stations A and O of the apparatus at which the latch bolt 118 is disengaged from the notch opening 119 in the slide 94 to permit the lowering thereof. In the same manner, the upward return movement of the slide 94 and associated lead holder 57 to their raised or upper position is effected by separate raising mechanisms 128 (FIG. 27) located at each of the work stations E and U of the apparatus. The lowering and raising mechanisms 127 and 128 are adapted to engage with a roller 129, rotatably mounted on the slide 94, to impart the lowering and raising movements thereto.

As shown more particularly in FIGS. 7 and 8, the wire lead holder or carrier 57 of each head 25 is provided with a horizontally disposed apertured bottom plate 130 fastened to and closing off the open lower end of the housing 92 and formed with a plurality of vertically extending through apertures 131 for snugly receiving therein and locating the respective wire leads 7, 8, . . . etc., in the approximate parallel positional interrelationship which their filament and shield-carrying ends are to occupy in the reflector section 2 after the brazing of the wire leads thereinto. The wire leads 7, 8, . . . etc., are gripped and held in place within the apertures 131 by means of cooperating pairs of clamping jaws located within the housing 92, each jaw pair being comprised of a stationary or anvil jaw 132 common to all the jaw pairs, and cooperating spring-loaded pivoted jaws 133, 134, 135, 136, and 137 corresponding to respective ones of the wire leads 7, 8, 9, 10, and 11 to be clamped thereby. The stationary jaw 132 is formed by an integral cross rib in the housing 92 bridging the lower end thereof, and it is formed with vertically disposed jaw faces 138, 139, and 140 on its opposite sides against which the wire leads 7, 8, . . . etc., are firmly clamped by the pivoted jaws 133, 134, . . . etc., which, for the such purpose, are formed with serrated jaw faces 141. The stationary jaw 132 is formed at its upper end with lips 142 projecting from the respective jaw faces 138, 139, and 140 and formed with notches 143 therein for snugly receiving the wire leads 7, 8 . . . etc., so as to locate them, when clamped in place against the jaw faces 138, 139, and 140, in the exact parallel positional interrelationship which their filament and shield-carrying ends are to occupy in the reflector section 2 after the brazing of the wire leads thereinto. The pivoted jaws 133, 134, . . . etc., of which there is a separate one for each of the wire leads 7, 8, . . . etc., are pivoted on horizontal pivot shafts 144 mounted within the housing 92, for pivotal movement in vertical planes normal to the jaw faces 138, 139, and 140, and they each have fastened thereto an upwardly extending spring-actuating arm 145 each having a cam roller 146 mounted thereon adjacent its upper end. The opening and closing movements of the pivoted jaws 133, 134, . . . etc., are controlled by a rotatable plate or edge cam 147 fixed on a horizontal cam shaft 148 journalled in the housing 92 and having cam-shaped edge portions 149 engaging the cam rollers 146 on the spring arms 145 of the pivoted jaws. The cam rollers 146 are continuously held in engagement with the plate cam 147 by the force of respective tension coil springs 150 connected to the upper ends of the spring arms 145. The cam shaft 148 projects outwardly of the housing 92 at the front side thereof and has an actuating lever 151 fastened thereon at one end and provided with a convex or ball-shaped roller 152 at its other end. Stop pins 153 and 154 fastened on and protruding outwardly from the housing 92 limit the pivotal swinging movements of the actuating lever 151 to thereby locate the plate cam 147 in its respective jaw opening and jaw closing positions. The open and closed positions of the pivoted jaws 133, 134, . . . etc., are determined by the engagement of the cam rollers 146 with the low and high portions, respectively, of the cam edge surfaces 149 on the plate cam 147. The actuating lever 151 is located in its "upper" swung position as shown in FIG. 7 when the pivoted jaws 133, 134, . . . etc., are closed, and in its "down" swung position when the pivoted jaws are open.

The start of the full cycle of operation of the apparatus according to the invention begins at station A upon index thereto of each work-supporting head 25 of the apparatus. At such time, the carriage 97 of the head 25 and the associated wire lead holder or carrier 57 are in their advanced position as determined by the engagement of the head 102 on stop pin 103 with the arm 100 on the carriage support bearing 101, the carriage 97 having been moved to such advanced position from its retracted position during the index movement of the head 25 to station A by the engagement of the cam roller 104 on the carriage within the downwardly opening outwardly angled cam slot or groove 155 of a stationary overhead cam track 156 (FIGS. 5 and 10) extending between the last work station D' of the apparatus and the first or starting work station A thereof, and being yieldingly held in such advanced position while the head 25 is positioned at station A as well as during the ensuing travel of the head through stations B to E inclusive, by the engagement of the carriage positioning roller 104 with a second stationary overhead cam track 157 extending part way around the apparatus (i.e., from stations A to E) concentrically about the axis of rotation of the turret 26. The carriage outward transfer cam track 156 is fastened to and depends from the underside of a support bracket 158 constituting one of a series of horizontally extending generally similar support brackets which are fastened to the periphery of a stationary overhead table 159 and extend radially outward therefrom at the adjacent pairs of stations D'-A, E-F, I-J and U-V, respectively, of the apparatus. Likewise, the carriage outward position holding cam track 157 is fastened to and depends partly from the bracket 158 at station D'-A and the similar bracket at station E-F, and partly from a series of additional horizontally extending generally similar support brackets 160 (FIG. 11) which are fastened to the periphery of the table 159 and extend radially outward therefrom at stations B and D. As shown in FIG. 4, the stationary overhead table 159 rests on and is fastened to the upper end of the hollow upstanding center column portion 28 of the machine base frame 29. Also at the time of the index of each head 25 to the first work station A of the apparatus, the wire lead gripping jaws 132 and 133, 134, . . . etc., of the wire lead holder 57 are in their open position, in readiness for the insertion thereinto of a group of the wire leads 7, 8, . . . etc., that are to be brazed into a reflector section 2 which is to be subsequently loaded into the head 25. In the open position of the wire lead gripping jaws of the lead holder 57, the jaw actuating lever 151 thereof is in its downwardly swung position, as shown in solid lines in FIG. 5.

As indicated in FIG. 1, the operation that takes place at station A is the lowering of the wire lead holder or carrier 57 to its down or lowered position as shown in FIG. 5, in readiness for the pick-up thereby of the group of wire leads 7, 8, . . . etc., at the next station B. During the index movement of each head 25 to the first station A, the slide 94 and associated wire lead holder 57 initially are held in their raised or upper position by the latch bolt 118 which at that time is engaged within the notch opening 119 of the slide 94. However, during the very last portion of the index movement of the head 25 to station A, the latch bolt 118 is retracted to disengage it from within the notch opening 119 of the slide 94 and thus free the slide and associated wire lead holder 57 for downward movement to their lower position for pick-up of the group of wire leads 7, 8, . . . etc., at the next station B. The retraction of the latch bolt 118 is effected by the engagement of the roller 123 on the operating lever 124 of the latch bolt with a stationary block cam 161 which is fastened to the underside of the support bracket 158 located at station A of the apparatus, the cam 161 acting to pivot the lever 124 so as to retract the latch bolt 118 and free the slide 94 for downward movement just as the head 25 arrives at station A. Simultaneously with the arrival of the head 25 at station A and the freeing of the slide 94 and wire lead holder 57 for downward movement, the roller 129 on the slide 94 rides onto the catch finger 162 of a spring-biased pivoted latch 163 (FIG. 5) which then supports the slide 94 and wire lead carrier 57 in their raised position, and prevents the free fall or dropping of the slide and wire lead holder to their lower position upon the retraction and disengagement of the latch bolt 118 from the slide 94 at station A. The pivoted latch 163 forms a part of the lowering mechanism 127 at station A for the slide 94 and wire lead holder 57, which lowering mechanism then operates, during the ensuing dwell of the head 25 at station A, to lower the slide 94 and associated wire lead holder 57 to their lowered or wire lead pick-up position as determined by the engagement of the slide 94 with the stop pin 117. The lowered slide 94 and wire lead holder 57 then remain in their "down" or lowered operating position throughout the ensuing travel of the head through stations B, C, and D as well as to station E where they are then raised and returned to their upper inoperative position once again.

Referring to FIGS. 5, 12, and 13 in particular, the lowering mechanism 127 for the slide 94 and wire lead holder 57 additionally comprises a vertically extending slide bar 164 on the lower end of which the swing latch 163 is pivotally mounted by means of a pivot pin 165 to swing in a vertical plane extending radially of the turret 26. The swing latch 163 is spring-biased by a pair of tension coil springs 166 which are connected between spring posts 167 and 168 on the swing latch and slide bar 164, respectively, so that they tend to swing the latch 163 outwardly to a tilted inoperative position to disengage it from and clear the roller 129 on the slide 94 during the upward return movement thereof. The tilted inoperative position of the swing latch 163 is determined by the engagement of its upper heel end with a downwardly facing inclined stop shoulder 169 on the slide bar 164. An L-shaped spring-loaded locking lever 170 is pivotally mounted on the slide bar 164 to swing in a vertical plane radially of the turret 26, and it carries a roller 171 on one of its arms which is adapted to catch behind and engage the upper heel end of the swing latch 163 to lock it in place in its operative roller-engaging position as shown in FIG. 5. The locking lever 170 is normally held in its locking position, with its roller 171 caught behind the heel end of the swing latch 163, by the force of a pair of tension coil springs 172 which are connected between spring posts on the locking lever and the slide bar 164, respectively. The other arm 173 of the locking lever 170 extends horizontally in a direction radially outward of the turret 26 for engagement by the trip lever 174 of a slide bar disconnect means 175 as described hereinafter.

The slide bar 164 of the lowering mechanism 127 for the slide 94 and wire lead holder 57 is mounted for vertical sliding movement within a slide bearing 176 on the outer end of the overhead support bracket 158, and it is raised and lowered by an overhead operating lever 177 which extends radially of the turret 26 and more or less horizontally above the upper table 159 and support bracket 158 and is pivotally mounted intermediate its ends on the support bracket 158, by means of pivot pin 178, for swinging movement in a vertical plane extending radially of the turret. The lever 177 is formed with a forked outer end the arms 179 of which straddle an enlarged cylindrical upper end portion 180 of the slide bar 164 and carry opposed rollers 181 on their facing inward side which are rotatably mounted on the arms 179 on pivot pins 182. The rollers 181 are located on diametrically opposite sides of the cylindrical upper portion 180 of the slide bar 164 for engaging with a collar 183 thereon located above the rollers. The slide bar 164 is continuously urged downwardly, to hold the collar 183 thereon in engagement with the rollers 181 on the operating lever 177 and thus move the slide bar 164 downwardly as permitted by the downward swinging movement of the operating lever 177, by the force of a pair of tension coil springs 184 which are connected at one end to the pivot pins 182 for the rollers 181 on the arms 179 of the operating lever 177 and at their other ends to spring posts 185 extending from the upper end portion 180 of the slide bar 164. The operating lever 177 is pivoted, to control the vertical movements of the slide bar 164, by the engagement of a roller (not shown) rotatably mounted on the inner end of the lever within an outwardly facing annular roller-receiving groove 186 (FIG. 4) in an upper collar 187 fastened on the upper end of a master actuating rod 188 which extends through and is vertically reciprocable within the hollow center column 28 of the apparatus. The master actuating rod 188 also serves as a common actuating means for the work-performing mechanisms at certain other of the work stations of the apparatus, which mechanisms are actuated by respective operating levers similar to operating lever 177 and provided at their inner ends with rollers engaged within the roller groove 186 of the collar 187. The master actuating rod 188 is vertically reciprocated in timed relation to the index movements of the turret 26, so as to actuate the operating lever 177 and all the other operating levers connected thereto during each dwell period of the turret, by means of a master actuating lever 189 (FIGS. 1 and 4) which is pivotally connected to the lower end of the actuating rod and is pivotally mounted intermediate its ends on the machine bed 45 for pivotal movement in a vertical plane extending radially of the turret 26. To this end, the lever 189 is fastened on a pivot shaft 190 journaled in an upstanding bearing bracket 191 mounted on the machine bed 45, and it is formed with a forked inner end the arms 192 of which span the lower end of the actuating rod 188 and carry rollers 193 which are received within and ride in an outwardly facing annnular groove 194 in a collar 195 fastened on the lower end of the actuating rod 188. The outer end of the actuating lever 189 carries duplicate cam rollers 196 which are received within and ride in identical cam grooves in the opposed faces of a pair of identical face cams 197 fastened on the main drive shaft 34 of the apparatus. The master actuating rod 188 is raised, through the action of the cams 197 and lever 189, so as to actuate the various work-performing mechanisms of the apparatus that are controlled thereby as soon as each index movement of the turret 26 is completed, and it is then lowered to return these work-performing mechanisms to their initial or starting position just before the start of the next index movement of the turret.

As soon as the wire lead holder or carrier 57, during the lowering thereof by the lowering mechanism 127, reaches its "down" or lowered position as determined by the engagement of the slide 94 with the stop pin 117, further downward movement of the slide bar 164 and its associated latch 163, as permitted by the continued downward movement of the forked end 179 of the operating lever 177, is then terminated by the engagement of the lower end or stop shoulder 198 of the enlarged cylindrical upper end portion 180 of the slide bar 164 with the upper end 199 of the slide bearing 176 on the support bracket 158. Continued downward movement or overtravel of the forked outer end 179 of the operating lever 177, following the engagement of the stop shoulder 198 with the top 199 of slide bearing 176 to limit the downward movement of the slide bar 164, then acts to operate the disconnect means 175 of the lowering mechanism 127 through the engagement of a roller 200 on the outer end of an extension 201 on one of the arms of the operating lever 177 with the upper end of a vertically extending spring-loaded push rod 202 mounted for vertical reciprocation within a sleeve bearing 203 fastened to the outer end of the support bracket 158. The push rod 202 is pivotally connected at its lower end to one end of the trip lever 174 which extends generally horizontally and is pivotally mounted on a depending leg 204 on the sleeve bearing 203. The other end of the trip lever 174 carries a striker pin 205 in the form of a screw bolt which is screw-threaded into the lever and is adapted to strike against the horizontal arm 173 of the locking lever 170, when the push rod 202 is depressed by the operating lever 177, to pivot or trip the lever 170 so as to disengage the roller 171 thereon from behind the heel of the swing latch 163, thus freeing the latter for outward pivotal movement by the springs 166 to disengage it from the roller 129 on the slide 94 and so disconnect the lowering mechanism 127 therefrom so that it is then free to return upwardly to its initial starting position without lifting the slide 94 and wire lead holder 57 along therewith. The trip lever 174 is normally held in a downwardly tilted inoperative position, in which the striker pin 205 is just out of engagement with the arm 173 of the locking lever 170 when the slide bar 164 and associated swing latch 163 are in their "down" or lower position, by the force of a pair of tension coil springs 206 which are connected at one end to spring posts 207 on the sleeve bearing 203 and at their other ends to spring posts 208 on a stop collar 209 fastened on the push rod 202. The downward tilted inoperative position of the trip lever 174 is determined by the engagement of the stop collar 209 on the push rod 202 with the lower end of the sleeve bearing 203.

Following the disengagement of the swing latch 163 from the roller 129 on the slide 94 by the operation of the disconnect means 175 to thereby disconnect the lowering mechanism 127 from the slide 94 and thus free it for upward return movement, the lowering mechanism 127 is then raised and returned to its initial starting position during the last portion of the dwell of each work-supporting head 25 at station A by the return stroke of the operating lever 177, through the spring pressure engagement of the rollers 181 with the collar 183 on the vertical slide bar 164. During this upward return movement of the lowering mechanism 127, the spring posts 167 on the swing latch 163 strike against the ears 210 of a U-shaped fixed stop 211 fastened on the depending leg 204 of the sleeve bearing 203 to thereby swing the latch 163 back to its "down" or righted operative position and permit the locking lever 170 to be pivoted by the springs 172 so as to cause the roller 171 to catch behind the heel of the swing latch 163, thus locking and resetting the latter in its righted or operative position once again for subsequent engagement with the roller 129 of the next head 25 to be indexed to station A. The raised or initial starting position of the lowering mechanism 127 is determined by the pivotal position of the operating lever 177, as controlled by the master actuating rod 188, at the beginning and end of each dwell period of the turret 26, and by the spring pressure engagement of the collar 183 on the slide bar 164 with the rollers 181 on the lever 177.

Also during the dwell of each head 25 at station A, the adjustable gauge post 76 thereof is returned or screwed downwardly to a lowered starting position somewhat below the lowest operative gauging position to which it might be set during the normal use of the apparatus. This lowering or downward retraction of the gauge post 76 is effected by gauge retracting mechanism 212 (FIG. 9) located at the first work station A of the apparatus and comprising an upstanding crank pin 213 on one end of a horizontally extending crank arm 214 which is fastened at its other end on the upper end of a vertical shaft 215 vertically aligned with the gauge post elevating screw 83 and rotatably mounted in vertically spaced arms 216 of a support bracket 217 mounted on a lower table 218 (FIG. 4) integral with the base frame 29 and underlying the turret 26. The crank pin 213 is adapted to engage the corresponding crank pin 88 on the crank arm 87 of the height gauge elevating screw 83, on rotation of the shaft 215 and crank arm 214, to effect corresponding rotation of the crank arm 87 and elevating screw 83 along with the shaft 215 and crank arm 214. Rotation of the crank arm 87 and elevating screw 83 in a counterclockwise direction, as viewed from above, causes the gauge post 76 to move downwardly and retract into its surrounding collar 78. During the dwell of each head 25 at station A, therefore, the shaft 215 and crank arm 214 of the height gauge retracting mechanism 212 are rotated in a counterclockwise direction through a portion of a revolution, e.g., approximately 315°, sufficient to lower and return the gauge post 76 in each case to the same initial starting position, irrespective of whatever elevated gauging position the gauge posts 76 may have been set to during the previous cycle of operation of the apparatus. The lowered starting position of the gauge post 76 is determined by the limit of the counterclockwise rotational throw of the crank arm 214, and in such starting position of the gauge post 76 there is at least some slight clearance between its lower end and the flange 86 on the elevating screw 83, as shown in FIG. 21, so that the gauge post 76 will not abut and bind thereagainst during its downward retraction by the gauge retraction mechanism 212. After completion of the downward retraction of the gauge post 76 to its lowered starting position by the gauge retraction mechanism 212, the shaft 215 and crank arm 214 thereof are then rotated back to their initial oriented position before the start of the index movement of the head 25 in order to thereby move the crank pin 213 out of the way of the crank pin 88 on the crank arm 78 so as not to interfere therewith, and thus cause rotational displacement thereof from its set starting position, during the ensuing index movement of the head.

The rotative oscillating movement of the crank shaft 215 and crank arm 214 of the gauge retracting mechanism 212 to effect the downward retraction of the gauge post 76 to its lowered starting position is effected through a gear drive arrangement comprising a small spur gear 219 fastened on the lower end of the vertical crank shaft 215 and intermeshed with a large spur gear 220 fastened on a vertical drive shaft 221 which is also rotatably mounted in the two arms 216 of the support bracket 217. The shaft 221 has a crank arm 222 fastened to its lower end and pivotally connected by a horizontal connecting link 223 to the upper end of a more or less vertically extending cam-actuated operating lever 224 which is pivotally mounted at its lower end, for swinging movement in a vertical plane, on a pivot pin 225 extending from a support bracket 226 mounted on the machine bed 45. Intermediate its ends, the operating lever 224 carries a cam roller 227 which is engaged within the cam groove of a face cam 228 fastened on the main drive shaft 34 of the apparatus.

Following the lowering of the wire lead holder or carrier 57 of the head 25 to its lowered operating position and the downward retraction of the gauging post 76 thereof to its lowered starting position at station A, the head is then indexed to station B where a set 230 of five straight wire leads or supports 7, 8, 9, 10, and 11 are loaded into the wire lead holder 57 and clamped in place therein. The wire leads 7, 8, . . . etc., may be fed into the wire lead holder 57 either manually or with the aid of automatically operating wire loading mechanism 231 such as shown in FIG. 11, or entirely by automatically operating mechanism 231 which may comprise the wire loading mechanism 231 coupled together with an automatically operating wire feeding mechanism similar, for example, to that disclosed in U.S. Pat. 3,143,246, Hager, and comprising, in general, individual wire feeding tubes or chutes into which the individual wire leads are discharged by the wire feeding mechanism and are then directed down into respective wire-receiving pockets in the wire lead holding means of the loading mechanism. The particular wire loading mechanism 231 illustrated in FIG. 11 comprises a horizontally disposed indexing spider wheel or turret 232 which is slidably mounted for vertical reciprocation on a vertically extending indexing shaft 233 and is formed with a plurality (four in the particular case shown) of equally spaced radially extending arms 234 each provided adjacent its outer end with a group of five wire-receiving openings or pockets in its upper side for snugly receiving respective ones of a set 230 of the five wire leads 7, 8, . . . etc., and supporting them in upright position approximately in the same positional interrelation they are to finally occupy in the wire lead holder 57. The wire loading turret or spider 232 is indexed in timed relation to the index movements of the main turret 26 of the apparatus to carry the wire-carrying outer end of each turret arm 234 successively from a wire-receiving station, where a set 230 of the five wire leads 7, 8, . . . etc., are inserted in the wire-receiving pockets of the particular turret arm 234 located thereat, either manually or by an automatically operating wire feeding mechanism as referred to above, through an idle station and thence to a wire-introducing or loading station, diametrically opposite the wire-receiving station, where the set 230 of five wire leads 7, 8, . . . etc., are located directly beneath the wire lead holder 57, at which time the turret or spider 232 is then raised to introduce and load the set 230 of five wire leads 7, 8, . . . etc., into the wire-receiving apertures 131 of the wire lead holder 57 in which they are then clamped by the closure of the jaws 132 to 137 thereof. The wire lead loading turret or spider 232 and the vertical shaft 233 on which it is slidably mounted but rotatively interlocked therewith, may be indexed by any suitable type indexing means, such as by a conventional type Geneva gear drive arrangement driven from the main drive shaft 34 of the apparatus.

The raising and lowering movements of the wire lead loading turret or spider 232, during the dwell of each head 25 of the main turret 26 at station B, is effected by a generally horizontally extending operating lever 235 which is pivotally mounted for swinging movement in a vertical plane on a pivot pin 236 carried by a support bracket 237 mounted on the machine bed 45. The operating lever 235 is formed with a forked end the two arms of which span a hub 238 on the turret 232 and carry rollers 239 which are snugly received within and ride in an annular groove 240 in the hub 238 to thereby pivotally connect the lever 235 to the wire lead loading turret 232. The other end of the operating lever 235 is pivotally connected by a vertically extending connecting rod 241 to a cam-operated actuating lever (not shown) which is pivotally mounted on the machine frame and is actuated by a cam (not shown) fastened on the main drive shaft 34 of the apparatus to effect first the raising of the turret 232 to its operative wire loading position to insert the set 230 of wire leads 7, 8, . . . etc., into the overlying wire lead holder 57 just after the latter is indexed to and positioned at station B and to then effect the downward movement and return of the turret 232 to its lowered inoperative position, following the clamping of the wire leads in the holder 57, to thereby withdraw the wire leads 7, 8, . . . etc., from the pockets in and free them from the turret 232 prior to the start of the next index of the wire lead holder 57 away from the wire lead loading station A of the apparatus.

At the time the wire lead holder 57 is indexed to the wire lead loading station B and at the outset of its dwell interval thereat, the pivotable wire lead gripping jaws 133 to 137 of the wire lead holder are held in their open position, separated from the stationary jaw 132 thereof, by the pull of the coil springs 150 against the upper ends of the respective spring arms 145 attached to the pivoted jaws 133 to 137. However, as soon as the wire lead loading turret 232 is raised to insert the upper ends of the set 230 of wire leads 7, 8, . . . etc., into the wire lead holder 57, in position to be clamped against the stationary jaw 132 thereof by the pivoted jaws 133 to 137, the latter are pivoted to their closed position, to clamp the inserted wire leads 7, 8, . . . etc., firmly in place against the stationary jaw 132 of the wire lead carrier 57, by the rotation of the plate cam 147 so as to cause the high portion of its cam surfaces 149 to engage the cam rollers 146 on the spring arms 145 of the pivoted jaws 133 to 137 and thereby swing the said jaws to their closed position. The rotation of the plate cam 147 at this time, to effect the closing of the pivoted jaws 133 to 137 of the wire lead holder 57 and the clamping therein of the set 230 of wire leads 7, 8, . . . etc., is produced by the upward movement and engagement of striker finger 242 (FIG. 11) on the lower end of a spring-loaded vertical actuating rod 243 against the ball end 152 of the jaw actuating lever 151 of the wire lead holder 57 so as to swing it to its upper or jaw closing position, as shown in dash-dot lines in FIGS. 5 and 11. The actuating rod 243 is mounted for vertical reciprocation in a sleeve bearing 244 fastened on the support bracket 160 at station B of the apparatus, and it is normally held in its lowered inoperative position, with its striker finger 242 beneath and disengaged from the ball end 152 of the jaw operating lever 151 when the latter is in its lower or jaw-opened position, by the pull of a pair of tension coil springs 245 respectively connected at their opposite ends to the actuating rod 243 and to the sleeve bearing 244. The lowered inoperative position of the actuating rod 243 and its striker finger 242 is determined by the engagement of a stop collar 246 thereon with the upper end of the sleeve bearing 244. Upward movement of the actuating rod 243 to cause the finger 242 thereon to strike against the actuating lever 151 and pivot it so as to close the movable jaws 133 to 137 of the wire lead holder 57, is effected by the master actuating rod 188 acting through a pair of articulated overhead operating levers 247 and 248 (FIG. 5) which have a pin-and-slot type pivotal interconnection and are respectively pivoted intermediate their ends on support brackets 249 and 250 upstanding from the support bracket 160 and the inner one of which, i.e., lever 248, carries a roller engaged within the annular groove 186 in the collar 187 on the upper end of the master actuating rod 188. The outer end of the outer operating lever 247 is forked to provide spaced arms 251 thereon (FIG. 11) which span the upper end of the actuating rod 243 and are adapted to engage an overlying collar 252 fastened on the upper end of the actuating rod 243 to thereby lift it so as to effect the closure of the movable jaws 133 to 137 of the wire lead holder 57 when the articulated operating levers 247, 248 are actuated by the master actuating rod 188 during the dwell of each head 25 at station B.

To assure the positive holding of the wire lead holder or carrier 57 down in its lowered position against the stop pin 117, in proper position for the pick-up of the set 230 of wire leads 7, 8, . . . etc., from the wire lead loading turret 232 at station B, the roller 129 on the slide 94 of each head 25, on index thereof to and positioning at station B, rides into and becomes trapped between a pair of stationary cam tracks 253 and 254 (FIG. 11) fastened on a bracket 255 depending from the overhead support bracket 160. This then prevents any accidental upward movement or displacement of the slide 94 from engagement with the stop pin 117 during the dwell of each head 25 at station B, with resulting incorrect positioning and clamping of the wire leads 7, 8, . . . etc., in place in the wire lead carrier 57.

With a set 230 of the wire leads 7, 8, . . . etc., now loaded and clamped in place in the wire lead holder or carrier 57 of a head 25 at station B, the head is then indexed to station C where conventional type detector means (not disclosed herein) may be provided for detecting the absence of any one of the five wire leads 7, 8, . . . etc., from the wire lead holder 57 of the head and releasing the remaining wire leads from the wire lead holder 57 if one or more is missing, the released wire leads falling into guide chutes which then direct them into suitable storage receptacles.

From station C, each head 25 is next indexed to station D where the four straight wire leads 7, 8, 9, and 10 which are held in the wire lead holder 57 and which are to support the two filaments 5, 6 of the finished lamp, are respectively bent or formed to their final individual offset shapes by wire bending mechanism 255 located thereat, as shown in FIGS. 15 and 16. In this wire reshaping operation, the portions of the four wire leads 7 to 10 projecting downwardly from the wire lead holder 57 are bent in parallel planes to their respective offset shapes by the wire bending mechanism 255. The reshaped wire leads 7 to 10 are then individually rotated at the next station E, about their respective filament connection ends held in the holder 57, to swing their projecting offset outer ends 7', 8', 9', and 10' to, and locate them in the exact position they are to finally occupy relative to one another and to the fifth wire support 11 in the finished lamp. This manner of effecting the reshaping and desired final orientation of the reshaped leads 7 to 10 for the brazing thereof into the thimbles 17 to 19 of the reflector section 2 makes it possible to perform the wire lead reshaping operation in one single simultaneous bending operation on all four wire leads 7 to 10 at once, thereby greatly simplifying the apparatus heretofore customarily employed to perform this operation as disclosed, for example, in the aforementioned U.S. Pat. 2,932,877, Pakish et al.

Referring to FIGS. 15 and 16, the wire bending mechanism 255 according to the invention comprises a vertically movable slotted die block 256 fastened on a V-slide 257 which is vertically slidable within a V-guideway 258 in a stationary slide block 259 mounted on the upper end of a vertical support post 260 upstanding from the machine bed 45. The vertical side walls 261 of the die block 256 are formed with flat opposing vertical inside faces which are spaced apart a slight distance to form a slot-like vertical passageway or slideway 262 therebetween for receiving a pair of overlapping wire bending slide jaws 263, 264 to which a combination rocking and sliding movement is imparted to effect the bending of the wire leads 7 to 10 thereby. Also received within the slide jaw passageway 262 of the die block 256, at the top region thereof, is a pair of anvil dies 265 and 266 horizontally offset to one side of each other and formed with respective vertical die faces 267 and 268, which are located in more or less opposed facing relation to receive therebetween the wire leads 7 to 10 depending from the wire lead holder 57, but which are likewise horizontally offset to one side of each other. The die faces 267 and 268 are formed within vertically extending half-round grooves which are adapted to receive the bent end portions of the wire leads 7 to 10 when bent to their final shape by the slide jaws 263, 264. The anvil dies 265 and 266 are adjustably mounted on the die block 256, as by means of fastening bolts 269 slidable in horizontal slots (not shown) in the die block, for horizontal adjustment toward and away from one another to permit the locating of their vertical die faces 267 and 268 and wire-receiving grooves in the exact position and relationship into which the portions of the wire leads 7 to 10 depending from the wire lead holder 57 are to be bent by the wire bending slide jaws 263, 264, this being the positions and relationship occupied by the offset outer end portions 7', 8', 9', and 10' of the respective wire leads 7 to 10. A back-up stop pin 270 is adjustably mounted on the die block 256 to engage with the back end of the anvil dies 265, 266, after they have been set in proper position, to thereby firmly hold them in place, against accidental displacement therefrom, by the force of the wire bending slide jaws 263, 264 when pressing the wire leads 7 to 10 against the die faces 267, 268 of the anvil dies.

Fastened on the top of the die block 256 are a pair of spaced opposed aligning wedges 271 the opposed faces 272 of which are flared upwardly and outwardly away from one another to engage and guide therebetween those opposite bottom edges of the wire lead holder 57 which extend perpendicularly to the plane of bending of the wire leads 7 to 10, so as to accurately align the die block 256 with the wire lead holder 57 when the die block is first raised to its operative wire-bending position (FIG. 4), and then securely hold or retain the die block in such aligned position with the wire lead holder 57 during the ensuing wire-bending operation, against displacement therefrom by the force of the wire bending slide jaws 263, 264 pressing against the respective wire leads 7 to 10 during the bending thereof. In the raised position of the die block 256, as determined by the engagement of the slide 257 with an overlying stop pin 272 mounted on the support block 259, the top sides of the anvil dies 265, 266 are located almost in contact with but spaced a distance approximating the diameter of the wire leads 7, 8, . . . etc., from the horizontally disposed underside or bottom face 273 of the wire lead carrier 57, so that the vertical die faces 267, 268 of the anvil dies, together with the bottom face 273 of the wire lead carrier or holder 57, form in effect opposed 90° L-shaped anvil die pockets into which the wire leads 7 to 10 are bent by the wire-bending slide jaws 263, 264. The die block 256 is moved upwardly to its raised operative position as soon as a head 25 is indexed into position at station D, and it is then held in such raised position until just before the next index of the head away from station D, at which time the die block 256 is then returned to its lowered inoperative position to withdraw the anvil dies 265, 266 from around the wire leads 7 to 11 so as to be clear thereof and not interfere with their subsequent index movement by the head 25 to the next work station E of the apparatus. The vertical movements of the die block 256 are effected by a more or less horizontally extending operating lever 274 pivotally connected at one end, by a vertical connecting link 275, to the V-slide 257 on which the die block 256 is mounted, and pivotally mounted at its other end, for pivotal movement in a vertical plane, on a bracket (not shown) upstanding from the machine bed 45. The operating lever 274 is actuated by a double face cam 276 having a cam groove 277 in one of its faces within which rides a cam follower roller 278 which is pivotally mounted on the operating lever 274 intermediate its ends. The face cam 276 is fastened on the main drive shaft 34 of the apparatus.

As shown in FIG. 14, the slide jaws 263, 264 of the wire bending mechanism 255 are of bar-shaped form and are mounted on the die block 256, within the slot-like slide passageway 262 therein, for combination sliding and pivotal movement in a vertical plane. For such purpose, the slide jaws 263, 264 are each provided with a pair of motion-controlling rollers 279 and 280 rotatably mounted thereon and spaced apart longitudinally thereof and each riding in separate roller-receiving slots 281 and 282, respectively, formed in the vertical side walls 261 of the die block 256. The roller slots 281 and 282 for each slide jaw 263, 264 are inclined upwardly and inwardly of the die block 256 so as to support the two slide jaws in a correspondingly inclined position within the die block 256. The upper roller slots 282, however, are of upwardly arcuate shape so as to impart a rocking motion or pivotal movement of each slide jaw 263, 264, about its respective lower support roller 279, when the slide jaws are moved upwardly and inwardly to effect the bending of the wire leads 7 to 10 thereby. The side faces of the upper end portions of the slide jaws 263, 264 are relieved so as to clear the overlying anvil dies 265, 266 and pass alongside one another when the slide jaws are actuated or raised to bend the wire leads 7 to 10.

The slide jaws 263, 264 are each formed at their upper or nose ends with a pair of wire-bending intersecting right-angled jaw faces 283 and 284 which are respectively disposed generally vertically and horizontally and which respectively extend parallel to the cooperating vertical die faces 267, 268 of the anvil dies 265 and 266, and to the cooperating horizontal under or bottom die face 273 of the wire lead holder 57, when the slide jaws are advanced all the way home to the fully bent position of the wire leads 7 to 10 against the die faces 267, 268, and 273. The vertical jaw faces 283 of the slide jaws 263, 264, like the vertical die faces 267, 268 of the anvil dies 265, 266, are formed with vertically extending half-round wire-receiving grooves which are adapted to receive and trap therein the projecting portions of the wire leads 7 to 10 depending from the wire lead holder 57 as the slide jaws are advanced to engage and bend the wires. In this connection, slide jaw 263 is adapted to bend the two wire leads 7 and 9 against anvil die 265 while slide jaw 264 is adapted to bend the two wire leads 8 and 10 in the opposite direction against the other anvil die 266. The fifth wire lead 11 is not engaged or bent in any way by the wire-bending mechanism 255, and to this end the outer side face of slide jaw 264 is relieved, as shown at 285 in FIG. 15, to accommodate in the space afforded thereby the fifth wire lead 11. The horizontally extending intersecting edges or nose ends formed by the right-angled jaw faces 283, 284 of the slide jaws 263 and 264 are adapted to initially engage the respective wire leads 7 to 10 at those points along the length thereof where the right-angled bends are eventually to be formed therein at the intersections of the vertical die faces 267, 268 with the horizontal die face 273, and to then travel in the arcuate paths of movement of, and along with these bending points of the wire leads, during the further course of the wire bending operation until the completion thereof. These arcuate paths of movement of the nose ends of the slide jaws 263, 264 are imparted thereto by the curvature of the arcuate roller slots 282 which control the pivotal movement of the slide jaws 263, 264 during their sliding movement in the die block 256.

The slide jaws 263, 264 are actuated by respective actuating levers 286 and 287 which extend generally vertically and are pivotally mounted within the slide passageway 262 of the die block 256 on respective horizontal pivot shafts 288 fastened therein so as to pivot in a vertical plane parallel to the plane of sliding movement of the slide jaws 263, 264. Each actuating lever 286, 287 is formed with a yoked upper end the two yoke arms 289 of which span the lower or outward end of the associated slide jaw 263 or 264 and are provided with slots 290 which extend inwardly from the outer ends of the yoke arms and receive the rollers 279 on the slide jaws 263, 264 so as to pivotally connect them to their respective actuating levers 286 and 287. Pivotal movement of the actuating levers 286, 287 to operate the slide jaws 263, 264 is imparted thereto by a lever toggle joint comprising a pair of generally horizontally extending toggle links 291 which are pivotally connected at one end to the lower ends of the actuating levers 286, 287 by means of pivot pins 292 and pivotally connected at their other ends, by a common pivot pin 293, to the upper end of a more or less vertically extending connecting link 294. The lower end of the connecting link 294 is pivotally connected, by pivot pin 295, to one end of a more or less horizontally extending operating lever 296 the other end of which is pivotally mounted, for pivotal movement in a vertical plane, on the same bracket on which the other operating lever 274 for the wire bending mechanism 255 is pivotally mounted. The operating lever 296 is actuated by the face cam 276 which for such purpose has a cam groove in its other face within which rides a cam follower roller 297 which is pivotally mounted on the operating lever 296 intermediate its ends.

In the operation of the wire-bending mechanism 255, as soon as each head 25 is indexed into position at station D, the die block 256 is raised to its operative upper position as shown in FIG. 14 by the action of the cam-actuated operating lever 274 acting through the connecting link 275. While the die block 256 is then held in its raised operating position by the operating lever 274, the slide jaws 263, 264 are actuated and raised, by the action of the operating lever 296 acting through connecting link 294, toggle links 291 and actuating levers 286, 287, to cause them to bend the wire leads 7 to 10 against the anvil die faces 267, 268 and the bottom face 273 of the wire lead holder 57 so as to form the offset outer end portions 7', 8', 9', and 10' of the wire leads. The slide jaws 263, 264 are then returned to their lowered inoperative position by the action of the operating lever 296 and the die block 256 moved downwardly to its inoperative lowered position by the action of the operating lever 274 to thereby place the wire bending mechanism 255 in readiness for the start of its next cycle of operation, following which the head 25 at station D is then indexed to the next work station E of the apparatus.

At station E, the bent wire leads 7 to 10 are rotated in the wire lead holder 57, about their respective end portions inserted and gripped within the holder to thereby reposition and reorient their offset outer end portions 7', 8', 9', and 10' into the desired final position thereof, relative to one another and to the fifth wire support 11, which they are to occupy in the finished lamp. The rotational reorientation of the wire leads at station E is effected by wire reorienting mechanism 300 (FIGS. 17 and 18) located at station E and comprising a pair of vertically extending wire rotating push fingers 301 and 302 upstanding from horizontal swing arms 303 and 304, respectively, which are pivotally mounted at one end on the top of a vertically disposed spindle 305, by means of respective side-by-side pivot pins 306 and 307 located adjacent and on opposite sides of the spindle axis, for swinging movement in a horizontal plane to cause the push fingers to engage with the horizontally extending laterally bent portions of the wire leads 7 to 10 so as to rotate them in the wire lead holder 57 to the desired final oriented position therein, the wire leads 7 to 10 being capable of rotational or turning movement in the wire lead holder even though gripped by the wire holding jaws 132 to 137 thereof. The swinging movement of the swing arms 303, 304 is imparted thereto by a sleeve housing or outer shell 308 which concentrically encloses the upper end of the spindle 305 and is rotatably mounted thereon, as by means of roller bearings, for rotative oscillating movement about the vertical axis of the spindle. The outer shell 308 is provided with a pair of horizontally extending stop screws 309 and 310 which are adjustably mounted on the top end of the outer shell at spaced points therearound and against which the outer or free ends of the swing arms 303 and 304 are normally held, by the pull of respective tension coil springs 311 and 312 connected between respective pairs of spring posts 313, 314 and 315, 316 on the swing arms and outer shell 308, to thereby cause the swing arms to rotate along with the outer shell when the latter is rotated on the spindle 305. Spring 311 acts to swing the arm 303 in a counterclockwise direction (as viewed from above) into engagement with stop screw 309 while spring 312 acts to swing the other arm 304 in a clockwise direction into engagement with the other stop screw 310. The spindle 305 is nonrotatively mounted or supported at its lower end on a support block 317 fastened on the upper end of a vertically reciprocable slide 318 which is mounted for vertical reciprocating movement in a slide bearing 319 fixedly mounted on the upper end of a support post 320 upstanding from the machine bed 45. The slide 318 is vertically reciprocated between a lowered inoperative position, in which the wire-engaging push fingers 301, 302 on the swing arms 303, 304 are located below and clear of the path of movement of the wire leads 7 to 11 in the wire lead holder 57 during the index of the heads 25 into and away from station E so as not to interfere with the wire leads during such index movement, and a raised operative position in which the upper ends of the push fingers 301 and 302 are located at the elevation of the laterally bent portions of the wire leads 7 to 10 so as to engage therewith when the swing arms 303, 304 are rotated on the spindle 305 about their respective pivot pins 306, 307. The vertical reciprocating movement of the slide 318 is produced by a horizontally extending cam-actuated operating lever 321 which is pivotally connected at one end, by a vertically extending connecting link 322, to the slide 318 and is pivotally mounted at its other end on the same pivot pin 323 on which are pivoted the operating levers 274 and 296 for the wire reshaping mechanism 255. The operating lever 321 is actuated by a double face came 324 having a cam groove 325 in one of its faces within which rides a cam follower roller 326 rotatably mounted on the operating lever 321 intermediate its ends.

In their initial starting position as shown in FIG. 17, at the beginning of each cycle of operation of the wire lead reorienting mechanism 300, the swing arms 303 and 304 are held by the springs 311, 312 in respective rotated starting positions on the spindle 305, as determined by their engagement with the stop screws 309 and 310, such that when the slide 318 and associated elements mounted thereon are raised to their operative upper position, the push finger 301 on swing arm 303 will be located in the narrow space between the laterally bent portions of the two side-by-side wire leads 7 and 9 that are offset in the one direction, and the other push finger 302 on swing arm 304 will be located alongside the outward side of the laterally bent portion of the wire lead 10 of the other pair of side-by-side wire leads 8 and 10 that are offset in the other direction. As soon as a head 25 is indexed to and positioned at station E, the slide 318 and associated spindle 305 are moved upwardly to their raised operative position by the action of the operating lever 321 to thereby locate the push fingers 301, 302 in position to engage with and rotate the wire leads 7 to 10 on the ensuing swing movement of the swing arms 303, 304 on the spindle. The sleeve housing or outer shell 308 is then rotated on the spindle 305 first in a clockwise direction (as viewed from above) through the required predetermined part of a full turn (e.g., 50°47' in the particular case illustrated) to cause the stop screw 309 on the outer shell to push against and rotate the swing arm 303 and its associated push finger 301 along with the outer shell, and consequently cause the push finger 301 to engage the laterally bent portion of the wire lead 7 and rotate the latter in the wire lead holder 57 to the desired final oriented position therein, as shown in dash-dot lines in FIG. 18. During this clockwise rotation of the outer shell 308, the other swing arm 304 also rotates clockwise along with the outer shell, causing the associated push finger 302 to move away from the adjacent wire lead 10, through the constant pull of the coil spring 312 acting to hold swing arm 304 in abutting engagement with the stop screw 310 on the outer shell. The rotational movement of the outer shell 308 is produced by a horizontally extending rack gear 327 which is intermeshed with a pinion gear 328 integrally formed on the lower end of the outer shell, and is mounted for horizontal reciprocating movement within a guideway formed in the upper end of the support block 317. The rack gear 327 is reciprocated, to effect the rotation of the outer shell 308, by a horizontally extending cam-actuated operating lever 329 which is pivoted at one end on the pivot pin 323 and is pivotally connected at its other end by a vertical connecting link 330 to the horizontally extending arm 331 of a bell crank lever 332 pivotally mounted for pivotal movement in a vertical plane on a pivot pin 333 supported by a bracket (not shown) fastened on the lower table 218 of the apparatus. The other or vertical extending arm 334 of the bell crank lever 332 is pivotally connected by a generally horizontally extending connecting link 335 to one end of the rack gear 327. A cam follower roller 336 is rotatably mounted on the operating lever 329 intermediate the ends thereof and rides within a cam track groove 337 in the other face of the double face cam 324.

As soon as the swing arm 303 reaches the end of its clockwise swing movement to reposition the lead 7 in its final oriented position, the outer shell 308 is then rotated in the opposite or counterclockwise direction by the action of the cam-actuated operating lever 329 and rack gear 327 back through its original starting position and through an additional part of a full turn therebeyond (e.g., 61°38' in the particular case illustrated) to cause the stop screw 310 on the outer shell to push against and rotate the swing arm 304 and its associated push finger 302 along with the outer shell, thus causing the push finger 302 to engage the laterally bent portion of the wire lead 10 and rotate the latter in the wire lead holder 57 to the desired final oriented position therein (as shown in dash-dot lines in FIG. 18) as determined by the limit of the counterclockwise rotational movement of the outer shell by the cam-actuated rack gear 327. During this rotation of the wire lead 10, its offset end portion 10′ abuts against the corresponding offset end portion 8′ of wire lead 8 and rotates the latter along with it in the wire lead holder 57 to its desired final oriented position as shown in dash-dot lines in FIG. 18. The counterclockwise rotational movement of the outer shell 308 beyond its original starting position also causes the swing arm 303, through the pull thereon of coil spring 311, to be rotated along with the outer shell, thus causing the push finger 301 to engage the laterally bent portion of the wire lead 9 so as to rotate it in the wire lead holder 57 to its desired final oriented position therein (as shown in dash-dot lines in FIG. 18) as determined by the engagement of the swing arm 303 with a limiting stop screw 338 mounted on the top of the spindle 305. On completion of its counterclockwise rotational movement to reorient the wire leads 8, 9 and 10, the outer shell 308 is then returned to its original starting rotative position on the spindle 305 by the action of the cam-actuated operating lever 329 and rack gear 327, and the slide 318 together with the spindle 305 and associated elements thereon returned to their lowered inoperative position once again in readiness for the start of the next cycle of operation of the wire lead reorienting mechanism 300. In this connection, the arrangement of the connecting links 330, 335 and bell crank lever 332 for interconnecting the operating lever 329 with the rack gear 327 is such as to allow for the vertical movement of the rack gear 327 by the slide 318 and associated support block 317 when the latter is moved vertically between its lowered and raised positions.

The turning or reorienting of the wire leads 7 to 10 in the wire lead holer 57 of the head 25 at station E by the wire lead orienting mechanism 300 takes place during the first portion of the dwell interval of the head at station E. After the completion of this wire lead reorientation operation, and while the head 25 is still positioned at station E, the wire lead holder 57 and the slide 94 on which it is mounted are then raised to their inoperative upper position by the raising mechanism 128 (FIG. 27) located at this station E. The particular raising mechanism 128 shown in FIG. 27 is the one located at a subsequent work station U of the apparatus, but the one located at station E is substantially identical thereto except for the omission of the downwardly depending striker arm 339 which, on downward movement of the head raising mechanism, is adapted to engage and swing the jaw operating lever 151 of the wire lead holder 57 downwardly so as to open the wire gripping jaws 132 to 137 thereof to release their grip on the wire leads 7 to 11 in the holder.

The raising mechanism 128 comprises a vertically extending slide bar 340 mounted for vertical sliding movement within a slide bearing 341 fastened on the outer end of the overhead support bracket 158 at stations E–F and on the lower end of which is pivotally mounted a spring-biased swing latch 342, by means of a pivot pin 343, to swing in a vertical plane extending radially of the turret. The swing latch 342 is spring-biased by a pair of tension coil springs 344 which are connected between spring posts 345 and 346 on the swing latch and slide bar 340, respectively, so that they tend to swing the latch 342 outwardly to a tilted inoperative position to clear the roller 129 on the slide 94 during the downward movement of the slide bar 340 to its lowered position. The tilted inoperative position of the swing latch 342 is determined by the engagement of its upper heel end with a downwardly facing inclined stop shoulder 347 on the slide bar 340. An L-shaped spring-loaded locking lever 348 is pivotally mounted on the slide bar 340 to swing in a vertical plane radially of the turret 26, and it carries a roller 349 on its downwardly extending arm which is adapted to catch behind and engage the upper heel end of the swing latch 342 to lock it in place in its operative inwardly swung roller-engaging position as shown in FIG. 27, in which position a catch finger 350 on the lower end of the swing latch underlies the roller 129 on the supporting slide 94 for the wire lead holder 57 so as to engage the roller 129 and thus lift the slide 94 and associated wire lead holder 57 when the slide bar 340 is raised to its upper position. The swing latch 342 is pivoted from its tilted inoperative position to its operative roller-engaging position, during the last part of the downward stroke of the slide 340, by the engagement of a roller 351 on a generally horizontal inwardly extending arm of the swing latch with the top side of the slide 94.

The locking lever 348 is normally held in its locking position, with its roller 349 caught behind the heel end of the swing latch 342, by the force of a pair of tension coil springs 352 which are connected between spring posts on the locking lever and the slide bar 340, repectively. The other arm 353 of the locking lever 348 extends generally horizontally in a direction radially outward of the turret 26 for engagement with the horizontal arm 354 of a spring-biased pivoted trip lever 355, during the first portion of the downward movement of the slide 340 and associated swing latch 342, to cause the locking lever to be pivoted so as to disengage the roller 349 thereon from behind the heel of the swing latch 342 and thus permit the latter to be swung outwardly, by the action of the coil springs 344, to its tilted inoperative position so that the catch finger 350 will clear the roller 129 on the slide 94 during the remainder of its downward movement to its lowered position. The trip lever 355 is pivotally mounted for swinging movement in a vertical plane radially of the turret 26 by means of a pivot pin 356 on a support arm 357 fastened on and depending from the slide bearing 341, and it is spring-biased by means of a pair of tension coil springs 358 which are connected between the trip lever and the support arm 357 and tend to pivot the trip lever in a counterclockwise direction (as viewed in FIG. 27) so as to normally hold the trip lever in its operative tripping position as shown in FIG. 27, as determined by the engagement of a limiting stop screw 359 on the trip lever with the support arm 357. The trip lever, however, is free to pivot a limited amount in a clockwise direction, against the pull of the springs 358, so that the horizontal arm 353 of the locking lever 348, on striking against the horizontal arm 354 of the trip lever during the upward stroke of the slide 340, can swing the trip lever to a sufficiently tilted position to permit the locking lever arm 353 to freely pass by the trip lever, after which the springs 358 then return the titled trip lever once again to its normal operative tripping position with the stop screw 359 abutting against the support arm 357.

The vertical movements of the slide 340, and the positioning thereof in its upper and lower positions, is effected by an overhead operating lever 360 which extends radially of the turret 26 and more or less horizontally above the upper table 159 and support bracket 158 at station E and is pivotally mounted intermediate its ends on the support bracket 158 for swinging movement in a vertical plane extending radially of the turret. The operating lever 360 is formed with a forked outer end the arms 361 of which straddle an enlarged cylindrical upper end portion 362 of the slide bar 340 and carry opposed rollers 363 on their facing inward sides which are rotatably mounted on the arms 361 on pivot pins 364. The rollers 363 are located on diametrically opposite sides of the cylindrical upper end portion 362 of the slide bar 340 and ride within an annular roller groove 365 formed between a pair of spaced collars 366, 367 on the enlarged upper end portion 362 of the slide bar. The operating lever 360 is pivoted, to effect the vertical movements of the slide bar 340, by the engagement of a roller (not shown) rotatably mounted on the inner end of the lever within the annular roller-receiving groove 186 (FIG. 4) in the upper collar 187 on the master actuating rod 188 extending vertically through the hollow center column 28 of the apparatus.

Since the master actuating rod 188 is raised, shortly after each index movement of the turret 26 is completed, to thereby actuate the various operating levers (including the operating lever 360) controlled by the actuating rod 188, the raising mechanism 128 at station E is therefore lowered by the action of the operating lever 160 from its raised inoperative position to its lowered operative position, for pick-up of the slide 94 and its associated wire lead holder 57, shortly after each head 25 of the apparatus is indexed to and positioned at station E. During this downward movement of the slide raising mechanism 128 the locking lever 348 is tripped by the trip latch 354, in the manner described previously, to disengage the roller 349 on the locking lever from behind the heel of the swing latch 342 and thus permit the latter to be swung to its tilted position by the action of the coil springs 344 so that the catch finger 350 on the swing latch will clear the roller 129 on the slide 94 during the further course of downward travel of the slide raising mechanism 128 to its lowered position. Just before the raising mechanism 128 reaches its said lowered position, the roller 351 on the swing latch 342 strikes against the top side of the slide 94 to cause the swing latch to be pivoted from its tilted inoperative position to its righted operative position as shown in FIG. 27, with the catch finger 350 of the swing latch located directly beneath the roller 129 on the slide 94 in position to engage therewith and lift the slide 94 on the ensuing upward movement of the raising mechanism 128 to its raised inoperative position. During the last portion of the dwell of each head 25 at station E, i.e., just before the start of the next index movement of the turret 26, the slide bar 340 of the raising mechanism 128 is raised by the operating lever 360 to its upper position to cause the catch finger 350 on swing latch 342 to engage the roller 129 on the slide 94 and lift the latter along with its associated wire lead holder 57 to the raised position thereof in which position they are then held by the spring-loaded latch bolt 118 which then snaps into the notch opening 119 in the slide 94. The lifting of the slide 94 to its raised position thus withdraws the wire lead holder 57 and the depending wire leads 7, 8 . . . etc., gripped therein from within the reflector section holder 56 so as to clear the latter for subsequent horizontal movement inwardly of the turret to the retracted inward position of the holder 57 out of overlying relation to the holder 56 to thereby permit the insertion of a reflector section 2 thereinto. During the upward movement of the raising mechanism 128 to its raised position, the horizontal arm 353 of the locking lever 348 strikes against the horizontal arm 354 of the spring-loaded trip lever 355 and pivots the latter out of the way so as to permit the continued upward movement of the locking lever 348 past the trip lever.

From station E, the head 25 thereat is then indexed to station F where a reflector section 2 provided only with the metal thimbles 17, 18 and 19, without any wire leads 7, 8 . . . etc., brazed thereinto, is loaded into the center opening 59 of the essentially ring-shaped reflector holder 56 of the head with its rim 20 resting on the three seating pads 60 of the holder and its concave reflecting surface 4 facing upwardly, as shown in FIG. 19. During the index movement of the head 25 from stations E to F, the slide carriage 97 and the associated slide 94 and wire lead holder 57 are moved radially inward of the turret 26 to their retracted position by the engagement of the cam roller 104 on the carriage within the downwardly-opening inwardly-angled cam slot or groove 368 of a stationary overhead cam track 369 (FIG. 10) extending between stations E and F. The carriage inward transfer cam track 369 is fastened to and depends from the underside of the support bracket 158 at stations E–F which is fastened to the periphery of the overhead table 159. The carriage 97 is locked in its retracted inward position, against accidental outward movement such as would cause it to interfere with the various work-performing mechanisms of the apparatus at station F and immediately following stations, by the engagement of the latch lever 110 of the safety catch means 109 with the head of the stop screw 113 on the carriage head portion 96. A stationary overhead cam track 370 extending around the apparatus, concentrically about the axis of rotation of the turret 26, from station F to K, acts as a guard to prevent accidental movement of the carriage 97 radially radially outward from its retracted position, in the event the safety catch means 109 for some reason should become accidentally disengaged. The carriage inward position holding cam track 370 is fastened to and depends partly from the brackets 158 at stations E–F and K–L. The insertion or loading of the reflector sections 2 into the heads 25 while positioned at station F may be performed either manually or by means of any conventional type automatically operating loading mechanism such as commonly employed heretofore and comprising, in general, a transfer arm for picking up a reflector section 2 from a supply conveyor and transferring it to and placing it in the reflector section holder 56 of the head 25. In loading the reflector section 2 into the holder 56, it is oriented and positioned therein so that the three orienting key lugs 22 on the reflector section, which as previously mentioned are located at unequally spaced points about the rim 20 of the reflector section, enter the correspondingly unequally spaced notches 62 in the seating pads 60 of the holder and the seating lugs 23 on the reflector section rest on the flat top seating surfaces 61 of the seating pads 60. The unequal spacing of the notches 62 around the rim of the ring-shaped reflector holder 56 and the corresponding unequal spacing of the orienting key lugs 22 on the rim of the reflector section 2, assure the accommodation of the reflector section in the reflector holder 56 only in one predetermined oriented position therein. As mentioned hereinbefore, the three unequally spaced notches 62 in the seating pads 60 of the reflector holder 56 are so oriented about the annular rim of the reflector receiving opening 59 thereof as to locate the reflector section 2, when properly placed in the holder, with the plane of its two side ferrules 18 and 19 located tangentially to the path of travel of the head 25 and its top ferrule 17 located inwardly of the turret 26 relative to the side ferrules 18, 19. As shown in FIG. 6, the notch 62 in one of the seating pads 60, i.e., the seating pad 60 shown at the top of FIG. 6 and located at the right side of the ring-shaped holder 56 as viewed looking radially inward of the turret 26 from a point outside the periphery thereof, has its side walls converging toward one another radially inward of the ring-shaped holder 56 to thereby provide opposed vertically extending bearing edges 371 which are spaced apart a distance to snugly receive therebetween the corresponding orienting key lug 22 of the reflector section 2 so as to thereby definitely position it in a predetermined oriented position about the ring-shaped reflector holder 56. The side walls of the respective notches 62 in the two other seating pads 60 of the reflector holder 56 extend parallel to one another and approximately radially of the ring-shaped holder 56, and they are spaced apart a distance somewhat greater than, e.g., 3/16-inch greater than the width of the corresponding orienting key lugs 22 on the reflector section 2 so as to permit a slight amount of horizontal shifting movement of the reflector section 2 on the seating pads 60, as well as a slight amount of horizontal pivotal or rocking movement of the reflector section on the seating pads about the bearing edges 371 as a fulcrum, in order to thereby permit repositioning of the reflector sections in the heads 25 at the next succeeding stations G and H so that their tilted optical axes and focal points are located, in each case, in exact predetermined relation to the vertical center axis of the respective reflector holder 56 in which they are mounted. At the time of loading of the reflector sections 2 into the heads 25 at station F, the reflector holddown or clamp arms 63 of each head are in their inoperative swung-out oriented position in which they are clear of the reflector holder 56 to permit the insertion thereinto of the reflector section, the clamp arms 63 having been swung out to such inoperative position at the last or reflector unloading station D' of the apparatus and then remaining in such swung-out inoperative position throughout the ensuing travel of each head 25 from the unloading station D' to the reflector repositioning station G.

Following the loading of a reflector section 2 into the head 25 at station F, the head is indexed to station G where the reflector section is repositioned horizontally in the head, by the action of primary reflector repositioning mechanism 372 (FIG. 19) thereat, to thereby locate the reflector section in precise final centered position in the head with the focal point of its reflecting surface 4 located in exact predetermined horizontal relation to the vertical center axis of the holder 56. While thus held in its repositioned-centered location in the head 25 by the reflector repositioning mechanism 372 at station G, the reflector section 2 is then clamped in place in the holder 56 by the spring-loaded hold-down or clamp arms 63 which, to such end, are lifted above the rim 20 of the repositioned reflector section 2 in the holder 56 and swung inwardly to their operative position overlying the reflector section rim 20 by the action of the clamp arm operating mechanism 373 at station G, and are then released by the operating mechanism 373 to permit them to be spring pressed downwardly against the reflector section rim 20 by the action of the clamp arm springs 65 to thereby firmly clamp the reflector section tightly down against the seating pads 60 of the reflector section holder 56. After the clamping of the repositioned reflector section 2 in place in the holder 56 at station G, the reflector repositioning mechanism 372 is then raised out of engagement with the reflector section 2 in the holder 56 so as to lie clear thereof and permit the subsequent index of the head 25 and the reflector section 2 held therein to the next work station H of the apparatus.

As shown in FIG. 19, the primary reflector repositioning or centering mechanism 372 overlies the reflector section 2 in the head 25 at station G and it comprises a set of three spring-loaded ball end positioning slide fingers 374 disposed in a common horizontal plane and mounted concentrically about and equidistantly apart around the lower end of a vertically extending center plunger or push rod 375 which is mounted for vertical reciprocating movement within a lower slide block 376. The positioning fingers 374 are mounted for horizontal sliding movement, radially of the center plunger 375, within the lower slide block 376, and they are provided at their outer ends with downwardly and outwardly protruding ball contacts 377 for engaging with the upwardly and outwardly inclined reflecting surface 4 of the reflector section 2 in the holder 56 to reposition it on downward movement of the repositioning mechanism 372 to its lowered operative position and outward sliding movement of the positioning fingers 374 thereof. The three ball contacts 377, like the positioning slide fingers 374 on which they are mounted, are located in a common horizontal plane and are disposed concentrically about and equidistantly apart around the center plunger 375. The three positioning slides or fingers 374 are spring-urged radially inward of the center plunger 375, to maintain rollers 378 on the inner ends of the slide fingers in engagement with the conical lower wedge end 379 of the plunger 375, by the pull of respective tension coil springs 380 connected at their opposite ends to the positioning slide fingers and to the lower slide block 376.

The lower slide block 376, in which the vertical plunger 375 is slidably supported, is mounted for horizontal sliding movement, tangentially to the circular path of travel of the head 25, between V guides on the lower end of an upper slide block 381 which, in turn, is mounted for horizontal sliding movement radially of the turret 26 between V guides on the lower end of a vertically reciprocable outer sleeve 382 which is mounted for vertical sliding movement within a sleeve bearing 383 mounted on a support bracket 384 fastened to the periphery of the upper table 159 and extending radially outward therefrom. The two slide blocks 376 and 381 are provided with respective similar type micrometer screw adjustment mechanisms 385 (only one of which is shown in FIG. 19) for adjusting the positions of the slide blocks 376, 381 within their respective slideways in order to thereby accurately locate the plunger 375 so that its vertical axis is located in exact predetermined relation to the vertical center axis of the reflector holder 56 of the heads 25 when positioned at station G. To permit such horizontal adjustment of the slide blocks 376, 381 and the plunger 375 relative to the supporting outer sleeve 382, adequate clearance formed by oversized bore passageways 386, 387 in the upper slide block 381 and outer sleeve 382, respectively, through which passageways the plunger 375 passes, is provided between the plunger and the walls of such bore passageways to take care of the slight adjustments that may be necessary in initially setting up the primary reflector repositioning mechanism 372 for operation. The outer sleeve 382 is prevented from rotating in the sleeve bearing 383, and the slide blocks 376 and 381 and fingers 374 thus maintained in proper oriented position about the plunger 375, by the engagement of a pin or roller 388 on the outer sleeve within a vertical slot 389 in the sleeve bearing 383.

The outer sleeve 382 of the reflector repositioning mechanism 372, and the slide blocks 376, 381 and positioning fingers 374 carried thereby, are moved vertically between a raised inoperative position in which the positioning fingers 374 are located entirely above and clear of the reflector holder 56 and the reflector section 2 therein so as to permit the index movement thereof to and away from station G, and a lowered operative position in which the positioning fingers 374 and the ball contacts 377 thereof are located within the reflector section 2 in the head 25 at station G and at a predetermined elevation relative to the reflector seating plane of the reflector holder 56 and thus to the focal plane of the reflector section 2 seated therein. The vertical movements of the outer sleeve 382 and the associated slide blocks 376, 381 and positioning fingers 374 are effected by an overhead operating lever 390 which extends radially of the turret 26 and more or less horizontally above the upper table 159 and support bracket 384 at station G and is pivotally mounted intermediate its ends on the support bracket 384 for swinging movement in a vertical plane extending radially of the turret. The operating lever 390 is pivoted, to effect the vertical movements of the outer sleeve 382 and associated parts, by the engagement of a roller (not shown) rotatably mounted on the inner end of the lever within the annular roller-receiving groove 186 (FIG. 4) in the upper collar 187 on the master actuating rod 188 which extends vertically through the center column 28 of the apparatus. The outer end of the operating lever 390 is pivotally connected, by a connecting link 391, to the upper end of an inner sleeve 392 which is telescoped into and vertically reciprocable within the outer sleeve 382. The inner sleeve 392 projects upwardly beyond the upper end of the outer sleeve 382 and it is provided at its upper end with an end closure plate 393 forming an outwardly protruding external collar 394 on the inner sleeve. A compression coil spring 395, fitted over the projecting upper end of the inner sleeve 392, is compressed between the collar 394 thereon and the upper end 396 of the outer sleeve 382 to thereby continuously urge them apart as limited by the engagement of an internal collar 397 on the lower end of the inner sleeve 392 with a collar 398 on the upper end of the plunger 375 and the further engagement of a stop pin 399 on the plunger 375 with a stop shoulder 400 on the outer sleeve 382 formed by the upper end of a slot 401 therein. A compression coil spring 402, disposed within the bore of the inner sleeve 392 and compressed between the top closure plate 393 thereof and the collar 398 on the upper end of the plunger 375, acts to continuously urge the plunger 375 downwardly relative to the inner sleeve 392, as limited by the engagement of the collar 398 on the plunger with the bottom collar 397 on the inner sleeve 392.

At the start of each cycle of operation of the reflector repositioning mechanism 372 during the dwell of each head 25 at station G, the outer sleeve 382 and the slide blocks 376, 381 and positioning fingers 374 carried thereby, are initially held in their raised inoperative position by the operating lever 390, acting through the inner sleeve 392 and the interengaged collars 397 and 398 on the inner sleeve 392 and plunger 375, and further through the engagement of the stop pin 399 on the plunger 375 with the stop shoulder 400 on the outer sleeve 382. The raised inoperative position of the reflector repositioning mechanism 372 is determined by the pivotal position of the operating lever 390 at that time. Shortly after each head 25 arrives at station G, the operating lever 390 is actuated to first move the reflector repositioning mechanism 372 downwardly to its lowered operative position, as determined by the engagement of adjustable stop screws 403 on the outer sleeve 392 with the upper end 404 of the sleeve bearing 383 and to then move the positioning fingers 374 of the reflector repositioning mechanism 372 horizontally outward to cause the ball contacts 377 thereof to engage the reflecting surface 4 of the reflector section 2 in the holder 56 and center it therein. The stop screws 403 are screwthreaded into and depend from a collar 405 on the upper end of the outer sleeve 382. During the first portion of the downward movement of the reflector repositioning mechanism 372 by the operating lever 390, the outer sleeve 382 and the slide blocks 376, 381 and positioning fingers 374 carried thereby move downwardly in unison with the inner sleeve 392 by reason of the force of the compression coil spring 395 acting to urge the inner and outer sleeves apart. The downward movement in unison of the inner and outer sleeves 392 and 382 by the operating lever 390 continues until the stop screws 403 on the upper end of the outer sleeve 382 abut against the upper end 404 of the sleeve bearing 383, thereby stopping further downward movement of the outer sleeve 382 and locating the repositioning mechanism 372 in its lowered operative position. Continued downward movement or overtravel of the inner sleeve 392 relative to the outer sleeve 382 then permits the internal coil spring 402 to push the center plunger 375 downwardly relative to the lower slide block 376 and the positioning fingers 374 thereon, thus causing the conical lower wedge end 379 of the plunger 375 to move the positioning fingers 374 horizontally outward in unison until the ball contact 377 of each positioning finger engages the reflecting surface 4 of the reflector section in the holder 56 and effects the centering of the reflector section in the holder. Because of the clearance provided between two of the three orienting key lugs 22 on the reflector section 2 and the side walls of the respective notches 62 in the seating pads 60 of the reflector holder 56 within which notches these two key lugs 22 are received, the reflector section 2 is thereby free to shift horizontally in the holder 56, under the force of the positioning fingers 374 pressing thereagainst, and thus accommodates itself to the centered position of the three ball contacts 377 about the center plunger 375 as they engage and press horizontally outward against the reflector section. To assure in each case the positive engagement of all three of the ball contacts 377 with the reflector section 2 in the holder 56 and thus the accurate centering of the reflector section therein, the inner sleeve 392 is depressed by the operating lever 390 a slight further distance beyond the point where all three ball contacts 377 first engage the reflector section 2. This downward overtravel movement of the inner sleeve 392 relative to the plunger 375 thus disengages the internal collar 397 on the lower end of the inner sleeve from the collar 398 on the upper end of the plunger 375 and frees the latter so that the engagement of the ball contacts 377 with the reflector section 2 will in each case be under the downward spring pressure of the coil spring 402 against the plunger 375. While the reflector section 2 is held in its readjusted centered position in the holder 56 by the reflector repositioning mechanism 372 at station G, it is then clamped in place in such readjusted centered position in the holder 56 by the three hold-down or clamp arms 63, following which the reflector repositioning mechanism 372 is then raised by the operating lever 390 to its upper inoperative position to withdraw it from within the reflector section 2 in the head 25 so as to permit the subsequent index movement thereof to the next succeeding station H.

The clamping of the reflector section 2 in the holder 56 by the three reflector hold-down or clamp arms 63, which initially are in their outwardly swung inoperative position at station G, is effected by lifting the clamp arms above, and rotating or swinging them inwardly to their operative oriented position overlying the rim 20 of the reflector section in the holder 56 and then releasing the clamp arms to permit them to be spring-pressed tightly down against the rim 20 of the reflector section 2 by the force of the coil springs 65 associated with the respective clamp arms. The lifting and inward swinging of the clamp arms 63 is performed by the clamp arm operating mechanism 373 (FIG. 19) which, as shown, is located directly below the reflector holder 56 of the head 25 at station G and comprises a set of three vertically extending chisel-ended drive pins 69 which are so located as to be vertically aligned with respective ones of the clamp arm spindles 64 of the head 25 positioned at station G. The drive pins 69 are provided with chisel-pointed upper ends 406 for insertion into and interlocking engagement within the cross slots 68 in the bottom collar end 66 of the clamp arm spindles 64 for the purpose of rotating the latter to swing the clamp arms between their outwardly swung inoperative position and their inwardly swung operative clamping position. The drive pins 69 are rotatably mounted, for rotation about their respective vertical axes, in sleeve bearings 407 formed on the outer ends of the arms 408 of a three-armed elevating spider 409 which is mounted for vertical reciprocating movement to raise and lower the chisel-ended drive pins 69 into and out of engagement with the clamp arm spindles 64. The drive pins 69 are rotated in their sleeve bearings 407 to effect, when engaged with the clamp arm spindles 64, the swinging movement of the clamp arms 63 between their operative and inoperative positions by the rotational movement of a three-armed rotating spider 410 which is located within the confines of the three bearings 407 of the elevating spider 409 and the three arms 411 of which are connected to respective ones of the drive pins 69 by connecting links 412 pivotally connected at their opposite ends to the spider arms 411 and to throw arms 413 fastened on the drive pins 69. The rotating spider 410 has its center hub 414 keyed onto the upper end of a vertical shaft 415 so that it will rotate therewith but slide vertically thereon. The elevating spider 409 is mounted, by means of its center hub 416, on the center hub 414 of the rotating spider 410 to permit rotation of the latter relative to the elevating spider. The rotating spider rests, by means of an annular shoulder on its hub 414, on the upper end of the hub 416 of the elevating spider so as to slide vertically in unison therewith on the shaft 415. The vertical shaft 415 extends downwardly through and is rotatably supported within a bearing 417 on a support bracket 418 fastened on the lower table portion 218 of the apparatus. The elevating spider 409 is fixed in proper rotative oriented position, and locked against rotation about its vertical center axis, to thereby assure the vertical alignment of the drive pins 69 with the clamp arm spindles 64 of each head 25 positioned at station G, by means of a bar-shaped locking key 419 which is fastened on and depends from the center hub 416 of the elevating spider and which is slidably fitted within a key-way formed by spaced ways 420 on the bearing 417.

The elevating spider 409 is raised from a lowered inoperative position in which the chisel-ended drive pins 69 are located entirely below and spaced from the underside of the heads 25 so as to be clear thereof to permit the index movements of the heads to and away from station G, and a raised operative position in which the upper chisel-shaped ends 406 of the drive pins 69 are engaged with the bottom collar ends 66 of the clamp arms 63 within the cross slots 68 therein, by elevating mechanism comprising a more or less horizontally disposed lift lever 421 pivotally mounted intermediate its ends on the support bracket 418. The lift lever 421 is provided with a forked end the arms 422 of which straddle the hub 416 of the elevating spider and are pivotally connected thereto by a pin and slot type connection comprising slots 423 in the fork arms 422 within which are snugly received rollers 424 rotatably mounted on opposite sides of the hub 416. The other end of the lift lever 421 is pivotally connected, by a vertical connecting link 425, to one arm 426 of a bell crank cam follower lever 427 pivotally mounted on a horizontal lever shaft 428 which is fixedly supported on brackets (not shown) upstanding from the bed 45 of the apparatus. The other arm 429 of the cam follower lever 427 carries a roller 430 which rides in a cam track groove 431 in one face of a face cam 432 fastened on the main index cam shaft 33 of the apparatus. The rotating spider 410 is rotated, to effect the rotation of the drive pins 69 and the turning of the clamp arms 63 from their inoperative swung-out position to their operative reflector clamping position overlying the rim 20 of the reflector section 2 in the head 25, by rotating mechanism comprising a horizontally disposed operating lever 433 pivotally mounted intermediate its ends on the support bracket 418 and pivotally connected at one end, by a horizontal connecting link 434, to the end of a throw arm 435 fastened on the lower end of the vertical shaft 415 on which the rotating spider is fastened. The other end of the operating lever 433 is pivotally connected, by a horizontal connecting link 436, to the vertical arm 437 of a bell crank cam follower lever 438 the downwardly inclined other arm 439 of which carries a roller 440 which rides in a cam track groove 441 in the face of a face cam 442 fastened on the main index cam 33 of the apparatus.

The operation of the elevating and rotating spiders 409 and 411 to lift and swing the reflector holddown clamp arms 63 to their operative reflector clamping position begins as soon as the reflector section 2 in a head 25 at station G has been repositioned and centered in the holder 56, during the dwell of the head at that station, by the reflector repositioning mechanism 372. While the ball contacts 377 of the reflector positioning fingers 374 are maintained in contact with the reflector section 2 to hold it in its centered position in the holder 56, the elevating spider 409, and the rotating spider 410 resting thereon, are elevated in unison by the lift lever 421, through the action of the cam 432 and the lever 427 and connecting link 425, to first raise the drive pins 69 into engagement with the spindles 64 of the reflector clamp arms 63, with the chisel ends 406 of the drive pins inserted in the cross slots 68 in the lower ends of the spindles 64 so as to rotatably interlock therewith, and to then raise the clamp arm spindles 64 a sufficient distance to elevate the clamp arms 63 thereon entirely above the rim 20 of the reflector section 2 in the holder 56. The rotating spider 410 is then rotated by the action of the cam 442, acting through lever 438, connecting link 436, operating lever 433, link 434, throw arm 435, and the shaft 415 on which the rotating spider is keyed, to rotate the interlocked drive pins 69 and clamp arm spindles 64 so as to swing the clamp arms 63 inwardly over the rim 20 of the reflector section 2 to their operative reflector clamping oriented position. The two spiders 409, 410 are then lowered and returned to their lowered starting position by the cam-operated lift lever 421, thereby disengaging the drive pins 69 on the elevating spider from the clamp arm spindles 64 and permitting the biasing coil springs 65 associated with the spindles to force them downwardly so that the clamp arms 63 are then spring-pressed tightly down against the rim 20 of the reflector section 2 to hold it firmly in place in the holder 56.

Following the repositioning and clamping of the reflector section 2 in the head 25 at station G, the head is then indexed to the next succeeding station H where the positioning of the reflector section 2 in centered relation in the head 25 is accurately checked and, if required, further readjusted in the head by secondary reflector repositioning mechanisms 443 (FIG. 20) located at that station, to accurately center the reflector section in final position therein, and the height reference gauge means 75 on the head then set in definite height relation to the focal plane of the finally positioned reflector section 2 in the head. As shown in FIG. 20, the secondary reflector repositioning or position checking mechanism 433 is generally similar in construction to the primary reflector repositioning mechanism 372 at the preceding station G, in that it is comprised of three ball-ended reflector positioning fingers 444 provided with protruding ball contacts 445 at their outer ends, the fingers 444 being similar to the positioning fingers 374 of the reflector repositioning mechanism 372 but differing therefrom in that they are fixedly mounted on the lower slide block 446 instead of being horizontally slidable thereon radially of the vertical center axis of the repositioning mechanism. The lower slide block 446, like the lower slide block 376 of the reflector repositioning mechanism 372, is mounted on an upper slide block 447 for horizontal sliding movement in a direction tangentially to the path of travel of the head 25. Similarly, the upper slide block 447, like the upper slide block 381 of the repositioning mechanism 372, is mounted on the lower end of a vertical slide rod 448 for horizontal sliding movement radially of the turret 26. The two slide blocks 446 and 447 are likewise provided with respective micrometer screw adjustment mechanism 499 (only one of which is shown in FIG. 20), which are similar to the micrometer screw adjustment mechanisms 385 on the reflector repositioning mechanism 372 at station G, for use in adjusting the positions of the slide blocks 446, 447 within their respective slideways in order to thereby accurately locate the lower slide block 446 so that the vertical center axis of the three ball contacts 445 on the positioning fingers 444 is located in exact predetermined relation to the vertical center axis of the reflector holder 56 of the heads 25 when positioned at station H. The slide rod 448, which corresponds to the outer sleeve 382 of the reflector repositioning mechanism 372, is vertically slidable within a sleeve bearing 450 mounted on a support bracket 451 fastened on the upper table 159 of the apparatus.

The slide rod 448 is vertically reciprocated between a raised inoperative position in which the lower slide block 446 and the positioning fingers 444 thereon are located entirely above the rims 20 of the reflector sections in the heads 25 so as to be clear thereof during their index to and away from station H, and a lowered operative position in which the ball contacts 445 on the three positioning fingers 444 are engaged with the reflecting surface 4 of the reflector section 2 in the head 25 at station H to finally center it therein. The vertical movements of the slide rod 448 are imparted thereto by an overhead operating lever (not shown) which is similar to the operating lever 390 for the primary reflector repositioning mechanism 372 and likewise actuated by the master actuating rod 188 of the apparatus, and the outer end of which is connected by a vertical connecting link, similar to the link 391, to a vertical push rod 452 the lower end of which extends into a bore opening or well 453 in the upper end of the slide rod 448. The push rod 452 is vertically slideable within an inner bearing sleeve 454 fastened within the upper end of the bore opening 453 in the slide rod 448. The downward motion of the push rod 52 by the operating lever therefor is transmitted to the slide rod 448 through a compression coil spring 455 located in the bore opening 453 of the slide rod 448 and compressed between the lower end of the push rod and the bottom of the bore opening. The upward or lift motion of the push rod 52 by the operating lever therefor is transmitted to the slide rod 448 through the engagement of an outward collar 456 on the lower end of the push rod with a bottom end 457 of the inner bearing sleeve 454. The inner bearing sleeve 454 is provided at its upper end with an outward collar 458 which is bolted to the upper end of the slide rod 448 and extends outwardly therebeyond. The downward movement of the slide rod 448 and the associated slide blocks 446, 447 and positioning fingers 444, beyond that normally required to effect in each case the engagement of the three ball contacts 445 with the reflector section 2 in the heads 25 at station H, is limited by the engagement of adjustable stop screws 459 on the collar 458 of the inner bearing sleeve 454 with the upper end 460 of the sleeve bearing 450.

To permit the final precise centering of the reflector section 2 in the head 25 at station H by the secondary reflector repositioning mechanism 443, the reflector section must, of necessity, be unclamped in its holder 56 so as to be free to shift laterally therein and accommodate itself to the position of the three ball contacts 445 of the secondary reflector repositioning mechanism when lowered into engagement with the reflector section. Accordingly, as soon as each head 25 arrives at station H, the reflector clamps 63 are lifted off the rim 20 of the reflector section 2 by clamp disabling or lift mechanism 461 located directly beneath the head 25 at station H, and then maintained in such lifted position by the lift mechanism 461 until after the secondary reflector repositioning mechanism 443 has been moved down to its lowered operative position and all three of its ball contacts 445 engaged with the reflecting surface 4 of the reflector section 2 in the head 25 to thereby effect the final precise centering of the reflector section therein, following which the clamp lift mechanism 461, while the secondary reflector repositioning mechanism 443 is still engaged with the reflector section 2, is then disengaged from the clamps 63 to thereby allow them to return to their clamping position reengaged with and pressing down against the rim 20 of the reflector section by the force of their biasing coil springs 65. As shown, the clamp lift or disabling mechanism 461 comprises a set of three vertically extending push pins or rods 462 which are so mounted on the outer ends of the respective arms 463 of a three-armed lift spider 464 as to be vertically aligned with respective ones of the three clamp arm spindles 64 of each head 25 when positioned at station H. The spider 464 is mounted on the upper end of a vertical lift rod 465 for vertical reciprocating movement to raise and lower the push pins 462 into and out of engagement with the clamp arm spindles 64. The lift rod 465 is vertically reciprocable within, but keyed against rotation in a sleeve bearing 466 on a support bracket 467 fastened on the lower table 218 of the apparatus, and it is connected at its lower end, by vertical connecting link 468, to one end of a cam-actuated operating lever 469 which is pivoted intermediate its ends on a horizontal lever shaft 470 for pivotal movement in a vertical plane. The lever shaft 470 is supported in a support bracket (not shown) fastened on and upstanding from the bed 45 of the apparatus. The other end of the operating lever 469 carries a roller 471 which rides within a cam track groove 472 in one side of a face cam 473 fastened on the main index cam shaft 33 of the apparatus.

Also during the dwell of each head 25 at station H, after the final centering of the reflector section 2 in the holder 56 by the secondary reflector repositioning mechanism 443 and while the later is still pressed down into centering engagement with the reflector section, the gauge post 76 of the head 25 is screwed upwardly and raised in its surrounding collar 78 to set its flat top surface 77 in exact predetermined height relation to the focal plane of the reflector section 2 positioned and clamped in the head. For such purpose, the secondary reflector repositioning mechanism 443 is provided with a vertically disposed height gauge stop or setting pin 474 which is vertically aligned with the gauge post 76 of each head 25 positioned at station H and is mounted, in a position offset to one side, on a support arm 475 fastened on the upper slide block 447 of the secondary reflector repositioning mechanism 443. The height gauge setting pin 474 is provided with a micrometer screw type adjustment means 476 for enabling the vertical setting thereof so as to locate its flat bottom end in exact predetermined height relation to the horizontal plane of the three ball contacts 445 of the secondary reflector repositioning mechanism 443. The height reference gauge post 76 of the head 25 is raised in its surrounding collar 78 until its flat top surface 77 abuts against the flat bottom end of the height gauge sttting pin 474 on the secondary reflector repositioning mechanism 443 while the latter is still spring-pressed down into engagement with the reflector section 2 in the head. Since the bottom end of the height gauge setting pin 474 is set in exact predetermined height relation to the horizontal plane of the three ball contacts 445 of the secondary reflector repositioning mechanism 443, and since the horizontal plane of the three ball contacts 445 is located in exact predetermined relation to the focal plane of the reflector section 2 in the head 25 by reason of their being engaged with the reflecting surface 4 of the reflector section, the abutting engagement of the flat top surface 77 of the gauge post 76 against the flat bottom end of the height gauge setting pin 474 therefore operates to set the flat top surface 77 of the gauge post 76 in exact predetermined height relation to the focal plane of the particular reflector section 2 clamped in the holder 56 of the head.

The elevating of the height reference gauge post 76 into abutting engagement with the height gauge setting pin 474, to thereby set it in exact height reference relation to the focal plane of the reflector section 2 positioned in the head 25, is effected by the height gauge elevating or setting mechanism 91 (FIG. 20) which is located beneath the head 25 at station H and comprises the crank pin 89 on one end of the horizontally extending crank arm 90 which is fastened at its other end on the upper end of a vertical shaft 477 vertically aligned with the gauge post elevating screw 83 of the head 25 positioned at station H. The shaft 477 is rotably mounted in vertically spaced arms 478 on the support bracket 467. The crank pin 89 is adapted to engage the corresponding crank pin 88 on the crank arm 87 of the height gauge elevating screw 83, on rotation of the shaft 477 and crank arm 90 in a clockwise direction as viewed from above, to thereby effect corresponding clockwise rotation of the crank arm 87 and elevating screw 83 along with the shaft 477 and crank arm 90, with resultant upward movement of screw-up of the height gauge post 76 into abutting engagement with the gauge setting pin 474. The shaft 477 and crank pin 90 are rotated in a clockwise direction, by a spring-yieldable drive mechanism 479, through whatever portion of a revolution, between 50° minimum and 315° maximum, is normally required to elevate the gauge post 76 in each case into abutting engagement with the gauge setting pin 474, the pitch of the intermeshed screw threads 81 and 82 on the gauge post 76 and elevating screw 83 (FIG. 21) being so selected as to assure that the gauge post will, in the case of each reflector section 2 positioned in the respective heads 25, abut and engage with the gauge setting pin 474 when rotated through at least 50° but no more than 315°. Immediately upon termination of the driving motion of the drive mechanism 479 to effect the clockwise rotation of the shaft 477 and the associated crank pin 89 to raise the height gauge post 76 into abutting engagement with the gauge setting pin 474, and while the head 25 is still positioned at station H, the shaft 477 and associated crank pin 89 are rotated counterclockwise and returned to their initial starting position by the drive mechanism 479, in readiness for the start of the next cycle of operation thereof. On this return stroke of the crank pin 89, it backs away from the crank pin 88 which then, along with the associated elevating screw 83 and gauge post 76, remains fixed in the set position thereof by virtue of the frictional force which is present between the interengaged screw threads 81 and 82 on the gauge post and the elevating screw 83 and between the collar 83' on the elevating screw 83 and the upper side of the head base plate 58, and which is caused by the pressure of the coil spring 84 against the flange 86 on the gauge post 76. In their initial starting positions, the crank pin 88 is located radially outward of the elevating screw 83 and on the axial center line thereof extending radially of the turret 26 while the crank pin 89 is located immediately next to the crank pin 88 in a counterclockwise direction therefrom, as viewed from above, so as to be in position to engage and rotate the crank pin 88 along with its associated elevating screw 83 on clockwise rotation of the crank pin 89 by the drive mechanism 479. With this initial starting position of the crank pins 88, 89, the 50° to 315° limiting range of rotational movement of the elevating screw 83 required to effect the setting of the gauge post 76 in its proper gauging position in engagement with the gauge setting pin 474, in the case of each reflector section 2 that may be positioned in the respective heads 25, assures that the crank pin 89 will be clear of the crank pin 88, and thus will not strike it and cause the disturbing of the set position of the crank pin 88 and gauge post 76, either during the subsequent index movement of the head 25 to the next succeeding work station I or during the return movement of the crank pin 89 to its initial starting position.

The spring-yieldable drive mechanism 479 that effects the rotation of the shaft 477 and crank pin 89 of the height gauge setting mechanism 91 comprises a spur gear 480 mounted for rotation about a vertical axis on a support bearing 481 on the support bracket 467 and intermeshed with a small pinion gear 482 fastened on the lower end portion of the shaft 477. The spur gear 480 is turned through whatever fraction of a complete turn is necessary to effect the rotation of the pinion gear 482 and shaft 477 through the required extent of rotational movement (from 50° to 315°) necessary to effect in each case the setting of the gauge post 76 in engagement with the gauge setting pin 474, by means of a horizontally extending floating arm 483 pivoted at one end, for swinging movement in a horizontal plane, on a vertical shaft 484 journalled in a bearing 485 on the support bracket 467. The other end of the floating arm 483 is engaged with an upstanding crank pin 486 on the spur gear 480, the pin 486 riding in a slot 487 in the end of the floating arm. The ratio of the pitch diameter of the spur gear 480 to that of the pinion gear 482 is so selected, for example, within the range of 5 to 1, that the maximum required 315° rotation of the pinion gear 482 with its associated shaft 477 and crank pin 89 will occur with only a small fraction of a counterclockwise turn, for instance between 55° to 60° rotation, of the spur gear 480. The floating arm 483 is swung back and forth, to effect the rotation of the spur gear 480, by a horizontal operating arm 488 extending alongside the floating arm, on the counterclockwise side thereof as viewed from above, and fastened on the upper end of the shaft 484 so as to rotate therewith. Counterclockwise swinging movement of the operating arm 488 is transmitted to the floating arm 483, to cause counterclockwise rotation of the spur gear 480, through a tension coil spring 489 connected at its opposite ends to spring posts on the respective arms 488 and 483. The clockwise or return swinging movement of the operating arm 488 to its initial starting position is transmitted to the floating arm 483 by the direct abutting interengagement of their adjacent side faces. The swinging movement of the operating arm 488 is imparted thereto by rotation of the shaft 484 on which it is fastened, the shaft being rotated by a horizontal lever arm 490 fastened to its lower end and pivotally connected by a horizontal connecting link 491 to one arm of a cam follower lever 492 which is pivotally mounted on a horizontal level shaft 493 supported on a bracket on the machine bed 45. The other arm of the lever 492 carries a roller 494 which rides in a cam track groove in the side of a face cam 495 fastened on the main index cam shaft 33 of the apparatus. The counterclockwise swinging movement of the operating arm 488 by the cam 495, acting through lever 492, link 491, lever arm 490 and shaft 484, is greater than that normally required for it to raise and set the height gauge post 76 to the height gauging requirements of all reflector sections 2 that may be positioned in the head 25. Any excess counterclockwise swinging movement of the operating arm 488 beyond that required to pull the floating arm 483 to the limit of its pivotal movement, as determined by the abutting engagement of the gauge post 76 with the gauge setting pin 484, is taken up in the expansion of the coil spring 489. A tension coil spring 496 connected to the crank pin 486 and to the frame of the apparatus maintains a constant slack-absorbing rotative force on the spur gear 480 to hold the crank pin 486 thereon firmly against the side wall of the slot 487 in the floating arm 483 at all times, thereby assuring the locating of the crank pin 486, and consequently the crank pin 89, in their exact initial starting positions at the conclusion of the return movement of the drive mechanism 479, in readiness for the start of the next cycle of operation of the height gauge setting mechanism 91.

After the final centering of the reflector section 2 in the head 25 at station H and the setting of the height gauge post 76 in exact height gauging position relative to the focal plane of the finally centered reflector section 2 in the reflector holder 56, the head 25 is then indexed to the next succeeding work station I where the wire leads 7 to 11 in the holder 57 are vertically repositioned therein, by means of wire lead gauging mechanism 497 (FIG. 22) located at that station, to thereby locate their bottom ends in definite height relation to the closed bottom ends 17", 18", ant 19" of the metal thimbles 17, 18, and 19 on the reflector section 2 in the head so as to be subsequently lowered to maximum depth into the molten brazing material 16 in the thimbles without contacting and thereby being deflected out of position by the closed bottom ends 17", 18", and 19" of the thimbles, when the holder 57 is moved down to its lowered position. As shown in FIG. 22, the wire lead gauging mechanism 497 comprises an upstanding feeler post 498 which is carried by a holder arm 499 and which is raised into engagement with the closed bottom end, e.g., and 19", of one of the metal thimbles, e.g., thimble 19, on the reflector section 2, so as to determine whether a thimble and consequently a reflector section is present in the reflector holder 56 and also to determine the elevation in the head 25 of that thimble 19, and consequently of all three thimbles 17, 18, and 19 of the reflector section, the three thimbles all being located at the same elevation relative to the plane of the seating lugs 23 on the reflector section. The feeler post 498 is mounted on the upper end of a vertical lift rod 500 for limited vertical sliding movement thereon, the holder arm 499 being spring-biased upwardly by a compression coil spring 501 on the lift rod 500 so as to be spring-cushioned against downward movement on the lift rod. The lift rod 500 is vertically reciprocable in a sleeve bearing 502 on a support bracket 503 mounted on the upper end of a support post upstanding from the machine bed 45, and it is vertically reciprocated by a horizontal operating lever 504 (FIG. 23) to one end of which it is connected by a vertical connecting link 505. The operating lever 504 is pivoted at its other end on a horizontal lever shaft 506 supported on a bracket on the machine bed 45, and it carries a roller 507 intermediate its ends which rides in a cam track groove 508 in one side of a face cam 509 fastened on the turret index cam shaft 33 of the apparatus. The holder arm 499 is held in proper oriented position, against rotation about the lift rod 500, by a depending guide bar 510 on the holder arm 499 which is held snugly by and vertically slidable between a pair of guide rollers 511 on the support bracket 503.

The elevation determination of the thimble end 19" by the raising of the feeler post 498 into spring-pressed engagement therewith is simultaneously transferred to a wire lead height gauging or setting plate 512 which is located directly beneath the wire lead carrier 57 of the head 25 at station I and is mounted on the upper end of a vertical support post 513 on the holder arm 499. In the course of upward movement of the feeler post 498 into engagement with the thimble 19 of the reflector section 2, the wire lead height setting or gauge plate 512 is carried upwardly by the holder arm 499 through an opening 514 in the head base plate 58 to its wire lead height setting or gauging position below the lead holder 57, as determined by the engagement of the feeler post 498 with the closed bottom end 19" of the thimble 19. With the gauge plate 512 thus held in its wire lead height gauging position, the wire leads 7 to 11 gripped in the wire lead holder 57 are then momentarily released therein, by the opening of the clamping jaws 133 to 138 of the wire lead holder 57, to thereby permit the wire leads to drop down of their own weight until their lower ends engage and rest against the top side of the gauge plate 512, thus setting the wire leads at the correct elevation with respect to the closed bottom ends 17", 18", and 19" of the metal thimbles 17, 18, and 19 of the particular reflector section 2 in the head 25.

As shown more particularly in FIG. 24, the gauge plate 512 is formed with three guide slots or grooves 515, 516, and 517 in its top face 518 within which the lower ends of the wire leads 7 to 11 are received and against the bottoms 519 of which the lower ends of the wire leads engage and rest to thereby set them at the proper gauged height for brazing them into the thimbles 17, 18 and 19 of the reflector section 2 to the maximum depth therein, a slight clearance of around .010 to 0.12 inch ordinarily being allowed between the lower ends of the wire leads and the closed bottom ends 17", 18", and 19" of the thimbles in order to prevent contact therebetween. The three wire-receiving slots or grooves 515, 516, and 517 in the gauge plate 512 are arranged in a bribrach formation in which they extend out from common intersection point so as to underlie the triangularly disposed lower ends of the wire leads 7 to 11, groove 515 underlying the side-by-side lower ends of wire leads 7 and 11, groove 516 underlying the side-by-side lower ends of wire leads 8 and 10, and groove 517 underlying the lower end of wire lead 11. The three grooves 515, 516, and 517 correspond in width, at their bottom regions, to the inside diameter of the nipple ends 17', 18', and 19' of the three identical thimbles 17, 18 and 19 so as to maintain the oriented position of the respective wire leads 7 to 11 in the wire lead holder 57 during wire lead height setting operation, thus assuring that their lower ends will freely enter the nipple ends 17', 18', and 19' of the thimbles during the subsequent lowering and insertion of the wire leads into the thimbles to braze them therein-to. The side walls 520 of the guide grooves 515, 516, and 517 are flared out at their upper regions so as to guide the lower ends of the wire leads 7 to 11 into the narrower wire-confining bottom regions of the guide grooves during the release and ensuing downward movement of the wire leads into engagement with the gauge plate 512.

The momentary releasing of the wire leads 7 to 11 held in the wire lead holder 57 to allow them to drop down into engagement with the gauge plate 512 is effected by a horizontal operating lever 521 (FIG. 22) which overlies the periphery of the turret 26 and extends generally radially thereof and the inner end of which engages with the ball end 152 of the jaw actuating lever 151 on the wire lead holder 57 of each head 25 when positioned at station I, the operating lever 521 for such purpose being formed with a notched inner end 522 within which the ball end 152 of the actuating lever 151 is caught. The operating lever 521 is pivoted intermediate its ends, for swinging movement in a vertical plane, on a pivot pin 523 carried by a bracket 524 supported from the upper table 159 of the apparatus, and it is pivotally connected at its outer end, by a vertical connecting link 525, to one end of a horizontal cam follower lever 526 (FIG. 23) which is pivoted intermediate its ends on a lever shaft 527 supported on a bracket on the machine bed 45. The other end of the lever 526 carries a roller 528 which rides in a cam track groove 529 in one side of a face cam 530 fastened on the main drive shaft 34 of the apparatus. The operating lever 521 is pivoted, by the action of cam 530, lever 526 and link 525, in a direction to swing the jaw actuating lever 151 up and open the wire lead clamping jaws 133 to 137 of the wire lead holder 57 so as to release the wire leads 7 to 11 held therein, and permit them to drop down of their own weight into engagement with the wire lead gauging plate 512, as soon as the thimble feeler post 498 is raised and engaged with the thimble 19 to position the wire lead gauge plate 512 in definite height relation to the closed bottom end 19" of thimble 19. While the wire leads 7 to 11 are thus resting endwise on the gauge plate 512, the operating lever 521 is then pivoted in the opposite direction, during the latter portion of the dwell of the head 25 at station I, to thereby close the clamping jaws 133 to 137 of the wire lead holder 57 so as to reclamp the wire leads 7 to 11 in the holder 57 in their reset gauged position therein. Assurance of the accurate elevational positioning of the wire lead holder 57 relative to the reflector holder 56 and thus to the wire lead height gauge plate 512, during the wire lead height gauging operation at station I, so as to assure in turn the accurate elevational positioning of the wire leads in the holder 57 when reclamped therein, is accomplished by eliminating as far as possible all looseness or play in the head 25. To this end, the support slide 94 which carries the wire lead holder 57, rather than being supported in its elevational position at such time by the latch bolt 118 projecting into the notch opening 119 in the slide 94, is supported instead in exact predetermined elevational position, somewhat higher than that in which it is held by the latch bolt 118, by the riding of the elevation control roller 129 on the support slide 94 into a snugly confining cam track groove or channelway 531 in a fixed cam 532 supported from the upper table 159 of the apparatus, the cam track 531 thus positively holding the support slide 94 and associated wire lead holder 57 of each head 25 at exactly the same elevational during the repositioning and reclamping of the wire leads in the wire lead holder 57. In addition, all slack radially of the turret 26 in the carriage head 96 is taken up at this station I by the engagement of the carriage positioning roller 104 with a stationary plate cam 533 which is mounted on a bracket fastened on the upper table 159 of the apparatus and which urges the roller 104 radially outward of the turret, the outward force of the cam 533 against the roller 104 being transmitted to the carriage head portion 96 through the spring 108 to urge the carriage 97 radially outward to the limit of its outward movement as determined by the engagement of the stop screw 113 on the carriage head portion 96 (FIG. 5) with the shoulder of the notch 112 in the latch bar 110 of the safety catch means 109.

Also during the dwell of each head 25 at station I, pellets of brazing material, for brazing the wire leads 7 to 11 into the metal thimbles 17, 18 and 19 of the reflector section 2, are introduced into the hollow interior of the thimbles. The brazing pellets may be loaded into the thimbles either manually, or by means of any conventional type brazing pellet feeding device such as, for example, one comprising in general a vibratory bowl type feeder adapted to feed the required number of pellets for the respective thimbles of each reflector section 2 into three separate vertically-telescoping feed tubes 534, 535, and 536 (FIG. 22) the lower tube sections of which are held in a holder 537 supported on the lower end of a vertical slide rod 538 which is mounted for vertical sliding movement on a bracket fastened on the upper table 159 of the apparatus and which is verticall reciprocated, by a horizontal operating lever (not shown) controlled by the master actuating rod 188, to move the lower feed tube sections downwardly into the reflector section 2 at station I and locate their bottom ends directly over and closely adjacent the respective openings 13, 14, and 15 in the reflector section 2 leading into the hollow interior of the thimbles. Alternatively, instead of feeding the brazing material into the thimbles 17, 18, and 19 of the reflector sections 2 in the form of pellets, it may be fed thereinto in powdered form by any conventional type powdered material feeding mechanism.

From station I, each head 25 is then indexed through a series of successive heating stations J to R, inclusive, where the metal thimbles 17, 18, and 19 on the reflector section 2 in the head are suitably heated, as by means of gas fires directed against the respective individual thimbles from gas burner sets 539 (FIG. 25) located at such stations, to thereby heat and soften the brazing pellets in the thimbles so as to become liquified. Each burner set 539 comprises a group of three individual gas burners 540 of hollow tubular form which are disposed directly beneath the reflector section 2 in the respective head 25 at each of the heating stations I to J and which are arranged in the same triangular disposition as the thimbles 17, 18, and 19 of the reflector section 2 so as to be movable up around the thimbles during each dwell period of the turrent 26. The gas burners 540 are connected, by suitable flexible conduits 541, to a source of a combustible gas and air mixture, and they are mounted for up and down movement to raise the burners up around the thimbles, at the start of each dwell period of the turret, so as to heat the thimbles and the pellets of brazing material therein, and then move down out of the way of the thimbles just before the start of the ensuing index movement thereof to the next work station of the apparatus. To this end, the two sets 539 of burners at the first two heating stations J and K, the four burner sets 539 at the next four heating stations L, M, N, and O, and the three burner sets 539 at the following three heating stations P, Q, and R, are mounted on respective arcuate supporting platforms 542 which are fastened on the upper ends of respective vertical lift rods 543 that are vertically reciprocable in sleeve bearings 544 (FIG. 26) on respective support brackets 545 mounted on the lower table 218 of the apparatus. The lift rods 543 are each pivotally connected at their lower ends, by connecting rods 546, to one end of respective horizontal operating levers 547 pivoted at their other ends on brackets (not shown) upstanding from the machine bed 45 to swing in a vertical plane. The operating levers 547 are each provided intermediate their ends with a cam roller 548 which rides in a cam track groove in one side of respective face cams 549 fastener either on the main index cam shaft 33 of the apparatus, as in the case of the platforms 542 supporting the burner sets 539 at stations J through O, or on the cross cam shaft 53 as in the case of the platform 542 supporting the burner sets 539 at stations P, Q, and R.

During the very last portion of the index movement of each head 25 from station J to K, the safety catch means 109 locking the carriage 97 in its retracted position throughout the travel of each head from stations F to K is disengaged from the carriage so as to permit the subsequent outward movement of the carriage to its advanced position once again during the index of each head from stations K to L. The release of the safety catch means 109 from the carriage 97 is effected by the engagement of a roller 550 (FIGS. 5 and 6) on the latch bar 110 of the safety catch means 109 with a stationary block cam 551 (FIG. 10) just as each head arrives at station K. The block cam 551 is fastened to the underside of the support bracket 148 located at stations K–L and it acts to pivot the latch bar 110 so as to disengage its notched end 112 from behind the head of the stop screw 113, thus freeing the carriage 97 for sliding movement radically outward of the turret 26 to its advanced or outward position.

On the ensuing index of each head 25 from stations K to L, the carriage 97, having been released at station K by the safety catch means 109 for outward sliding movement on the turret 26, is then advanced once again to its radially outward position by the engagement of the carriage-positioning roller 104 within the downwardly-opening outwardly-angled cam slot or groove 552 of a sationary overhead cam track 553 (FIG. 10) extending between stations K and L and fastened to and depending from the underside of the support bracket 158 at stations K–L which is fastened to the periphery of the overhead table 159. The carriage 97 is thereafter yieldingly held in its advanced position, while it is positioned at station L, as well as during its ensuing travel through stations L to U inclusive, by the engagement of the carriage positioning roller 104 with a stationary overhead cam track 554 which extends part way around the apparatus concentrically about the axis of rotation of the turret 26 and which is fastened to and depends partly from the brackets 158 at stations K–L and U–V and partly from a series of additional brackets which are similar to the brackets 160 (FIG. 11) at stations B and C and which extend radially outward therefrom at stations O, P, R, and S. The cam track 554, like the cam track 157 (FIG. 5), exerts radially outward pressure on the carriage positioning roller 104 which is transmitted through coil spring 108 to the carriage head 96 so as to continuously hold the carriage 97 in its advanced radially-outward position as determined by the engagement of the head 102 on stop pin 103 with the upstanding arm 100 on the carriage support bearing 101.

At stations M and N, the lower ends of the wire leads 7 to 11 held in the wire lead holder 57 and projecting downwardly therefrom are preheated preparatory to their subsequent immersion in the molten brazing material 16 in the thimbles 17, 18, and 19 of the reflector section 2 at the following station O. The preheating of the wire leads is effected by gas fires directed thereagainst from fixed gas burners (not shown) located at stations M and N above the peripheral region of the turret 26 and supported on the frame of the apparatus.

By the time each head 25 reaches station O, the thimbles 17, 18, and 19 of the reflector section 2 held therein have become sufficiently heated by the gas burner sets 539 at the preceding stations J to N to liquify the brazing material 16 in the thimbles so as to permit the introduction thereinto of the wire leads 7 to 11. Accordingly, as each head 25 is indexed to and positioned at station O, the wire lead holder 57 thereof is moved down to its lowered position, as determined by the engagement of the slide 94 with the limiting stop pin 117 on the carriage 97, to insert the lower ends of the wire leads 7 to 11 held in the wire lead holder into the corresponding thimbles 17, 18 and 19 of the reflector section 2 and immerse then in the liquified brazing material 16 then present in the nipple ends 17', 18', and 19' of the thimbles. The lowering of the wire lead holder 57 at station O is effected by the operation of the head lowering mechanism 127 which is located thereat and which is identical to the head lowering mechanism at station A, as described hereinabove in connection with FIG. 5. To permit the downward movement of the wire lead holder 57 at station O by the head lowering mechanism 127, the latch bolt 118 which theretofore held the slide 94 and associated wire lead holder 57 in their raised or upper position, is disengaged from within the notch opening 119 in the slide 94 by the engagement of the roller 123 on the latch bolt operating lever 124 with a stationary block cam 555 (FIG. 10) which is fastened to the underside of a support bracket (not shown) located at station O of the apparatus and fastened on the upper table 159, the cam 555 acting to pivot the lever 124 so as to retract the latch bolt 118 and free the slide 94 and associated wire lead holder 57 for downward movement just as the head 25 arrives at station O. At the lower limit of the downward movement of the slide 94 and associated lead holder 57 by the head lowering mechanism 127 (FIG. 5), the trip lever 174 of its disconnect means 175 is pivoted, by the downward movement of the push rod 202 by operating lever 177, to cause the trip lever to engage and pivot or trip the locking lever 170 so as to swing the roller 171 thereon out from behind the heel of the swing latch 163 on the head lowering mechanism, thus permitting the spring-loaded swing latch 163 to swing out to its tilted position so as to disengage itself from the roller 129 on the slide 94 and permit the subsequent upward return movement of the head lowering mechanism 127 by the operating lever 177 to its raised starting position once again. Because of the gauging and setting of the wire leads 7 to 11 at station J in predetermined height relation to the closed bottom ends 17'', 18'', and 19'' of the thimbles 17, 18 and 19 of the reflector section 2 in the particular head 25, as well as to the stop pin 117 on the carriage head 96, the lowering of the slide 94 and holder 57 at station O into resting engagement on the stop pin 117 therefore assures the insertion of the lower ends of the wire leads 7 to 11 into the thimbles 17, 18, and 19 to the proper maximum depth therein without their contacting the bottom end walls 17'', 18'', and 19'' of the thimbles such as might result in the possible displacement of the wire leads from their desired final position in the thimbles.

Following the downward movement of the slide 94 and associated wire lead holder 57 at station O to their lowered position resting on the stop pin 117 to effect the insertion of the wire leads 7 to 11 into the molten brazing material 16 in the thimbles 17, 18, and 19 of the reflector section 2 in the head 25, the slide 94 and associated wire lead holder 57 then remain in such lowered position throughout the ensuing travel of the head from stations O to U during which time the thimbles 17, 18, and 19 on the reflector section 2 continue to be heated, by gas fires from the gas burner sets 539 at stations P, Q, and R, to thereby maintain the molten condition of the brazing material 16 in the thimbles and thus assure the effective bonding of the brazing material to the wire leads 7 to 11 and to the thimbles 17, 18, and 19.

Beginning with station S and continuing through station U, the thimbles 17, 18, and 19 on the reflector sections 2 in the heads 25 are gradually cooled down at a controlled rate and kept from oxidizing, by following the same procedure heretofore customary, i.e., by directing combination cooling and reducing gas fires thereagainst from gas burners (not shown) at said stations similar to those disclosed in the aforementioned Pakish et al. U.S. Pat. 2,932,877 and employed for this same purpose of cleaning the nipple ends 17', 18', and 19' and adjacent portions of the thimbles 17, 18, and 19 of oxide, and cooling said thimbles to a temperature where they will not oxide in the surrounding atmosphere. These oxide-reducing and cooling burners at stations S to U operate in the same manner as disclosed in the said Pakish et al. patent to first direct soft reducing flames of burning hydrogen around the lower nipple ends 17', 18', and 19' and adjacent shoulders of the thimbles 17, 18, and 19 to clean the oxide therefrom, following which the burners are then moved upwardly to their full up position to enclose and seal off the nipple ends and adjacent shoulders of the thimbles from the atmosphere so as to be out of the oxidizing effect thereof, whereupon the thimbles are then cooled at an accelerated rate by reason of their being seated on the cooling gas burners which are cooled by water circulated therethrough. The final result of the reducing and cooling burners at stations S to U is the cooling of the thimbles 17, 18, and 19 to a point where they do not tend to oxidize when the burners at these stations are withdrawn from engagement therewith.

By the time each head 25 is located at station U, the brazing material 16 in the thimbles 17, 18, and 19 of the reflector section 2 in the head 25 at that station has become fully solidified so that the wire leads 7 to 11 are by that time firmly brazed into and supported in place within the thimbles. Accordingly, the wire leads 7 to 11, which up to that time have been held in the wire lead holder 57, are released therefrom during the dwell of each head 25 at station U, and the lead holder 57 then raised to its upper position once again on the carriage 97. The release of the wire leads 7 to 11 from the holder 57 is brought about at such time by the engagement of the release arm 339 on the lead holder raising mechanism 128 (FIG. 27) at station U with the ball end 152 of the jaw actuating lever 151 of the lead holder 57, during the last portion of the downward movement of the lead holder raising mechanism by the operating lever 360 thereof to pick up the slide 94 and associated lead holder 57 for the return movement thereof to their raised position. With the wire lead clamping jaws 132 to 137 of the lead holder 57 thus open to release their grip on the wire leads 7 to 11, the slide 94 and associated wire lead holder 57 are then free to be lifted and returned to their raised position on the carriage 97 by the lead holder raising mechanism 128 at station U, in which raised position they are then held by the spring-loaded latch bolt 118 which snaps into the notch opening 119 in the slide 94. The operation of the lead holder raising mechanism 128 at station U to lift the lead holder 57 to its raised position thereat is exactly the same as that disclosed hereinabove for the other lead holder raising mechanism 128 at station E. The lifting of the slide 94 and associated wire lead holder 57 to their raised position serves to withdraw the wire lead holder from within the reflector section 2 in the head 25 so as to clear the latter from subsequent horizontal shifting movement of the carriage 97 and wire lead holder 57 inwardly of the turret 26 to the retracted inward position of the lead holder 57 out of overlying relation to the reflector holder 56 and the reflector section 2 located therein. This inward shifting of the carriage 97 and associated lead holder 57 takes place during the subsequent index movement of each head 25 from stations U to V, and is brought about by the engagement of the carriage positioning roller 104 within the downwardly-opening inwardly-angled cam slot or groove 556 of a stationary overhead cam track 557 (FIG. 10) extending between stations U and V and fastened to and depending from the underside of the support bracket 158 at stations U–V which is fastened to the periphery of the overhead table 159. The inward shifting of the carriage 97 and associated lead holder 57 to their retracted position inwardly of the turret 26 and out of the way of the reflector section 2 in the head 25 thus serves to completely expose the interior of the reflector section 2 so as to permit the movement thereinto of the work-performing mechanisms at the subsequent work stations of the apparatus for trimming and grooving the wire leads 7 to 10 on the reflector section and mounting the filaments 5 and 6 thereon. The carriage 97 and associated lead holder 57 are locked in their retracted position at this time, and during the ensuing travel of the head 25 through the remaining work stations of the apparatus, by the engagement of the notch 112 of the spring-loaded latch bar 110 of the safety catch means 109 behind the head of the stop screw 113 on the head portion 96 of the carriage 97. However, to prevent outward shifting of the carriage 97 and associated lead holder 57 in case the safety catch means 109 should for some reason accidentially become disengaged from the head of the stop screw 113 on the carriage head portion 96, which outward shifting may cause the lead holder 57 to interfere with the operation of the various work-performing mechanisms at the remaining work stations of the apparatus, a stationary overhead cam track or guardrail 558 (FIG. 10) is provided on the apparatus for engagement with the carriage positioning roller 104 to restrain any such outward shifting of the carriage. The guardrail 558 extends around the apparatus, concentrically about the axis of rotation of the turret 26, from station Z to the last work station D' of the apparatus, and it is fastened to and supported partly from the brackets 158 at stations U–V and D'–A and partly from other similar brackets at certain of the other stations W to Z and A' to C'.

At station V, optical means (not shown) may be provided thereat, if desired, for lowering into operative relation to the reflector section 2 in the head 25 at that station and momentarily protecting images of the wire leads 7 to 11, in both the X and Y planes, onto a viewer screen for periodic observation thereof by an operator to check the operation of the apparatus from time-to-time.

At the next station W of the apparatus, the four wire leads 7 to 10 of each reflector section 2, which leads are to support the two filaments 5 and 6 of the finished lamp, are trimmed to final length, to locate their free tip ends in exact predetermined height relation in each case to the focal plane of the reflector section, by means of a wire lead trimming mechanism 560 (FIG. 28) located directly above the reflector section 2 in the head 25 at that station. This assures that the same total wire length of the respective filaments 5 and 6, and therefore the same filament resistance, will be connected across the inner tip ends of the wire leads 7, 8, 9, and 10 in each lamp, thereby affording uniform light output from lamp to lamp and thus a uniform lamp product. The wire lead trimming mechanism 560 is generally similar to that employed heretofore for this operation and comprises, in general, a horizontally disposed flat trimmer die plate 561 which is moved down over the upper tip ends of the wire leads 7 to 11 in the reflector section 2, the die plate 561 being provided for such purpose with wire-receiving apertures therein corresponding in size and location to, and vertically aligned with, the wire leads 7 to 11 on the reflector section 2 to enable the die plate 561 to be moved down over the upper ends of the wire leads to the required depth to locate the flat upper side or wire-trimming surface of the die plate in each case at the same height relative to the focal plane of each respective reflector section 2. The trimmer die plate 561 is fastened on the bottom end of a vertical slide 562 which is mounted for vertical sliding movement on a vertical support plate 563 within a guideway formed by spaced ways 564 fastened thereon. The support plate 563 is mounted on an overhead support bracket 565 which is fastened on the upper table 159 of the apparatus. The slide 562 is moved up and down in the guideways 564 by a vertical actuating rod 566 which is vertically slidable in the slide 562 and extends down into a vertically extending through cross slot 567 therein. The actuating rod 566 is pivotally connected at its upper end, by a connecting link 568, to the outer end of a horizontally extending overhead operating lever (not shown) pivotally mounted intermediate its ends on a support bracket fastened on the upper table 159 of the apparatus and carrying a roller at its inner end engaged within the annular groove 186 of the collar 187 on the upper end of the master actuating rod 188. Upward movement of the slide 562 by the actuating rod 566 is effected by the engagement of a cross pivot pin 569 on the lower end of the actuating rod 566 with the upper ends 570 of opposed vertical side slots 571 in the side walls 572 of the slide 562, through which slots the pivot pin 569 extends to the outer sides of the slide. Downward movement of the slide 562 by the actuating rod 566 is effected by the downward pull on the slide of a pair of vertically disposed tension coil springs 573 which are connected at their lower ends to the opposite ends of the pivot pin 569 on the actuating rod 566 and at their upper ends to spring posts 574 on the slide 562.

On indexing of each head 25 to the wire lead trimming station W, the vertical slide 562 of the wire lead trimming mechanism 560 is moved downwardly by the actuating rod 566, acting through the downward pull of the coil springs 573 on the slide, until a downwardy facing inclined stop shoulder 575, at the lower end of a tongue 576 which extends from the back side of the slide through a vertical slot 577 in the support plate 563, strikes against and comes to rest on a corresponding inclined end face or stop shoulder 578 on a horizontal height-setting slide 579 mounted for horizontal sliding movement on the support plate 563 in a direction parallel to the path of travel of the head 25 to and away from station W. The height-setting slide 579 positions the vertical slide 562, and therefore the wire trimmer die plate 561 thereon, in each case at the same height relative to the focal plane $a$—$a$ of each reflector section 2 positioned in a head 25 at station W. To such end, the horizontal position of the height-setting slide 579 is controlled and set for each individual reflector section 2 positioned at station W by a bell crank lever 580 which is pivotally mounted on the support plate 563, on a horizontal pivot pin 581 extending therefrom, and the pivotal position of which is set in each case by the engagement of the height gauge post 76 on each head 25 with a roller 582 on the end of the horizontal arm 583 of the bell crank lever 580. The generally vertical other arm 584 of bell crank lever 580 is pivotally connected to the horizontal height positioning slide 579 by a pin-and-slot type connection comprising a roller 585 on the slide 579 received within an open-ended slot 586 in the lever arm 584. The horizontal slide 579 is spring-biased by a compression coil spring 587 in a direction to pivot the bell crank lever 580 so as to continuously hold the roller 582 thereon in downward spring-pressed engagement with the top end or reference surface 77 of the gauge post 76 on the head 25 at station W, irrespective of whatever height-gauging position the gauge post 76 has been set to at the reflector height-gauging station H. The coil spring 587 is compressed between a stop nut 588 threaded on a stud 589 extending from the end of the slide 579 and an adjustable hollow stop bolt 590 having a threaded hollow shank (not shown) screw-threaded into a cover plate 591 fastened on the support plate 563. The end of the threaded hollow shank of the stop bolt 590 acts as a stop against which the horizontal slide 579 abuts to limit the extent of its spring-induced sliding movement and, in turn, the extent of pivotal movement of the bell crank lever 580 when disengaged from the individual gauge posts 76 of the heads 25 during each index of the turret 26, so that the roller 582 on the bell crank lever 580 will at such time be maintained by the spring 587 at a limiting lower position sufficiently high to permit the roller to freely ride up onto the top surface 77 of the gauge post 76 of each head 25 when indexed into position at station W. As each head 25 is indexed to station W, the gauge post 76 thereon, which is still in the height gauging position to which it was set at station H relative to the focal plane of the particular reflector section 2 in the head, engages the roller 582 of the bell crank lever 58 and pivots the latter, causing it to shift the horizontal positioning slide 579 so as to set it in a predetermined horizontal position as determined by the elevation of the top surface 77 of the gauge post 76. The vertical slide 562 is then lowered by the action of its operating lever, acting through the connecting link 568, actuating rod 566 and coil springs 573, until the inclined stop shoulder 575 on the slide 562 abuts against the corresponding inclined end face 578 of the positioning slide 579, thereby locating the wire lead trimmer die 561 at the proper elevational level relative to the top 77 of the gauge post 76, and therefore relative to the focal plane a—a of the particular reflector section 2 in the head 25 for the trimming of the wire leads 7 to 10 to the proper length. Continued downward overtravel movement of the actuating rod 566 relative to the vertical slide 562, after the latter is lowered to its limiting position as determined by the engagement of its inclined stop shoulder 575 with the inclined end face 578 of the positioning slide 579, then actuates a flat trimmer knife 592 to cause the knife edge 593 thereof to shear off the tip end portions of the wire leads 7 to 10 projecting above the flat top surface of the trimmer die plate 561. Since the other or fifth wire lead is employed merely to support the shield 12 in a finished lamp, its length therefore is not particularly important and so it does not need to be trimmed to any particular length. Accordingly, the stroke of the wire trimmer knife 592 is just sufficient to shear off the ends of only the four wire leads 7 to 10 which are to support the filaments 5, 6 of the finished lamp. The trimmer knife 592 is in the form of a slide mounted for horizontal sliding movement in a guideway in the lower end of the vertical slide 562 and confined therein so as to lie flat against the flat upper side of the trimmer die plate 561. The actuation of the trimmer knife 592 by the overtravel movement of the actuating rod 566 is effected by a generally vertically extending throw lever 594 which is pivotally mounted intermediate its ends on a pivot pin 595 on the slide 562 and is pivotally connected at its upper end, by a slightly inclined connecting link 596, to the pivot pin 569 on the lower end of the actuating rod 566. The throw lever 594 is pivotally connected at its lower end, by a ball end and socket connection, to the trimmer knife 592.

After the trimming of the four wire leads 7 to 10 to proper length at station W, each head 25 is then successively indexed to stations X and Y at each of which a respective pair of the wire leads 7–8 and 9–10 which are to respectively support the two filaments 5 and 6 of the finished lamp are grooved along their outwardly facing sides for a short distance inwardly from their free ends, as indicated at 597 in FIG. 30, by similar type wire lead grooving or hook-forming mechanisms 600 (FIG. 29) located at these work stations X and Y. The wire leads 7, 8 which are to support the major filament 5 are grooved at station X while the wire leads 9, 10 which are to support the minor filament 6 are grooved at station Y. Although the particular wire lead grooving mechanism 600 shown in FIGS. 29 and 30 is the one located at station Y for grooving the wire leads 9, 10 that are to support the minor filament 6, the one located at station X is of identical construction except for minor changes therein, such as in the shape and dimensional location of certain of the parts thereof, which changes are necessary in order to compensate for the difference in the location of the wire leads 7, 8 of the reflector section 2. Accordingly, the following description of the wire lead grooving mechanism 600 at station Y is applicable as well to that at station X.

The wire lead grooving or hook-forming mechanisms 600 are generally similar to that employed heretofore for this same purpose, and they each comprise, in general, a horizontally disposed anvil die plate 601 which is moved down over the upper tip ends of the wire leads 7 to 11 in the reflector section 2, the die plate 601 for the illustrated lead grooving mechanism 600 at station Y being provided for such purpose with wire-receiving apertures 602 corresponding in size and location to and vertically aligned with the wire leads 7, 8, and 11 so as to accommodate them therewithin, and also being provided with open-ended vertically extending side slots 604 and 605 opening outwardly away from one another and corresponding in location to and vertically aligned with the wire leads 9 and 10 so as to accommodate them therewithin. As shown, the side slots 604, 605 are formed at their inner ends with V-shaped anvil die surfaces 606 the vertex regions of which are rounded to conform to and fit snugly between the semicircular facing sides of the two circular cross-section wire leads 9 and 10. The anvil die plate 601 is fastened on the bottom end of a vertical slide 607 which is mounted for vertical sliding movement on a vertical support plate 608 within a guideway formed by spaced ways or gibs 609 fastened thereon. The support plate 608 is mounted on an overhead support bracket 610 which is fastened on the upper table 159 of the apparatus. The slide 607 is moved up and down in the guideways 609 by a vertical actuating rod 611 provided at its lower end with a vertically extending slide cam 612 which is mounted for vertical sliding movement on the vertical slide 607. The actuating rod 611 is pivotally connected at its upper end, by a connecting link 613, to the outer end of a horizontally extending overhead operating lever 614 pivotally mounted intermediate its ends on a support bracket fastened on the upper table 159 of the apparatus and carrying a roller at its inner end engaged within the annular groove 186 of the collar 187 on the upper end of the master actuating rod 188. Upward movement of the slide 607 by the actuating rod 611 is effected by the engagement of a pin 615 on the extending slide cam portion 612 of the actuating rod 611 with the upper end 616 of a vertical slot 617 in a cover plate 618 fastened on the slide 607 over the guideways therein for the slide cam 612. Downward movement of the slide 607 by the actuating rod 611 is effected through a pair of compression coil springs 619 which are telescoped over vertical supporting rods 620 upstanding from a support plate 621 fastened on the upper end of the slide 607 and which are compressed between the support plate 621 and a spring follower arm 622 fastened on the actuating rod 611.

On indexing of each head 25 to each of the wire lead grooving or hook-forming stations X and Y—in the particular case shown the wire lead grooving station Y for the wire leads 9 and 10—the vertical slide 607 of the wire lead grooving mechanism 600 is moved downwardly by the operating lever 614, acting through the connecting link 613, actuating rod 611, spring follower arm 622 and coil springs 619, until its downward movement is terminated by height-setting means 623 like that shown in FIG. 28 for the vertical slide 562 of the wire lead trimming mechanism 560, the vertical slide 607 being provided with a similar downwardly facing inclined stop shoulder 575 which strikes against a corresponding inclined end face or stop shoulder 578 of a similar horizontal height-setting slide 579 mounted for horizontal sliding movement on the vertical slide 607. The horizontal slide 579 of the height-setting means 623 thus positions the vertical slide 607, and therefore the anvil die plate 601 carried thereby, in each case at the same height relative to the focal plane a—a of each reflector section 2 positioned in a head 25 at station Y, at which height the anvil die plate 601 is positioned down over and encloses the upper tip ends of the wire leads 7 to 11 for a distance at least equal to the distance that the wire leads 9 and 10 are to be grooved therealong from their top ends. The horizontal position of the horizontal slide 579 of the height-setting mechanism 623 is controlled and set for each individual reflector section 2 positioned at station Y in the same manner as in FIG. 28, i.e., by means of a similar bell crank lever 580 which is pivoted on the support plate 608 and has its vertical arm connected to the horizontal slide 579 by a pin-and-slot type connection. As in FIG. 28, the pivotal position of the bell crank lever 580 of the height-setting mechanism 623 is set in each case by the engagement of the height gauge post 76 on each head 25 with a roller 582 on the end of the horizontal arm 583 of the bell crank lever 580. The horizontal slide 579 is spring-biased in the same manner as in FIG. 28, by a compression coil spring 587, to pivot the bell crank lever 580 so as to hold the roller 582 in downward spring-pressed engagement with the top end 77 of the gauge post 76 in the head 25 at station Y.

As each head 25 is indexed to station Y, the gauge post 76 thereon, which is still in its set height-gauging position, engages the roller 582 on the bell crank lever 580 of the wire lead grooving mechanism 600 and pivots the lever, causing it to shift and set the horizontal height-setting slide 579 to its proper height-locating position for the vertical slide 607. During the ensuing dwell of the head at station Y, the vertical slide 607 is lowered by its operating lever 614, acting through the connecting link 613, actuating rods 611, follower arm 622 and coil springs 620, until the inclined stop shoulder 575 on the vertical slide 607 abuts against the corresponding inclined end face 578 of the positioning slide 579, thereby locating the anvil die plate 601 at a predetermined elevational level relative to the top 77 of the gauge post 76, and therefore relative to the focal plane $a$—$a$ of the particular reflector section 2 in the head 25 and thus to the upper tip ends of the wire leads 9 and 10, for the grooving thereof to the proper distance down from their tip ends. Continued downward overtravel movement of the actuating rod 611 and its downwardly extending slide cam extension 612 relative to the vertical slide 607, after the latter is located in its limiting lowered position as determined by the engagement of its inclined stop shoulder 575 with the inclined end face 578 of the positioning slide 579, then actuates a pair of vertically extending pivoted levers 624 on the slide 607 to pivot them to their closed or operative position to cause V-ended punches 625 mounted on their lower ends to move horizontally into the slots 604, 605 of the anvil die plate 601 and forcefully press against the sides of the wire leads 9 and 10 located therein so as to deform them against the V-shaped die surface 606 and form the V-grooves 597 (FIG. 30) in the upper tip end portions of the wire leads. The levers 624 are pivotally mounted intermediate their ends on a common pivot pin 627 extending horizontally from the vertical slide 607, and they carry rollers 628 at their upper ends between which the vertically depending slide cam 612 on the actuating rod 611 passes on its downward overtravel stroke to cause its rounded lower wedge end 629 to engage and wedge the rollers 628 apart so as to pivot the levers 624 to press the V-ended punches 625 thereon against the upper tip ends of the wire leads 9 and 10 positioned within the slots 604, 605 of the anvil die plate 601. The levers 624 are normally held in their operative or opened pivoted position, with their V-ended punches 625 withdrawn from the slots 604, 605 in the anvil die plate 601, by the pull of a tension coil spring 630 connected across the upper ends of the levers 624 between spring posts thereon. On the upward return stroke of the actuating rod 611, the flat vertical sides or cam surface portions of the slide cam 612 extending from the actuating rod and holding the levers 624 in their closed position, are withdrawn from between the rollers 629 to allow the levers 624 to be swung back to their normal open position once again by the pull of the coil spring 630 and thus withdraw the V-ended punches 625 from within the slots 604, 605 in the anvil die plate 601.

From the last wire lead grooving or hook-forming station Y, each head 25 is then successively indexed to stations Z and A' where the major and minor filaments 5 and 6 are respectively mounted on the grooved tip ends of the wire leads 7, 8 and 9, 10, respectively, by similar type filament mounting or clamping mechanisms 635 (FIGS. 31 and 32) located at these stations. The filament mounting mechanisms 635 are each comprised of a filament clamping means of generally similar construction to that of the wire lead grooving mechanisms 600 at stations X and Y except for minor changes in the shape of certain of the parts thereof and the substitution of filament clamping jaws for the wire lead grooving punches 625. In general, however, the filament mounting means 635 comprises a vertical slide 636 which corresponds to the vertical slide 607 of the wire lead grooving mechanisms 600 and is mounted for vertical sliding movement on a vertical support plate 637 mounted on an overhead support bracket 638 which is fastened on the upper table 159 of the apparatus. The vertical slide 636 is formed with a right-angled slide plate portion 639 which has a sliding fit within a vertical guideway formed by a pair of vertically extending spaced ways or gibs 640 fastened to the support plate 637. The vertical slide 636 is moved up and down in the guideways 640 in the same way as the vertical slide 607 of the wire lead grooving mechanisms 600, i.e., by a corresponding vertical actuating rod 641 provided at its lower end with a vertically extending slide cam portion 642 which is mounted for vertical sliding movement on the vertical slide 636 within a guideway 643 thereon. The actuating rod 641 is pivotally connected at its upper end, by a connecting link 644, to the outer end of a horizontally extending overhead operating lever 645 pivotally mounted intermediate its ends on a support bracket fastened on the upper table 159 of the apparatus and carrying a roller at its inner end engaged within the angular groove 186 of the collar 187 on the upper end of the master actuating rod 188. Upward movement of the slide 636 by the actuating rod 641 is effected by the engagement of a pin 646 on the extending slide cam portion 642 of the actuating rod 641 with the upper end 647 of a vertical slot 648 in the slide 636. Downward movement of the vertical slide 636 by the actuating rod 611 is effected through a pair of compression coil springs 649 which are telescoped over vertical support rods 650 upstanding from a support plate 651 fastened on the upper end of the vertical slide 636 and which are compressed between the support plate 651 and a spring follower arm 652 fastened on the actuating rod 641.

Figure 32:
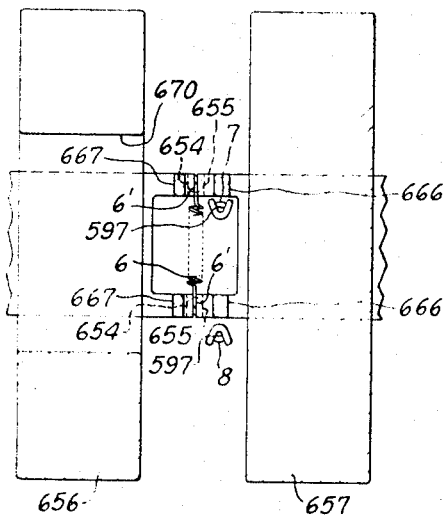
FIG. 32 is a plan view, on an enlarged scale, of the filament clamping jaws of one of the filament mounting mechanisms of the apparatus.

On indexing of each head 25 to each of the filament mounting stations Z and A', in the particular case shown in FIGS. 31 and 32 the mounting station A' for the minor filament 6, the vertical slide 636 of the filament mounting mechanism 635 located thereat is moved downwardly by the operating lever 645 therefor, acting through the connecting link 644, actuating rod 641, spring follower arm 652 and coil springs 649, until its downward movement is terminated by height-setting means 653 the same as that shown in FIG. 28 for the vertical slide 562 of the wire lead trimming mechanism 560 at station W, the vertical slide 636 being provided for such purpose with a similar downwardly facing inclined stop shoulder 575 which strikes against a corresponding inclined end face or stop shoulder 578 of a similar horizontal height-setting slide 579 mounted for horizontal sliding movement on the vertical slide 636. The horizontal height-setting slide 579 thus positions the vertical slide 636, and therefore the filament clamping jaws 654, 655 carried on the lower ends of a pair of levers 656, 657 pivotally mounted on the slide, in each case at the same height relative to the focal plane $a$—$a$ of each reflector section 2 positioned in a head at A', at which height the clamping jaws 654, 655 are then positioned so as to engage and clamp therebetween the V-grooved upper tip ends of the wire leads 9, 10 of the reflector section when the levers 656, 657 are pivoted to their operative or closed position by the slide cam 642. Continued downward overtravel movement of the actuating rod 641 and its downwardly extending slide cam extension 642 relative to the vertical slide 636, after the latter is located in its limiting lowered position as determined by the engagement of its inclined stop shoulder 575 with the inclined end face 578 of the positioning slide 579, then causes the tapered lower wedge end portion 658 of the slide cam 642 to actuate the levers 656, 657 to pivot them to their closed or filament clamping position so as to cause the jaws 654, 655 thereon to squeeze the V-grooved upper tip ends of the wire leads 9, 10 around the end legs 6' of a filament 6 which is held in proper clamping position at this time, with its end legs 6' located along the bottoms of the V-grooves 597 of the wire leads 9, 10, by the filament transfer arm 659 of a filament feeding mechanism 660 located at this station A' of the apparatus. The levers 656, 657 are pivotally mounted intermediate their ends on a common pivot pin 661 extending horizontally from the vertical slide 636, and they carry rollers 662 at their upper ends between which the tapered lower wedge end 658 of the slide cam 642 passes on its downward overtravel stroke to wedge the rollers 661 apart so as to pivot the levers 656, 657 to their closed filament-clamping position. The levers 656, 657 are normally urged toward their inoperative or open pivoted position to maintain the rollers 662 thereon in continuous engagement with the lower wedge end portion 658 of the slide cam 642 by the pull of a tension coil spring 663 which is connected across the upper ends of the levers 656, 657 between spring posts thereon. As shown in FIG. 32, the filament clamping jaws 654, 655 on the levers 656 and 657 comprise a spaced pair of jaws 654 on lever 656 and a cooperating spaced pair of jaws 655 on lever 657, the spacing between each pair of jaws 654 and 655 corresponding to that of the V-grooved upper tip ends of the wire leads 9 and 10 so as to align therewith and squeeze them therebetween during the filament clamping operation.

The filament feeding mechanisms 660 at each of the filament mounting stations Z and A' of the apparatus are located outwardly adjacent the periphery of the turret 26 and they may be of the conventional type heretofore employed for this purpose and comprising, in general, a carriage 664 mounted for vertical movement as well as horizontal movement radially of the turret 26 on a stationary frame portion of the apparatus and provided at its end nearest the turret 26 with a depending transfer arm 659 having a horizontal arm portion 665 which extends radially toward the turret 26 and is provided at its free end with a cooperating pair of filament holder jaws 666 and 667 one of which, i.e., jaw 666, is slidably mounted on the arm 665 and the other one 667 of which is pivoted on the arm 665 and spring-biased so as to hold it in its open position. The pivoted jaw 667 is swung to its closed position by the slidable jaw 666 on sliding movement of the latter to its closed position by the action of an air cylinder operated actuating linkage therefor. Each of the jaws 666, 667 comprises a spaced pair of jaw faces which are spaced apart the distance of and are adapted to grip the filament end legs 6', which extend perpendicularly from the coiled body portion of the filament 6 and parallel to each other, at points closely adjacent the coiled body portion of the filament so as to hold the filament 6 in proper position for mounting on the wire leads 9, 10 with its coiled body portion disposed horizontally and its straight wire end legs 6' extending vertically down therefrom and having their lower free end portions exposed for insertion into the V-grooves 597 of the wire leads 9, 10 and clamping thereto. The filament feeding mechanism 660 is operated in timed relation to the operations of the associated filament clamping mechanism 665 from the same drive means of the apparatus, and in its cycle of operation the filament holder jaws 666 and 667 close to pick up a filament 6 located in a notched feed drum (not shown), following which the carriage 664 raises to lift the filament out of the notch in the feed drum and then moves horizontally toward the filament clamping mechanism 635 and simultaneously downward along with but at a slightly faster rate than the filament clamping jaws 654, 655 of the filament clamping mechanism 635 to thereby carry the filament 6 over the reflector section 2 in the head 25 at station A' and into proper position for mounting on the wire leads 9, 10 as determined by the engagement of an adjustable stop screw 668 on the carriage with the upper surface or stop shoulder 669 formed by an ear on the bottom of the vertical support slide 636 for the filament clamping jaws 654, 655. In its proper mounting position, the filament 6 is held by the transfer jaws 666, 667 with its coiled body portion located in predetermined height relation to the focal plane $a$—$a$, as well as predetermined lateral and oriented relation to the focal point $f$ of the centered reflector section 2 in the head 25, and with its straight wire end legs 6' inserted within and extending along the bottoms of the V-grooves 597 in the upper tip ends of the wire leads 9 and 10. To permit the locating of the filament 6 in its mounting position relative to the wire leads 9, 10, the lever 656 which carries the filament clamping jaws 654 is provided with a vertical slot or opening 670 (FIG. 32) extending completely therethrough and into and through which opening the horizontal filament-supporting arm 665 of the filament transfer arm 659 moves, during the simultaneous downward movement of both the filament clamping jaws 654 and 655 and the filament transfer jaws 666 and 667, to thereby locate the filament 6 in proper mounting position relative to the wire leads 9 and 10 of the reflector section 2 in the head 25. During the simultaneous downward movements of the filament clamping jaws 654, 655 and the carriage 664 of the filament transfer means 660 to their lowered or filament mounting position, the stop screw 668 on the carriage 664, which is moved down at a faster rate than the filament clamping jaws 654, 655, engages with the stop shoulder 669 on the slide 636 carrying the filament clamping jaws, to thus locate the filament transfer jaws 666, 667 and therefore the filament 6 held therein in predetermined elevational filament clamping relation to the filament clamping jaws 654, 655 of the filament clamping mechanism 635, before the slide 636 carrying the filament clamping jaws reaches its lowered or filament-clamping position. As a result, the filament 6 is located in proper mounting position for the clamping thereof to the wire leads 9, 10 as soon as the slide 636 and the filament clamping jaws 654, 655 reach their lowered or filament-clamping position. The ensuing downward overtravel stroke of the slide cam 642 then operates to pivot the levers 656, 657, by the wedging apart of the roller 662 on the levers by the tapered lower wedge end portion 658 of the slide cam 642, to their closed operative position so as to squeeze the V-grooved upper tip ends of the wire leads 9, 10 tightly around the filament end legs 6' positioned therein, thus firmly securing the filament 6 in place on the two wire leads. The filament transfer jaws 666 and 667 continue to hold the filament 6 in place therein, and thus in proper clamping position, during the clamping of its end legs 6' to the wire leads 9, 10, following which the filament transfer jaws 666 and 667 are first opened to release their grip on the filament 6 and the transfer arm 659 then simultaneously raised along with the filament clamping jaws 654, 655 and horizontally withdrawn from within the opening 670 in the lever 656 and returned to its retracted position where it is then lowered to its filament pick-up position once again in readiness for the start of another cycle of operation of the filament feeding mechanism 660.

From the minor filament mounting station A', each head 25 is then indexed to station B' where an optical gauge (not shown) may be provided, if desired, for lowering into the reflector section 2 and projecting x and y images of the two filaments 5 and 6 onto a screen for checking the mounted locations thereof by an operator from time-to-time.

At the next station C' of the apparatus, a shield 12 such as shown in FIG. 2 may, if desired, be mounted on the wire support 11 of the reflector section 2. The shield 12 may be supplied and mounted in place on the wire support 11 by shield-feeding and mounting mechanisms (not shown) at this station similar to that employed heretofore for this same purpose.

At the last station D' of the apparatus, the finished lamp reflector section 2 with the filaments 5 and 6 mounted in place on the wire leads 7 to 10 and, if desired, a shield 12 mounted on the wire support 11, is unloaded from the head 25 either manually or by automatically operating unloading means of conventional type such as have been employed heretofore for such purpose. However, before the reflector section 2 can be removed from the head 25, it first must be unclamped from the reflector holder 56. Accordingly, as soon as each head 25 is indexed to and positioned at the unloading station D', the reflector holdown or clamp arms 63 are raised, and then swung outwardly so as to be clear of the rim 20 of the reflector section 2 in the head, by a clamp arm operating mechanism substantially the duplicate of the mechanism 373 at station G and shown in FIG. 19. Also, on index of each head to the unloading station D', the safety catch means 109 locking the carriage 97 in its retracted position inwardly of the turret 26 is disengaged from the carriage, by the engagement of the roller 550 on the latch bar 110 of the safety catch means with a stationary block cam 671 (FIGS. 5 and 10) located at station D' and fastened to the underside of the support bracket 158 at stations D'–A, to thereby free the carriage 97 for advance movement to its radially outward position on the turret 26, during the subsequent index movement of each head to the next or first work station A of the apparatus for the start of another cycle of operation thereof, by the engagement of the carriage positioning roller 104 within the downwardly-opening outwardly-angled cam slot or groove 155 of the stationary overhead cam track 166 extending between stations D' and A.

From the above detailed description, it will be apparent that by providing( in an apparatus for automatically forming the filament mount structures on the reflector sections of projector type electric incandescent lamps, reflector positioning mechanism for accurately centering in the reflector holders of the apparatus each individual reflector section processed therein and also accurately determining the focal plane thereof, together with adjustable reference means which are set in predetermined relation to rhe focal plane of each individual reflector section as determined by the reflector-positioning mechanism, and utilizing the set position of the reference means to accurately reference, to the focal plane of each individual reflector section, mechanisms for trimming to proper length the filament-supporting wire leads of the reflector sections and mounting the filaments thereon, an apparatus is produced which will fully compensate for variations, from one reflector section to the next, in the optical reflecting surfaces thereof and will operate to mount the filaments on the wire leads in exact predetermined relation to the focal plane and optical focus of each individual reflector section and with the same effective filament leg length in each case. Such an apparatus is therefore capable of producing, at high production rates, reflector and filment mount assemblies of much higher quality and uniformity than heretofore possible with prior apparatus. Furthermore, in the case of a lamp of the two-filament type, by constructing the apparatus so as to hold the filament-supporting wire leads for the reflector section, prior to the bending thereof to offset shape, by the ends thereof to which the filaments are to be connected, and to then bend the so held wire leads in opposite directions and parallel planes to their offset shape and then reposition the offset wire leads to their final oriented relation to one another, the offset bending of all the wire leads therefore can be performed in one single operation at one work station of the apparatus by a single set of bending dies, thus greatly simplifying the lead bending operation and the construction of the mechanism required for performing such operation. Also, by providing in accordance with the invention an apparatus for performing, on a single indexing carrier or turret, the several distinct operations of bending to offset shape the wire leads for the reflector section and attaching them thereto, and mounting one or more filaments on the attached wire leads in exact predetermined relation to the optical focus of the reflector section, an apparatus is produced which not only is of greatly reduced overall size but, more importantly, is completely free of the transitional errors such as ordinarily would occur in the locations of the reflector section and the wire leads where the above-mentioned operations are performed on two or more indexing carriers as in the past and the wire leads and reflector sections necessarily have to be transferred from one machine to another for the performance of these operations.

What we claim as new and desire to secure by Letters Patent of the United States is:

1. Apparatus for assembling a filament mount on a plurality of metal lead-in terminals attached to a reflector section of an electric incandescent lamp, comprising a lead holder adapted to grasp a plurality of straight wire leads by their inner end portions and position them in parallel relation with their said inner end portions accurately located in proper spaced interrelation to support a filament, means for bending the outer end portions of the wire leads in said lead holder outwardly away from one another and in parallel planes to a predetermined offset position, means for rotating at least one of said wire leads in the lead holder about its inner end portion to reposition the offset outer end portion thereof in predetermined oriented relation to the offset outer end portion of another of said wire leads, a reflector holder for positioning the reflector section accurately at a work station, means operable with respect to said reflector holder for attaching the offset outer end portions of the said oriented wire leads to the said terminals of the reflector section in said reflector holder while the said oriented wire leads remain held by the lead holder in their said oriented relation, and means operable with respect to said reflector holder for accurately mounting a filament on the inner end portions of the said oriented wire leads.

2. Apparatus for assembling a pair of filament mounts on a plurality of metal lead-in terminals attached to a reflector section of an electric incandescent lamp, comprising a lead holder adapted to grasp a group of four straight wire leads by their inner end portions and position them in parallel relation with their said inner end portions accurately located in proper spaced interrelation to support respective filaments on respective pairs of said wire leads, means for bending the outer end portions of the respective pairs of wire leads in said lead holder outwardly away from one another and in parallel planes to a predetermined offset position, means for rotating said wire leads in the lead holder about their inner end portions to reposition their offset outer end portions in a predetermined oriented relation to one another, a reflector holder for positioning the reflector section accurately at a work station, means operable with respect to said reflector holder for attaching the offset outer end portions of the said oriented wire leads to certain of the terminals of the reflector section in said reflector holder while the said oriented wire leads remain held by the lead holder in their said oriented relation, and means operable with respect to said reflector holder for accurately mounting respective filaments on the inner end portions of each respective pair of said wire leads.

3. Apparatus for assembling a filament mount on a plurality of metal lead-in terminals attached to a reflector section of an electric incandescent lamp, comprising a carrier provided with a plurality of spaced work-supporting heads, means for indexing said carrier step-by-step to advance the heads through a plurality of work stations, each of said heads comprising a reflector holder for holding and positioning a reflector section and a lead holder for holding a plurality of wire leads by their inner end portions to accurately locate their said inner end portions in proper spaced interrelation to support a filament thereon, wire loading means at one of said stations for loading a plurality of straight wire leads into the said lead holder, wire bending means at a succeeding station for bending the outer end portions of the wire leads in said lead holder outwardly away from one another and in parallel planes to a predetermined offset position, means at another of said stations for rotating at least one of said wire leads in the lead holder to reposition the offset outer end portion thereof in predetermined oriented relation to the offset outer end portion of another of said wire leads, means operable with respect to said reflector holder at another of said stations for attaching the offset outer end portions of the said oriented wire leads to certain of the said terminals of the reflector section in said reflector holder while the said oriented wire leads remain held by the lead holder in their said oriented relation, and filament mounting means at another of said stations for accurately mounting a filament on the inner end portions of the said oriented wire leads.

4. Apparatus for assembling a filament mount on a plurality of metal lead-in terminals attached to a reflector section of an electric incandescent lamp, comprising a carrier provided with a plurality of spaced work-supporting heads, means for indexing said carrier step-by-step to advance the said heads through a plurality of work stations, each of said heads comprising a reflector holder for holding a reflector section therein and a lead holder adapted to hold a plurality of wire leads by their inner end portions to accurately locate their said inner end portions in proper spaced interrelation to support a filament thereon, adjustable reference gauging means on each head adapted to be set in predetermined reference gauging position relative to the focal plane of each individual reflector section positioned in the head, reflector positioning means at one of said work stations provided with reference gauge setting means and adapted to center the reflector section in the reflector holder at said station and locate the said gauge setting means in predetermined reference relation to the focal plane of the centered reflector section, means at said one work station for setting said reference gauge means on the head in predetermined reference gauging position relative to the focal plane of the reflector section in the head by adjusting the gauge means to engage with the referenced gauge setting means, means operable with respect to the said reflector holder at a following station for attaching the outer end portions of the wire leads in said lead holder to respective ones of the metal terminals of the reflector section in said reflector holder, and filament mounting means at a subsequent station for accurately mounting a filament on the inner end portions of said wire leads, the said filament mounting means being engageable with the referenced gauge means of the head to thereby locate the said filament mounting means in a predetermined filament mounting position relative to the reflector section in the head so as to mount the filament in predetermined relation to the focal plane thereof.

5. Apparatus as specified in claim 4 and comprising, in addition, wire grooving means at one of said stations for forming grooves in the inner tip ends of the attached wire leads to receive the end legs of a filament, said wire grooving means being engageable with the said referenced gauge means of the head to thereby locate the said wire grooving means in a predetermined wire grooving position relative to the focal plane of the reflector section in the head.

6. Apparatus as specified in claim 4 and comprising, in addition, wire trimming means at one of said stations for trimming the attached wire leads to proper length, said wire trimming means also being engageable with the said referenced gauge means of the head to thereby locate the said wire trimming means in a predetermined wire trimming position relative to the focal plane of the reflector section in the head.

7. Apparatus as specified in claim 4 and comprising, in addition, means at one of said work stations for bending the outer end portions of the said wire leads in said lead holder outwardly away from one another and in parallel planes to a predetermined offset position, and means at another of said stations for rotating at least one of said wire leads in the lead holder to reposition the offset outer end portion thereof in predetermined oriented relation to the offset outer end portion of another of said wire leads.

8. Apparatus for assembling a filament mount on a plurality of metal lead-in terminals attached to a reflector section of an electric incandescent lamp, comprising a carrier provided with a plurality of spaced work-supporting heads, means for indexing said carrier step-by-step to advance the said heads through a plurality of work stations, each of said heads comprising a reflector holder having an opening therethrough for supporting a reflector section therewithin with its concave side facing upwardly and a lead holder adapted to held a plurality of wire leads in depending relation thereto and by their inner end portions so as to accurately locate their said inner end portions in proper spaced relation to support a filament thereon, said lead holder being mounted on said carrier for vertical movement thereon downwardly through the said opening in said reflector holder from a raised inoperative position, in which it is located above and clear of the said reflector holder with a reflector section therein so as to be movable horizontally thereacross, to a lowered operative position, said lead holder also being mounted on said carrier for horizontal movement thereon, while in its said raised position in a direction transversely to the path of travel of said heads from an advanced position overlying the said opening in said reflector holder to a retracted position to one side of said opening, means at one of said stations to lower said lead holder to its said lowered position, wire loading means at another of said stations for loading a pair of straight wire leads into the said lead holder while in its said lowered position, wire bending means at a subsequent station for bending the depending outer end portions of the wire leads in said holder, while in its said lowered position, in directions outwardly away from one another and in parallel planes to a predetermined offset position, means along the further path of travel of the head for raising the said lead holder to and temporarily maintaining it in its said raised position and then retracting the lead holder to its said retracted position to clear the said opening in the reflector holder for the loading of a reflector section thereinto at another station, means along the further path of travel of the heads from said reflector loading station to shift the lead holder to its advanced position once again and lower it to its operative lowered position for attaching the offset outer end portions of the said wire leads to the terminals of a reflector section in said reflector holder while the said wire leads remain held by the lead holder, and means at a following station for accurately mounting a filament on the inner end portions of the said wire leads.

9. Apparatus as specified in claim 7 and comprising, in addition, wire lead repositioning means at a station of the apparatus following the bending of the wires to their offset position, and at which the lead holder is still in its lowered operative position, for rotating at least one of said wire leads in the lead holder to reposition its offset outer end portion in predetermined oriented relation to the offset outer end portion of another of said wire leads.

10. In apparatus for assembling a filament mount on a plurality of metal lead-in terminals attached to a reflector section of an electric incandescent lamp, a head construction comprising a reflector holder having an opening extending vertically therethrough for supporting a reflector section therewithin by its rim with its concave side facing upwardly, a carriage on said head, and a lead holder mounted on said head for vertical sliding movement thereon downwardly into the said opening in said reflector holder from a raised position located entirely thereabove, said lead holder being adapted to hold a plurality of wire leads in depending relation thereto and by their end portions so as to accurately locate their said inner end portions in proper spaced relation to support a filament, and said carriage being mounted on said head for horizontal sliding movement, while the said lead holder is in its said raised position, from an advanced position in which the lead holder overlies the said opening in the reflector holder to a retracted position in which the lead holder is located entirely to one side of the said opening in the reflector holder.

References Cited

UNITED STATES PATENTS 2,297,950  10/1942  Flaws, Jr. _____ 140—71.6X
2,932,877  4/1960  Pakish et al. _____ 29—25.2

JOHN F. CAMPBELL, Primary Examiner

R. B. LAZARUS, Assistant Examiner

U.S. Cl. X.R.

140—71.6